US008694953B2

(12) United States Patent
Khodabandehloo et al.

(10) Patent No.: US 8,694,953 B2
(45) Date of Patent: *Apr. 8, 2014

(54) TOOL AND METHODOLOGY FOR ENTERPRISE SOFTWARE APPLICATIONS

(76) Inventors: Payman Khodabandehloo, Harvard, MA (US); Harold Laurence Reed, Revere, MA (US)

( * ) Notice: Subject to any disclaimer, the term of this patent is extended or adjusted under 35 U.S.C. 154(b) by 760 days.

This patent is subject to a terminal disclaimer.

(21) Appl. No.: 12/635,381

(22) Filed: Dec. 10, 2009

(65) Prior Publication Data

US 2010/0088664 A1 Apr. 8, 2010

Related U.S. Application Data

(63) Continuation-in-part of application No. 11/893,250, filed on Aug. 14, 2007, now Pat. No. 7,644,390.

(60) Provisional application No. 60/837,873, filed on Aug. 14, 2006.

(51) Int. Cl.
*G06F 9/44* (2006.01)
*G06F 3/00* (2006.01)
*G06F 3/048* (2013.01)

(52) U.S. Cl.
USPC ........... 717/105; 717/103; 717/113; 715/717; 715/733; 715/751; 715/804

(58) Field of Classification Search
USPC ........................................................ 717/105
See application file for complete search history.

(56) References Cited

U.S. PATENT DOCUMENTS

| | | | |
|---|---|---|---|
| 5,107,443 A | | 4/1992 | Smith et al. |
| 5,574,898 A * | | 11/1996 | Leblang et al. ........................ 1/1 |
| 5,577,189 A * | | 11/1996 | Gay et al. ........................ 715/800 |
| 5,581,686 A * | | 12/1996 | Koppolu et al. ............... 715/784 |
| 5,767,848 A * | | 6/1998 | Matsuzaki et al. ............ 715/751 |
| 5,887,173 A | | 3/1999 | Ogawa et al. |
| 5,917,492 A | | 6/1999 | Bereiter et al. |
| 5,950,000 A | | 9/1999 | O'Leary et al. |
| 6,003,040 A | | 12/1999 | Mital et al. |

(Continued)

OTHER PUBLICATIONS

J. M. Morrissey. 1990. Imprecise information and uncertainty in information systems. ACM Trans. Inf. Syst. 8, 2 (Apr. 1990), 159-180. DOI=10.1145/96105.96113, http://doi.acm.org/10.1145/96105.96113.*

(Continued)

*Primary Examiner* — James D Rutten
(74) *Attorney, Agent, or Firm* — Edwards Wildman Palmer LLP; George N. Chaclas

(57) ABSTRACT

A system for creating and viewing simulation models that are used for managing requirements and design specifications for complex systems. Users simultaneously collaborate on the description of a complex system such as an enterprise software project throughout its life cycle. User interfaces, designed to assist in the visualization of a particular form of knowledge, allow users to describe the complex system with simple interactive elements. Information in all perspectives is presented so that it is legible and discernable to a non-technical audience. Multi-dimensional data structures record all the resulting information, creating a simulation model of the complex system, and the tasks required for construction and maintenance. Tasks are driven from the specifications not as a separate activity, but as part of the same activity to facilitate project management by allowing decisions to be tracked virtually throughout the simulation model.

19 Claims, 35 Drawing Sheets

(56) References Cited

U.S. PATENT DOCUMENTS

| | | | |
|---|---|---|---|
| 6,031,530 A * | 2/2000 | Trueblood | 715/791 |
| 6,118,446 A | 9/2000 | Jones et al. | |
| 6,199,193 B1 * | 3/2001 | Oyagi et al. | 717/101 |
| 6,330,008 B1 | 12/2001 | Razdow et al. | |
| 6,519,763 B1 * | 2/2003 | Kaufer et al. | 717/101 |
| 6,564,246 B1 | 5/2003 | Varma et al. | |
| 6,601,233 B1 | 7/2003 | Underwood | |
| 6,714,217 B2 | 3/2004 | Huang et al. | |
| 6,789,054 B1 | 9/2004 | Makhlouf | |
| 6,983,227 B1 | 1/2006 | Thalhammer-Reyero | |
| 7,010,752 B2 | 3/2006 | Ly | |
| 7,051,036 B2 | 5/2006 | Rosnow et al. | |
| 7,055,130 B2 | 5/2006 | Charisius et al. | |
| 7,055,131 B2 | 5/2006 | Charisius et al. | |
| 7,092,895 B2 | 8/2006 | Chappel et al. | |
| 7,096,222 B2 | 8/2006 | Kern et al. | |
| 7,096,454 B2 | 8/2006 | Damm et al. | |
| 7,114,149 B2 | 9/2006 | Aptus et al. | |
| 7,131,107 B2 * | 10/2006 | Wall et al. | 717/105 |
| 7,174,286 B2 | 2/2007 | Martin et al. | |
| 7,181,302 B2 | 2/2007 | Bayne | |
| 7,213,230 B2 | 5/2007 | Harel et al. | |
| 7,239,991 B2 | 7/2007 | Tuszynski | |
| 7,373,590 B2 | 5/2008 | Woolf et al. | |
| 7,644,390 B2 * | 1/2010 | Khodabandehloo et al. | 717/105 |
| 2002/0104071 A1 | 8/2002 | Charisius et al. | |
| 2003/0117437 A1 | 6/2003 | Cook et al. | |
| 2004/0255265 A1 | 12/2004 | Brown et al. | |
| 2007/0006119 A1 * | 1/2007 | Price | 717/101 |
| 2007/0050752 A1 * | 3/2007 | Woodall et al. | 717/105 |

OTHER PUBLICATIONS

Quatrani, "Visual Modeling with Rational Rose 2000 and UML," Addison Wesley Professional, Oct. 27, 1999.

Moore, "Cramming more components onto integrated circuits," Electronics, vol. 38, No. 8, Apr. 19, 1965.

* cited by examiner

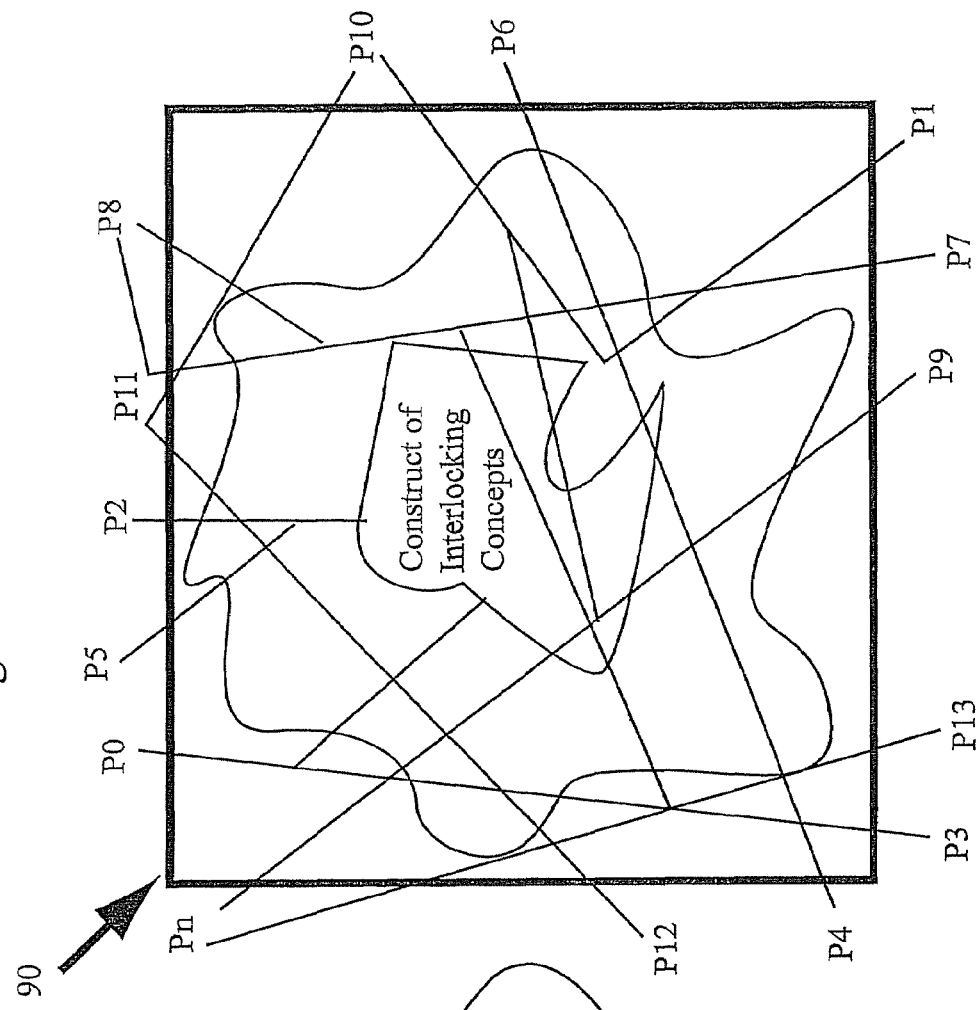
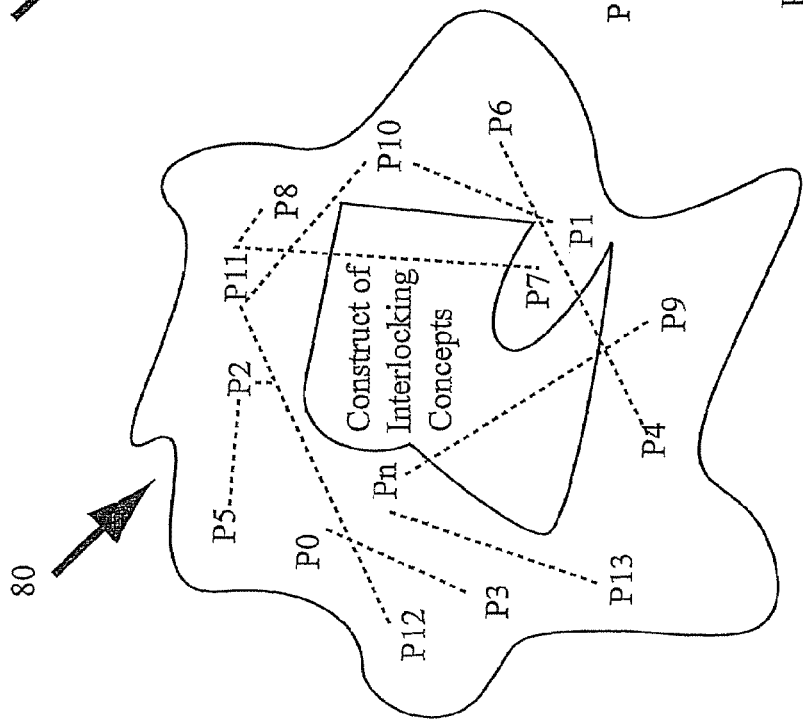
Figure 1B
Figure 1A

Figure 5
Feature Description Table 132  134  136  138  139  130

| ACTOR | FEATURE | DESCRIPTION |
|---|---|---|
| Borrower | Login | Establish identity and enter the site. The following activities are associated with login and identification<br>• Retrieve forgotten Password<br>• Retrieve forgotten Username<br>• Registration/enrollment (first-time user enrollment)<br>— establish new account profile, profile is established using<br>  • account number from a print statement<br>  • Zip code<br>  • Last four digits of SSN<br>— Establish new User profile<br>  • First Name<br>  • Last Name<br>  • Two Telephones<br>  • Billing address (pre-populated during from<br>• Choose display language |
| Borrower | Invoice | User may view their monthly statements. This activity consist of:<br>• View Payoff<br>• View Current statement<br>— View Statement from additional account<br>— View Statement from another billing period<br>• View My contract (my plan, my features, whatever, etc)<br>• Download Statement<br>• Print Statement |
| Borrower | Payment | Description of Payment Functionality |
| Borrower | Profile | Description of the Profile Functionality |

Figure 4
Actor Description Table 128

| ACTOR | DESCRIPTION |
|---|---|
| Borrower | This is a [client Name] customer who comes to site, or uses the application, to manage all aspects of their account. |
| Customer Service | This is a [client Name] employee who assists Borrowers with all aspects of their contract management process as well as any other component of the Borrower experience with [client Name]. |

Figure 3
126

1) The system shall allow displaying of pages in multiple languages.
2) The system shall allow customers to view their monthly statements in both a summary and detail view as well as a print-friendly option where applicable.
3) Customers shall also have the ability to make one-time and scheduled payments against their monthly invoices. Scheduled payments may only be made within a limited time range to be determined during requirements definition and may not be made indefinitely into the future. Payments shall be made though a NACHA-compliant ACH file.
4) The solution shall be implemented over SSL and meet [Client Name]'s defined and documented web standards. These standards shall be made available to [Vendor Name].
5) The system shall provide services for both external clients called Account Holders and internal employee called Customer Service Representatives at [client Name]

Figure 6

Feature Description Table 152

| ACTOR | FEATURE | DESCRIPTION |
|---|---|---|
| Borrower | Login | Establish identity and enter the site. The following activities are associated with login and identification:<br>• Retrieve forgotten Password<br>• Retrieve forgotten Username<br>• Registration/enrollment (fi...<br>— establish new accou...<br>  • account number fr...<br>  • Zip code<br>  • Last four digits of ...<br>— Establish new User ...<br>  • First Name<br>  • Last Name<br>  • Two Telephones<br>  • Billing address (pre-populated during from<br>• Choose display language |
| Borrower | Invoice | User may view their monthly statements. This activity consist of:<br>• View Payoff<br>• View Current statement<br>— View Statement from additional account<br>— View Statement from another billing period<br>• View My contract (my plan, my features, whatever, etc)<br>• Download Statement<br>• Print Statement |
| Borrower | Payment | Description of Payment Functionality |
| Borrower | Profile | Description of the Profile Functionality |

(Overlay box 150:)
- Navigation
- Page Element
- Integration
- Architecture
- Database (Overlay box:)
- Primary Navigation
- Secondary Navigation
- Ancillary Nav 1
- Ancillary Nav 2

Actor Description Table

| ACTOR | DESCRIPTION |
|---|---|
| Borrower | This is a [client Name] customer who comes to site, or uses the application, to manage all aspects of their account. |
| | ...employee who assists Borrower ...r contract management process ...mponent of the Borrower Name]. |

140

1) The system shall allow displaying of pages in multiple languages.
2) The system shall allow customers to view their monthly statements in both a summary and detail view as well as a print-friendly option where applicable.
3) Customers shall also have the ability to make one-time and scheduled payments against their monthly invoices. Scheduled payments may only be made within a limited time range to be determined during requirements definition and may not be made indefinitely into NACHA-compliant ACH file.
4) The solution shall be implemented over SSL and meet [Client Name]'s defined and documented web standards. These standards shall be made available to [Vendor Name].
5) The system shall provide services for both external clients called Borrower and internal employee called Customer Service Representatives at [Client Name].

| Tasks | Sequences | Dependencies | | | | | |
|---|---|---|---|---|---|---|---|
| Collapse All | ☐ Show Tasks as List | Assign Selected Task... | | | | | |
| Expand All | Choose Columns... | ⊕ ⊖ | | | | | |
| Name | % Complete | Priority | Est.Duration | Est.Start Date | Est.Finish Date | | |
| Setup dev VM | 0% | ? | ? | ? | ? | | |
| Setup new VM server | 0% | ? | ? | ? | ? | | |
| Setup VM monitoring | 0% | ? | ? | ? | ? | | |
| Websphere Setup ▼ | ? 0% | ? | ? | ? | ? | | |
| Configure Websphere | ? | ? | ? | ? | ? | | |
| Install Websphere ▼ | 0% | ? | ? | ? | ? | | |
| *Setup dev VM* | 0% | ? | ? | ? | ? | | |
| Setup Permissions | 0% | ? | ? | ? | ? | | |

510 — Setup dev VM
512 — Websphere Setup
514 — Setup dev VM

Delete

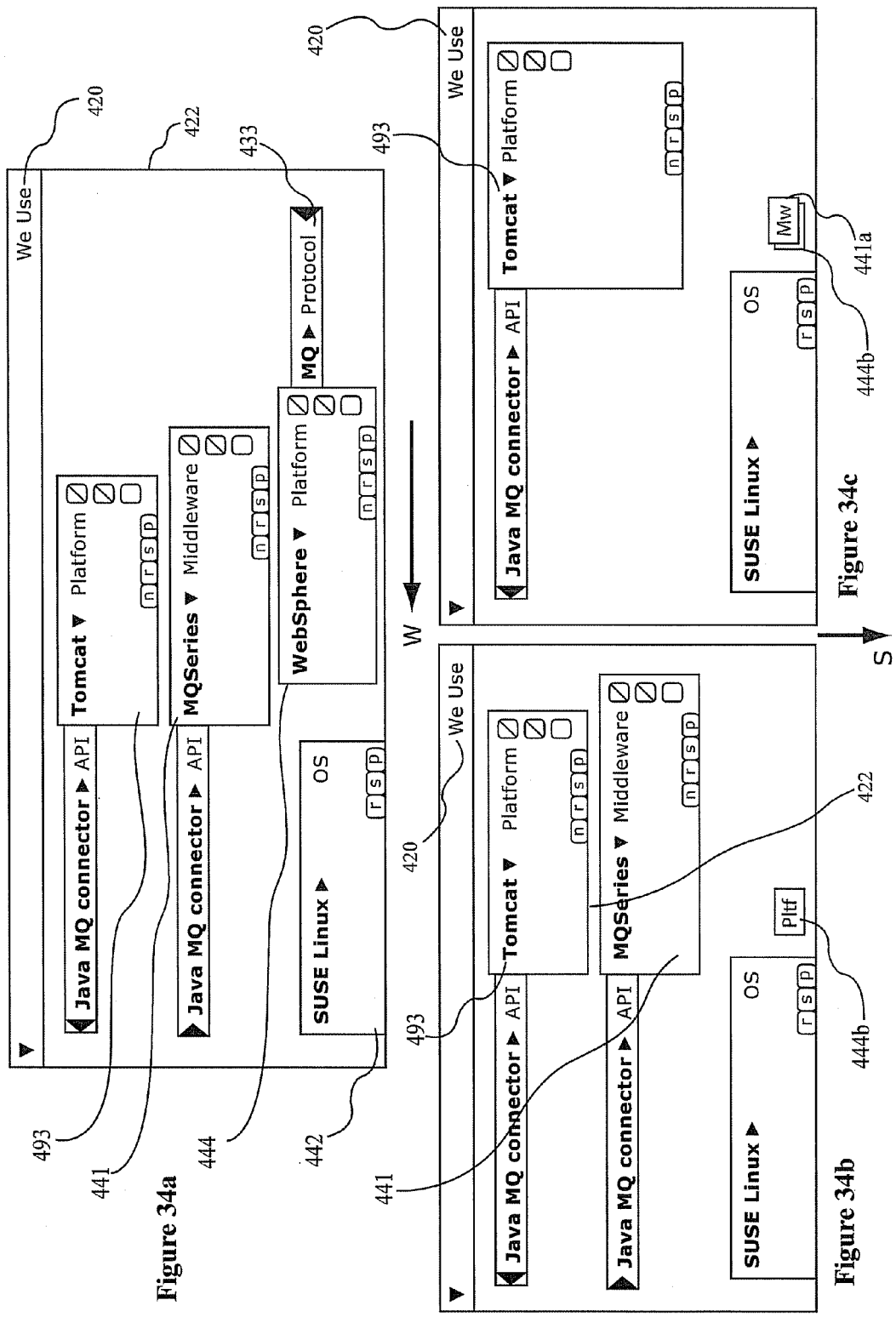

TOOL AND METHODOLOGY FOR ENTERPRISE SOFTWARE APPLICATIONS

CROSS-REFERENCE TO RELATED APPLICATION

This application claims priority to U.S. Provisional Patent Application No. 60/837,873, filed Aug. 14, 2006 and U.S. Utility patent application Ser. No. 11/893,250 filed Aug. 14, 2007 of which it is a continuation-in-part, each of which are incorporated herein by reference.

BACKGROUND OF THE INVENTION

1. Field of the Invention

The subject disclosure relates to methods and systems for enterprise software application development and management and more particularly, building a suite of collaborative tools to manage the gathering, recording, and dissemination of business and technical requirements, and subsequent conversion to design, and specifications documents for complex systems such as those in the computer software industry.

2. Background of the Related Art

Less than half of all enterprise software projects meet their original time and budget estimates. It has been well documented that the understanding, recording and distribution of requirements and the subsequent proper use of requirements for creating the design and the specifications is at the heart of successfully manufacturing software. There is a perception that requirements are hard to gather. While gathering requirements is not trivial and does require skill and experience, it is certainly not a mystery. Most requirements gathering experts continue to stress the benefits of doing a decent job of requirements gathering.

Many organizations both on the client and vendor side of enterprise software try to create requirements in a somewhat formal way. The requirements are then recorded as text documents using some sort of word processing program. Requirements may also contain schematics and diagrams created in generic drawing tools.

From the moment a Request For Proposal (RFP) or Request For Quote (RFQ) is formally created, various manifestations of requirements from one or more perspectives are being recorded and are available. Some companies also use formal tools, such as Rational Rose, Borland Together, Enterprise Architect, for requirements gathering that often work within a suite of software design tools. Tools built around the Unified Markup Language represent the state-of-the-art in this area.

The most important time for measuring the success of requirements management is the procurement phase, simply because this is the time during which scope, time and budget are being boxed in and estimated. The procurement phase comprises the entire period of time and process from the beginning of RFP/RFQ creation, through the statement of work through the completion and signing of a contractual agreement. At the end of the procurement phase, costs, time and scope estimates have often been formalized, documented, and in the case of fixed-cost-fixed-time engagements, finalized. A degree of transfer engineering already has taken place as the teams assigned to finding a vendor and the team assigned to closing the deal often move off the project and new teams are assigned to the execution of the project.

It is also important to note that the proper gathering of technical and business requirements is a resource intensive activity that often involves technical leads within both vendor and client organizations at a time when nobody is getting paid yet. This was not the case early in the history of the industry, where requirements were taken into the overall budget. Increasing competitive market pressures have made requirements gathering a sales or sales-related or pre-project activity.

In the past, there has been a layer of assumptions guiding the development; namely that requirements are perceived as an aspect of a software project that is managed early in the life of the project. The idea is that the team then starts "building" and like most other human building projects, such as constructing a skyscraper, nothing fundamental will change. Of course, in any project change is inevitable.

The lobby that was destined for carpeting may now require granite tiles, and this is managed with a change order. But a building plan for a two-story shopping mall does not become a 14-story Hospital after the project is started. The idea is that project generally sticks to the requirements without fundamental change. This is the approach and assumption of more stringent methodologies that rely on "phases" that linearly follow one another until the project is complete and the whole process can start again from the beginning for any change or any additions.

In all other fields of manufacturing, change is understood to have impacts on time and money. This is not the case in software. Software is considered ultimately malleable and flexible and so change will have an impact, but that impact may be somehow mitigated or reduced to have only a fraction of the actual manifested cost and time, or so the market perception goes. Frederic Brooks addresses this in his paper entitled *No Silver Bullet:*

The software entity is constantly subject to pressures for change. Of course, so are buildings, cars, and computers. But manufactured things are infrequently changed after manufacture; they are superseded by later models, or essential changes are incorporated into later-serial-number copies of the same basic design. Call-backs of automobiles are really quite infrequent; field changes of computers somewhat less so. Both are much less frequent than modifications to fielded software. In part, this is so because the software of a system embodies its function, and the function is the part that most feels the pressures of change. In part it is because software can be changed more easily—it is pure thought-stuff, infinitely malleable. Buildings do in fact get changed, but the high costs of change, understood by all, serve to dampen the whims of the changers.

All successful software gets changed. Two processes are at work. First, as a software product is found to be useful, people try it in new cases at the edge of or beyond the original domain. The pressures for extended function come chiefly from users who like the basic function and invent new uses for it.

Second, successful software survives beyond the normal life of the machine vehicle for which it is first written. If not new computers, then at least new disks, new displays, new printers come along; and the software must be conformed to its new vehicles of opportunity.

Under current workflows and business realities, requirements are not fixed at some point in time. Requirements constantly change and evolve. Requirements are more effectively thought of the substance of the medium in which a software project is conceived of, created and in which it continues to live. Requirements and their expressions don't go away; requirements and their expressions are not a fixed thing.

Requirements are not just in the software. Requirements surround the software project. For example, the Quality Assurance department is sitting next to the developer one day and the next day, it is being managed out of a place that is 14 time zones and a world of languages away. The documented requirements and the process that worked for the team next door suddenly do not work for the new process. New material has to be added. Previously understood jargon may have to be simplified or rewritten. Change cascades through the process but this new dimension of change is usually not viewed as a part of project requirements. It is just change.

The industry's response to requirements management and the need for their documented manifestations exist in a broad spectrum from the highly formal and rigidly structured, such as the Rational Unified Process at one end, to a more flexible, more lightly-documented, less formal approach such as the Agile software development process.

Rational Unified Process (RUP), when it works well, provides structures and detail but is difficult to manage and maintain throughout the life of a project and is subject to diminishing returns in case of smaller projects.

The AGILE process recognizes that documentation is hard to manage and maintain in the rapidly changing world of software projects, so they do away with as much formal process and documentation as they can, as if doing away with the rigors of requirements management somehow removes complexity. As a result, the AGILE process works well for smaller projects with smaller teams where communications can more easily be managed without the need for a formal process.

What is needed is for the requirements, design, and specifications documents to be structured, richly detailed, and highly specific as in the RUP. But they also need to be flexible, malleable, fluid, and light as in the AGILE process. There is a need for information management tools to address both apparently contradictory needs simultaneously. It is not a battle between one methodology versus another, it is the fact that both are required simultaneously that is at the heart of requirements management and its influence on the fact that less than half of all enterprise software projects in the United States stay within their original cost/time/scope definitions and some 17 percent are actually abandoned.

In other words, one can gather requirements but if you cannot record them, update them, and constantly change them and distribute the effects of the changes to the parties that need to know effectively, efficiently, and quickly, the requirements may not be used in time to influence a layer of decision making. There has been an effective doubling of hardware performance per unit cost every two years now for nearly three decades. This trend is referred to as Moore's Law. No such improvement has ever occurred for software productivity, reliability and cost, despite a myriad of inventions, technologies, improvements, processes, and methodologies over the past three decades.

Computer hardware and computer software are sufficiently similar that an entire field—namely, the field of hardware virtualization—exists based upon this similarity. Computer software has been proven—so far—to be capable of reproducing all aspects of computer hardware except, of course, for Moore's Law.

Frederick Brooks' *No Silver Bullet* quoted earlier, is the reference description of why software is this way. To see what rate of progress can be expected for software technology, Brooks examines and describes the difficulties of software technology. Software in his generally-referenced descriptions is viewed as follows:

The essence of a software entity is a construct of interlocking concepts: data sets, relationships among data items, algorithms, and invocations of functions. This essence is abstract in that such a conceptual construct is the same under many different representations. It is nonetheless highly precise and richly detailed.

The construct of interlocking concepts is created by a group of people with different skill sets and areas of expertise. This group of people are called the project team. The project team occupies an information ecosystem 80 as shown in FIG. 1A. The information ecosystem 80 is similar to a biological ecosystem in the complexity of relationships and dependencies among those who occupy it. FIG. 1A shows a schematic representation of the information ecosystem. The project team members P0 through Pn are shown directly interacting with the construct of interlocking concepts that is the software entity as defined by Frederick Brooks in No Silver Bullet. The entire system is enclosed by a boundary which defines what we call the information ecosystem. The information ecosystem as defined here in is the sum of the interactions of all the team members and all the information produced, modified and destroyed by them. The net result of and the motivation for the information flow is the construct of interlocking concepts. Nothing is defined as a means of interaction between the team members and with the construct. The interactions and means of interactions are all undefined.

The project team is basically every person that can—and does—modify the information in the ecosystem. The software and its requirements are evaluated in the context of the entire team from the inception of the ecosystem to any time of evaluation. The ecosystem has no end because the ecosystem is a living entity not in a biological sense but in the sense that the ecosystem does not end and may stay around for decades.

In fact a team or member may have contributed a document or specification a decade earlier and no longer be working for either vendor or client. The quality of a decade old document can have a direct impact on a project today. The subject disclosure assumes that the project team is not simply the consumer or producer of the information, but the source of everything in the information system and thus inseparable from it.

The members of the project team however, are not uniform entities. The members have different core competencies, different skills that may or may not overlap in some areas. Each group has a different vocabulary, different graphical conventions, different jargon for referring to their aspect of the software entity. Their dependencies on another member may well be an opaque and derivative dependency from the relationship of other members to that member.

Each member may view the software entity from a completely different perspective. And yet all their requirements intersect somehow, somewhere in the construct of interlocking concepts. A point of intersecting requirements may be a marketing requirement for data display, which may be in complete conflict with the manner in which the data is extracted or presented to the display framework. This conflict is not known at the time of the estimate, but will add significant time to a project and require the hiring of additional unanticipated resources. A simple cost-saving hardware alternative may be ignored early on because of a platform choice that later changed because of a legal compliance issue after the expensive hardware was purchased.

To the Customer Service Manager or marketing specialist at the client, the software entity may be discussed in terms of the interface with which their customers interact and the net result of their successes and failures. To the systems manager at the hosting site, the software entity is a series of hosting servers, routers, and load balancers. To the project manager the software is a series of tasks, subtasks, dates, and resources.

To the software architect designing the system software, the entity is something; to the junior contractor building HTML pages, the software entity is something quite different. Each of these perspectives represents an aspect or components of the interlocking concepts and so is part of the construct. The information contained in this evolving information ecosystem is at once massive and multi-dimensional.

It is accumulated and constructed over a period of weeks, months, and often years, typically by changing teams. During this period, the understanding of the entity itself can evolve significantly. Again to the members of the team creating an RFP, to the presales engineers responding to the RFP and the sales team initiating communications between the parties, the software entity is a series of different but co-dependant other perspectives.

In addition, certainty about the fidelity of the requirements for a software system is gained cumulatively over time. Moreover, the certainty itself is at once highly localized but also widely distributed among the aforementioned team members each of whom may be absolutely certain, or completely in the dark, about any given aspects of the construct. Again because the construct of interlocking concepts is not one thing to one person, but many things to many people, complete certainty about one aspect does not necessarily insure certainty about others.

Although there are definite success stories, today's methods of documenting within office software suites or specialized software design tools does not cope effectively with this multi-dimensional and transient information system in the majority of cases, in part, because the maintenance of the information—when it is actually acknowledged and managed—is transferred from a field expert to someone whose job is documentation and document management. Now all changes have to be transferred through this role and placed in the proper part of the collective document set; when it exists at all, in any effectively maintained and updated state.

The impact of a single change must be examined and documented throughout the system and absorbed in its totality in order to capture a small overlapping aspect of the change. While this, occurs during the designated requirements phase early on in the project for changing requirements, it is not maintained as thoroughly once the design and implementation phase is started. This is in part because of resource allocation. The specialist in charge at the beginning, rarely if ever, stays throughout the project to manage change within requirements, and specifications. It is left up to the team members to maintain any necessary documentation, in addition to performing their regular tasks within the project. Since this can be a time-consuming activity, it is rarely, if ever carried out in practice, since time for "continuing to understand and document" the project is rarely billable after the designated requirements phase early on in the project.

A verbal description of the various states, even when supported by diagrams may be able to contain the complexity, but it would require a very large and difficult to produce document. Even if said document was produced, it would have to contain things as diverse as Data descriptions, user interface artifacts, project plans, and architectural schemas among others. It would then have to contain information regarding all the relationships between the various states and aspects. Furthermore, said document would be cumbersome and difficult to maintain from all the perspectives, search, navigate, access and view in each individual context. No textual description can contain such rich, multi-layered, multi-faceted information and yet be easy maintain and to navigate and to readily show dependencies; only a simulation can.

The Unified Markup Language (UML) is one attempt at containing this rich and multi-layered information system. although the UML's main goal is modeling and building object-oriented software and not managing information. One shortcoming of the UML is the expertise required in learning and using it. This expertise is in addition to any software expertise the audience may already have. In other words, one may be an expert in an area of software design, but be unable to discuss that area with an expert from another of software's disciplines without both of them first having to become UML experts. This of course assumes that each area of expertise is well-contained and handled within the UML's syntax and semantic framework which in reality is not always the case as Klaus-Dieter Schewe describes in his paper UML: A Modern Dinosaur" [4].

Learning UML is at least as difficult as learning any other language, even if each area of expertise was well-covered in the UML. This learning curve presents a barrier to entry for team members trying to define their perspective: all team members must fluently speak, write, and draw in UML. Even if this was not a significant shortcoming for any tool attempting to overcome this communication problem, it would add a layer of complexity to already complex software systems. According to Brooks, software systems are "arguably more complex for their size than perhaps any other human construct, because no two parts are alike (at least above the statement level)."

Brooks continues the statement about the "construct of interlocking concepts" thus:

I believe the hard part of building software to be the specification, design, and testing of this conceptual construct, not the labor of representing it and testing the fidelity of the representation. [ . . . ] If this is true, building software will always be hard. There is inherently no silver bullet. [3]

In other words, it's harder to specify and design software and test the fidelity of the design and specification than it is to actually build the software.

Conventionally, the most thorough description of a piece of software is source code. Only the software source code itself describes the behavior of software with complete accuracy. However, software source code as a descriptive form has several limitations.

First, Software source code consists of instructions rather than descriptions. Since the primary purpose of source code is to dictate specific behavior to a machine, the primary goal of all source code is to describe behavior in a manner that can be easily broken down into simple atomic instructions. As a medium, software source code is very good at communicating the 'imperative', but it is limited when trying to communicate the 'descriptive' or the 'inquisitive'.

Recording the descriptions, questions, and answers that are important to humans but have nothing to do with 'instructions' is difficult in software source code. Descriptions of purpose ("why was this code written"), intention ("what is this code supposed to be doing"), explorations of possibilities ("this code might be used to . . . ") are all important to humans, but not to a compiler. Such descriptions can only be contained in source code in the unstructured and arbitrary format of 'comments'. When source code is compiled, the descriptions that do exist in comments are completely removed from the resulting 'compiled' code. This limitation is well recognized within the industry and attempts have been made to address it.

Second, Software source code is very difficult for non-experts to understand. Software 'illiteracy' is a particularly difficult problem to overcome. For most forms of communication through language, a distinction is drawn between the ability to speak a language, and the ability to read and write in that language ('illiteracy'). In many English-speaking countries, a man can obtain a license to drive an automobile without being able to spell the word 'AUTOMOBILE'; he may even be able to earn a living teaching others how to drive. Conversely, in order to have a meaningful conversation about software source code, one must be able to read and write in computer languages. A COBOL programmer may discuss software with a JAVA programmer, a BASIC programmer may discuss software with a C# programmer, but the non-programmers in the room cannot participate. This is another limitation of software source code as a general-purpose communications medium. Attempts have been made to simplify the presentation of software source code, from flowcharts to the Unified Markup Language to graphical programming languages. But these are again highly complex languages that require not only a knowledge of programming, but the additional of need for acquired expertise in the languages themselves, adding complexity instead of alleviating it.

Third, Software source code assumes absolute contextual understanding. Source code is extremely difficult for even experts to read, because the meaning (intended atomic instructions) of software source code changes from system to system. The most difficult part of programming is determining what the actual behavior of a line of code will be once it is executed in the "production" environment. Software experts are often surprised by the actual behavior of software source code "in the field". Modern production computing environments are highly advanced. Layer upon layer of code have been built up to comprise the current software deployment environments. Some of this code is inappropriate to the current context. For example, architectural decisions made to accommodate peculiarities of certain token-ring networks in the early 1980s are still present in modern networking APIs, such as those that a modern cell phone uses to send and receive email. Contextual dependency is the most difficult barrier to software source code as an effective general communications medium: "ILLEGAL OPERATION 0x876" means nothing out of context. On a fundamental level, the code that describes an interface and the code that enables communication between two different subsystems are essentially of the same form. Their external manifestation is therefore opaque except from those who can decipher the code.

Being able to design, specify and test a complete prototype during procurement would of course be the ideal solution, but real prototypes cost money and resources and neither vendor nor client is likely to put together anything better than a high-level demonstration at best. Thus, a need exists for a practical approach to successfully develop complex systems.

Several approaches have been well documented. For example, see U.S. Pat. No. 7,114,149 issued on Sep. 26, 2006 to Aptus et al., which discloses a software development tool that generates HTML documentation for source code in a software project. The HTML documentation includes graphical and textual documentation. The software development tool utilizes the linking capabilities of HTML to provide navigation links between the graphical and textual documentation, thus facilitating navigation through and viewing of the documentation. The tool of Aptus et al. merely generates documentation that is an electronic copy of the traditional specification document. The links are typical user-selectable items that bring the user to another page. If the source code is updated, the HTML document is updated but not vice versa.

Another approach is shown in U.S. Pat. No. 6,789,054 issued on Sep. 7, 2004 to Makhlouf. Makhlouf discloses Adaptive Model-Reference (AMR) tools that visually specify the integrated architecture model of a real system, assess its value, and automate the static and dynamic binding of its model components into adaptive systems. These systems can be adapted during system development to compensate for requirement changes and design errors, and during run time operation to compensate for unanticipated operational system conditions. Makhlouf does not address how non-technical audiences can effectively communicate in his system.

SUMMARY OF THE INVENTION

The present disclosure is directed to a method of managing communications in an information ecosystem by creating a model of the complex system using visual elements constructed of the information that describes the complex system. As mentioned previously, we borrow the word ecosystem from its biological roots to imply the same living complexity of relationships and dependencies as in a biological ecosystem. The substance of this ecosystem however is timely and contextually accurate information. When evaluating the requirements for a software project, considering the requirements of the software entity itself is not enough. What is needed is a system and method that examines the context in which the information is created, maintained and changed.

The subject technology overcomes the problem that a team of diverse people with diverse languages and diverse requirements cannot easily describe the same thing—the construct of interlocking concepts—in their own different ways, while the thing itself, as well as their knowledge of it, continues to evolve. An object of this disclosure is to manage all the manifestations of the information that describes all the dimensions of this change.

Once the visual description is built, the disclosed computing system allows the team to build and maintain consensus and certainty about the requirements, design and specification of that conceptual construct. This visual description is malleable and allows the impact of any change to be visible and demonstrable throughout the construct, from the smallest low level code detail to an actual task and the resource performing that task. The visual model of the complex system presented in the computing system accomplishes these goals without cognitively overwhelming the user.

It is another object of the subject disclosure to address the communication problems associated with developing large scale, complex systems such as enterprise software systems. Preferably, the subject methods manage the complexity of information accumulation, recording, distribution, updating and maintenance within the specialized project team members to provide effective communication to solve the manufacturing problem.

Referring to FIG. 1B, the subject disclosure shows a schematic representation of the information ecosystem. By providing a multi-faceted mechanism for viewing the simulation model, the individual members of the project team are able to directly interact with the simulation model, each from their own perspective. Furthermore, each individual member of the project team is able to perceive how changes made by other members of the team affect the portion of the construct with which he or she is concerned. FIG. 1B shows the same construct and the same team and the same interactions as FIG. 1A, however, this time all the interaction is through the additional boundary item 90 in FIG. 1B which represents the subject disclosure. All team members interact with one another and with the ecosystem and the construct through a defined means, namely through the computing system 100 in FIG. 1C.

In one embodiment, the subject disclosure constructs and maintains a simulation model of the construct of interlocking concepts. The first step in managing the information complexity is to create consensus between the diverse points of view that try to describe the resulting system. This is achieved by creating a single place within the information ecosystem, namely the canvases. The canvases allow the diverse points of view to visualize the common problem being solved in a single place, namely in the context of the simulation model. The simulation model displays the same problem from several perspectives. The dimensions of a software entity are sufficiently different that these perspectives may have many things or only a few things in common. But the canvases are a place where the intersection between the common aspects of the points of view can be captured, connected, and independently visualized. The common ground is a model of the construct of interlocking concepts.

In one aspect, the simulation model creates a visual construct using complex, multi-faceted, elements that represent the components of a conceptual construct such that the construct is not described but rather built out of syntactically simple graphical elements. The built construct is a substitute construct as a simulation. The simulation model works because it is easy to construct for each member of a software team from their individual perspective and is built using tools designed to be readily recognized and used by each practitioner of an aspect of the software discipline. Thus, the complexity is dissipated by being distributed across skill sets. As a result, the simulation is orders of magnitude easier to construct than the same thing if it were to be made using code.

It is an object of the subject disclosure to provide a place within an information ecosystem in which one can create and maintain consensus among different and related perspectives about a singular but dimensionally complex and evolving entity. Preferably, the information ecosystem includes a simulation model that contains the design and specification and a mechanism for testing of the design and specification. Using the simulation model, a user can test the fidelity of the representation without having to actually build the thing itself by writing code. Thus, prior to actually writing the code, diverse consensual certainty across perspectives is achieved. The simulation model is easy to change and update collaboratively across perspectives again, because each member contributes to their individual perspective and the dependencies are collectively observed and managed.

In a further aspect, the subject disclosure allows building a conceptual construct rather than the ultimate deliverable such as the software itself. The simulation model does not have to function like the software. In contrast, the simulation model simply has to describe the software using internal conventions and components of the subject disclosure. Just as the software can have an enormous number of states, in this way the simulation model is able to manage all the various states including their implications on other states in a tidy visual space. The simulation model or conceptual construct can be built by dragging and dropping components and other minimal user interface effort now known and later developed.

In one embodiment, the simulation model has a plurality of canvases that represent contextual information for other canvases while making dependencies visible. The simulation model supplies the descriptive, explanatory, and contextual details inherent in the construct of interlocking concepts that is software. The simulation model is therefore free to include in one place and in several contexts, not only the technical information, but also the related non-technical information such as project management, or resource allocation, within the same framework. As a result, the audience sees, not only a piece of information, but every aspect affected by that piece of information in one place, allowing the information and the context to literally become the index and table of contents and cross-references for themselves. This is a novel way to manage complexity of multi-layered, multi-dimensional narrative structure such as a software project. The simulation model is able to contain, display, and update the complexity of the software construct, as well as the complexity of the contextual business and human information system in which the software and the project it represents reside. The simulation model is able to do so in one easy to build, easy to maintain, and easy to access context.

In one embodiment, a server facilitates creation of a simulation model for a complex enterprise software solution. The server communicates with clients via a distributed computing network. The server includes a memory storing an instruction set and data related to the simulation model and a processor for running the instruction set, the processor being in communication with the memory and the distributed computing network. The processor is operative to present a text canvas that includes a table to represent a solution to a request for software code that addresses a problem such that an editor is able to modify text of the table, present a text canvas (ADT) that includes a table to represent individual end-users of a solution to a request for software code that addresses a problem such that an editor is able to modify text of the table, present a text canvas (FDT) that includes a table to represent individual functional features of a solution to a request for software code that addresses a problem such that an editor is able to modify text of the table, wherein the canvases are related to form a conceptual construct such that a modification to one canvas is promulgated to at least one other canvas within the conceptual construct so that the editors effectively communicate together while using the corresponding canvas.

Another embodiment is further operative such that the processor is further operative to present a storyboard canvas that includes spatially-oriented, radially-structured interactive graphical tools to represent the navigation and/or workflow of the solution such that editors such as information architects, application designers, or other interactivity experts are able to create, modify and directionally connect the graphical tools and thereby define the solution, present a wireframe canvas that includes interactive graphical tools to represent the individual user interface components, including buttons, data fields, windows, screens, and other user interface controls, of the solution such that editors such as information architects, application designers, and user interface experts are able to assemble unique user interfaces by combining the graphical tools and thereby define the solution, present presentation canvas that includes interactive graphical tools to represent skinning decisions including fonts, colors, borders, images, and graphical presentation option, of the solution such that editors such as graphic designers, producers and interface experts are able to define a look-and-feel and thereby define the solution, wherein the canvases are related to form the conceptual construct of a user interface such that modification to one canvas is promulgated to at least one other canvas, which may include the canvases described in preceding claims, within the larger conceptual construct so that all editors, including editors described in preceding claims, may effectively communicate together while using their individual canvases.

Preferably, the processor is further operative to: (i) present a data packaging canvas that includes branching structures to represent the structures and hierarchies of data within the solution such that editors such as information architects, application architects, database engineers, networking specialists, or other technical experts are able to create, navigate, and modify the branching structures and thereby define the solution; (ii) present a data tables canvas that includes a table-builder to represent the database schemata of the solution such that editors such as information architects, application architects, database architects, database engineers, or other technical experts are able to create and modify the tabular representation of the database schemata and thereby define the solution; and (iii) present a data relations canvas that includes spatially-oriented, radially-structured interactive graphical tools to represent the database schemata of the solution such that editors such as information architects, application architects, database architects, database engineers, or other technical experts are able to create and modify the relational structures of the database schemata and thereby define the solution; wherein the canvases are related to form the conceptual construct of database schemata such that modification to one canvas is promulgated to at least one other canvas, which may include the canvases described in preceding claims, within the larger conceptual construct so that all editors, including editors described in preceding claims, may effectively communicate together while using their individual canvases.

In a further embodiment, the processor is operative to: (i) present a technical schematic canvas that includes interactive graphical tools to represent the organizations and computing systems comprising the solution such that editors such as application architects, database engineers, network engineers, system architects, UML, experts, or other technical experts are able to describe the computing environment and infrastructure, including hardware and software, and thereby define the solution; (ii) present a visualization of organizations that includes recursive container-based expandable interactive graphical tools represent the organizations and individuals comprising the solution such that editors such as application architects, project managers, UML experts, or other domain experts are able to create and modify the organizational structure and thereby define the solution; (iii) present a visualization of computing systems that includes layered interactive graphical tools to represent the physical computing systems comprising the solution such that editors such as application architects, network architects, network engineers, system architects, system engineers, UML experts, or other technical experts are able to create and modify the graphical representations of computing systems and thereby define the solution; (iv) present a visualization of networks that includes connection-based interactive graphical tools to represent the networks comprising the solution such that editors such as application architects, network architects, network engineers, system architects, system engineers, or other technical experts are able to create and modify the graphical representations of networks and thereby define the solution; (v) present a visualization of software components that includes recursive container-based expandable interactive graphical tools to represent the software components of the solution such that editors such as application architects, database architects, database engineers, software engineers, UML experts, or other technical experts are able to create and modify the graphical representations of software components and thereby define the solution; (vi) present a visualization of software component interaction that includes connection-based interactive graphical tools to represent the software procedural and API calls comprising the solution such that editors such as application architects, database architects, database engineers, software engineers, or other technical experts are able to create and modify the graphical representations of software components and thereby define the solution, wherein the canvases are related to form the conceptual construct of computing hardware and software such that modification to one canvas is promulgated to at least one other canvas, which may include the canvases described in preceding claims, within the larger conceptual construct so that all editors, including editors described in preceding claims, may effectively communicate together while using their individual canvases.

The processor may also be further operative to: (i) present a task canvas that includes recursive container-based, pre-and-post-conditional expandable interactive graphical tools to represent the tasks involved in creating the solution such that editors such as project managers, team leaders, and other professionals are able to describe the efforts required to construct portions of the solution (including dependencies between efforts, and resource requirements/availability/assignment), and thereby define the solution; (ii) present a time-line canvas that includes linear, sub-branching interactive graphical tools to represent the temporal relationships between tasks involved in creating the solution such that editors such as project managers, team leaders, and other professionals are able to create and modify the coordinate the efforts required to construct portions of the solution and thereby define the solution; (iii) present tabulated task canvas that includes a set of tables to represent all attributes and aspects of tasks involved in creating the solution such that editors such as project managers, team leaders, and other professionals are able to fully represent and manage the efforts required to construct portions of the solution and thereby define the solution; wherein the canvases are related to form the conceptual construct of the 'project such that modification to one canvas is promulgated to at least one other canvas, which may include the canvases described in preceding claims, within the larger conceptual construct so that all editors, including editors described in preceding claims, may effectively communicate together while using their individual canvases.

In another aspect, the subject disclosure is a server for facilitating a creation of a simulation model for a complex enterprise software solution, wherein the server communicates with clients via a distributed computing network. The server includes (a) a memory storing an instruction set and data related to the simulation model, and (b) a processor for running the instruction set, the processor being in communication with the memory and the distributed computing network. The processor is operative to: (i) present a text canvas that includes a table to represent a solution to a request for software code that addresses a problem such that an editor is able to modify text of the table; (ii) present an interactive schematic canvas that includes expandable icons arranged on a circle to represent the solution such that a system architect is able to navigate and modify the expandable icons; (iii) present a data canvas that includes a branching structure to represent the solution such that a data analyst is able to navigate and modify the branching structure; and (iv) present a user interface canvas that uses graphics to represent the solution such that a user interface designer is able to modify the graphics, wherein the canvases are related to form a conceptual construct such that a modification to one canvas is promulgated to at least one other canvas within the conceptual construct so that the editor, system architect, data analyst and user interface designer effectively communicate together while using the corresponding canvas. Preferably, the graphics of the user interface canvas include storyboards, promulgation includes the step of coupling a modification to the conceptual construct, and modifications can be decoupled.

In one aspect, the subject disclosure is a method for creating a conceptual construct for a complex enterprise software. The method comprises the steps of presenting a canvas designed for a first audience that enters data related to the complex enterprise software into the canvas and creating additional canvases based upon the complex enterprise software data, the additional canvases being designed for a second audience. The method may have canvases that are selected from the group consisting of (i) a text canvas that includes a table to represent a solution to a request for software code that addresses a problem such that an editor is able to modify text of the table, (ii) present an interactive schematic canvas that includes expandable icons arranged on a circle to represent the solution such that a system architect is able to navigate and modify the expandable icons, (iii) present a data canvas that includes a branching structure to represent the solution such that a data analyst is able to navigate and modify the branching structure and (iv) present a user interface canvas 122d that uses graphics to represent the solution such that a user interface designer is able to modify the graphics.

A method in accordance with the subject disclosure for navigating between a first and a second visual perspective of a large conceptual construct, each visual perspective having elements, the method includes the steps of selecting a first element in the first visual perspective as a startpoint, selecting a second element in the second visual perspective as an endpoint allowing a user to navigate from the first element to the second element and vice versa, wherein all the elements can serve as the startpoint or endpoint.

Another method in accordance with the subject disclosure for seamlessly navigating elements of schematics in canvases includes the steps of navigating a construct as a graph, the construct being a collection of the elements coupled to fowl a plurality of nodes in that the graph is a start-point, starting with a first element visible in a first schematic in a first canvas as the start-point, navigating individually through a plurality of elements to form a set of the elements, and providing access to the set for interactive manipulation by: replacing the first schematic with a second schematic containing a next element in the set, centering the view of the second schematic on the next element in the set; displaying the second schematic containing the next element in the set in a new schematic in a new canvas within the first canvas, or in another window, centering the view of the new schematic on the next element in the set; temporarily superimposing the next element in the set over the first element without otherwise altering the first schematic; or displaying the second schematic containing the next element in the set in a transparent overlay over the first schematic, centering the view of the second schematic on the next element in the set.

The method may be further include the steps of presenting a list of all elements in the set, allowing navigation to any one by selection from the list. The step of presenting the list may include the step of presenting a text-based list of elements, presenting the list comprises the step of presenting a branching structure of elements grouped together logically, presenting the list comprises the step of presenting a collection of graphical images identifying each of the elements, such as a collection of icons, and presenting the list comprises the step of presenting a spatially-oriented, radially-structured interactive graphical tool displaying all elements around the startpoint. Preferably, the first element and the next element are on the same canvas and/or the first element and the next element are coupled to a portion of the construct.

It should be appreciated that the present invention can be implemented and utilized in numerous ways, including without limitation as a process, an apparatus, a system, a device, a method for applications now known and later developed or a computer readable medium. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the drawings wherein:

FIG. 1A illustrates the information ecosystem in which the project team generates the construct of interlocking concepts that will become the software solution;

FIG. 1B illustrates the same information ecosystem, now framed in accordance with the subject disclosure;

FIG. 3 is an exemplary graphical user interface of a text table in accordance with the subject disclosure;

FIG. 4 is an exemplary graphical user interface of an actor description table in accordance with the subject disclosure;

FIG. 5 is an exemplary graphical user interface of a feature description table in accordance with the subject disclosure;

FIG. 6 is an exemplary graphical user interface having tables similar to FIGS. 3, 4, and 5, but with a selected item expanded to illustrate available options in accordance with the subject disclosure;

FIG. 25 is a task table showing dependency relationships in a table perspective in accordance with the subject technology.

FIGS. 34a-c show yet still further usage of disconnected control to resize a task set in accordance with the subject technology.

DETAILED DESCRIPTION OF PREFERRED EMBODIMENTS

Figure 1C:
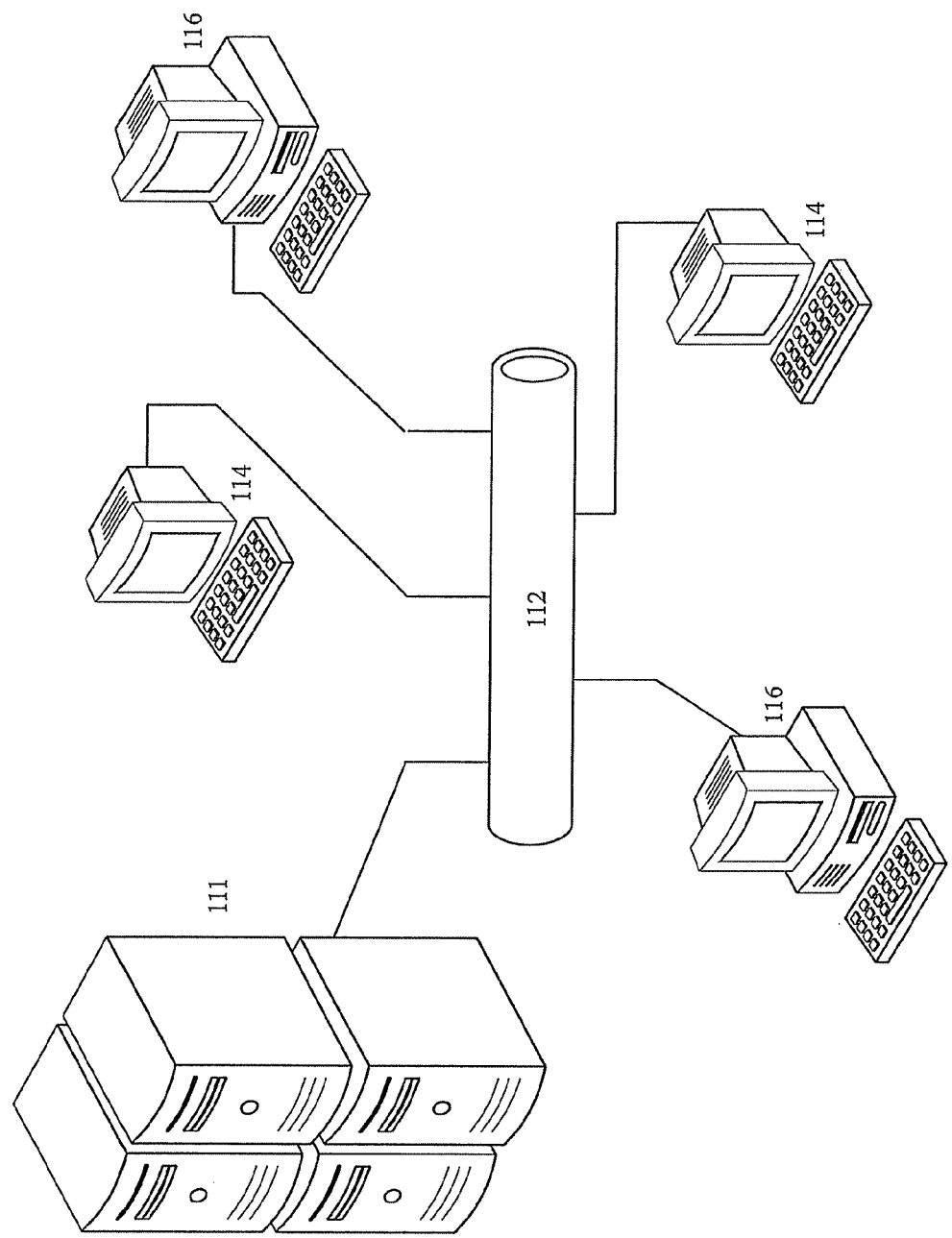
FIG. 1C is a block diagram showing the hardware components of a computing system simulating an information ecosystem in accordance with the subject disclosure.

The present invention overcomes many of the prior art problems associated with building complex, multi-layered structures. The advantages, and other features of the systems and methods disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Referring now to the FIG. 1C, there is shown in FIG. 1C a block diagram of an computing system 100 embodying and implementing the methodology of the present disclosure. The computing system 100 connects users (business analysts, programmers, end users, managers and the like) via a network 112. The following discussion describes the structure of such an computing system 100 but further discussion of the applications program and data modules that embody the methodology of the present invention is described elsewhere herein.

The computing system 100 includes one or more servers 111 which communicate with and by the network 112 across communication channels, whether wired or wireless, as is well known to those of ordinary skill in the pertinent art. In a preferred embodiment, the distributed computer network 112 is the Internet. For simplicity, one server 111 is shown. Server 111 hosts multiple Web sites and houses multiple databases necessary for the proper operation of the computing system 100 in accordance with the subject invention.

The server 111 is any of a number of servers known to those skilled in the art that are intended to be operably connected to a network so as to operably link to a plurality of clients 114, 116 via the distributed computer network 112. As illustration, the server 111 typically includes a central processing unit including one or more microprocessors, mechanisms and structures for performing I/O operations, a storage, and an operating system for execution on the central processing unit. The hard disk drive of the server may be used for storing data, client applications and the like utilized by client applications. The hard disk drives of the server 111 also are typically provided for purposes of booting and storing the operating system, other applications or systems that are to be executed on the server, paging and swapping between the hard disk and the RAM.

Distributed computer network 112 may include any number of network systems well known to those skilled in the art. For example, distributed computer network 112 may be a combination of local area networks (LAN), wide area networks (WAN), or intranets, as is well known. For the Internet, the preferred method of accessing information is the World Wide Web.

The computing system 100 also includes a plurality of computers or clients 114, 116 such as desktop computers, laptop computers, personal digital assistants, cellular telephones and the like. The clients 114, 116 allow users to access information on the server 111. For simplicity, only four clients 114, 116 are shown. The clients 114, 116 are any device now known and later developed. Typically, clients 114, 116 have displays and an input device(s) as would be appreciated by those of ordinary skill in the pertinent art. Although a simplified diagram is illustrated in FIG. 1 such illustration shall not be construed as limiting the present invention to the illustrated embodiment.

Clients 114 typically provide non-technical users access to the simulation model whereas clients 116 are illustrated differently to indicate work stations for technical users. It will be recognized by those of ordinary skill in the art that the hardware of the server 111 and clients 114, 116 would often all be interchangeable. Of course, a plurality of users can utilize the computing system 100 simultaneously via the clients 114, 116.

In brief overview, as software is a construct of interlocking concepts, a description of the software itself, i.e., the specification, may also be represented as a conceptual construct of interlocking parts. The computing system 100 represents software as a conceptual construct of interlocking concepts. Within the computing system 100, there are specialized tools designed specifically for the needs of project team members charged with creating and managing information in that aspect of the construct. Each project team member can then maintain and update their aspect of the construct while automatically affecting only the intersect points with other aspects and while doing their day-to-day tasks. This overcomes the inherent difficulties of describing such a construct as text in a specifications document.

In the computing system 100, a user can construct and maintain the simulation model or conceptual construct of interlocking concepts. Inside the simulation model, requirements can manifest themselves from all the acceptable perspectives of the various members of the project team. Perspectives may include but not be limited to text statements of requirements, screen design, screen layout, navigation, workflow, hardware deployment, network configuration, data packages, data communications, program logic, system configuration, project management, resource allocation, task scheduling and the like.

The capture and construction of perspectives can begin during the most rigorous and consequential discussion of requirements which happens during procurement. In the beginning, early members of the project team (i.e., those tasked with capturing requirements or even earlier, or those tasked with creating the RFP/RFQ) can begin to construct a prototype simulation of the software construct within the computing system 100.

The simulation model is not the software construct itself, but the requirements and the knowledge needed to build the construct. This knowledge is built and displayed from the variety of perspectives within the project team, constructed and managed by specific team members according to their core competency. Every aspect of the software construct, from the pixel width of a UI button, to the name of a table column in a database, is represented as data and relationships within the simulation model. Version control and edit history may be maintained for the simulation model, so that all changes can be tracked and verified.

In one aspect, the simulation model is an enormous and complex database specifying every aspect of a software system. Indeed, final, compiled, deployed software itself is one example of the software construct being successfully represented from one particular perspective, although that aspect is not represented in the model. Using proper techniques of simulation, data representation, and code interpretation disclosed herein, it is possible to represent the software construct in a more compact form. Once assembled, the software construct is visualized within the simulation model.

Requirements and specifications are roughly separated into two main categories. First, there are those requirements that comprise elements such as descriptions of UI screens, text descriptions of requirements, and business processes. These can be viewed as specifications that may require a specialist to build, but do not require a specialist to ascertain or to document. For example: the system shall allow the user to view his invoices from all of his accounts; 2) the client will host and be responsible for the system of record; or 3) the system will accommodate both French and German users. These types of requirements have been called business requirements, human-centric requirements, and front-end requirements, among others.

Second, there are those requirements that comprise elements such as systems, networks, platforms, hardware, and technical descriptions of issues and would require a specialist to ascertain and evaluate. For example: 1) the production system is a cluster of Websphere application Servers fed by a cluster of SSL-enabled Web servers, wherein the Websphere application will also manage the load balancing; 2) An SSL-accelerated content switch will distribute the traffic across the available Web servers; or 3) the file is a Fixed length ASCII text file with the ISO-8859-1 Character set, with the Record separators CR and /LF. These types of requirements have been called technical requirements, system-centric requirements, and back-end requirements, among others. The computing system 100 manages the entire range of requirements and statements about the software construct.

The Canvas Window

Figure 2A:
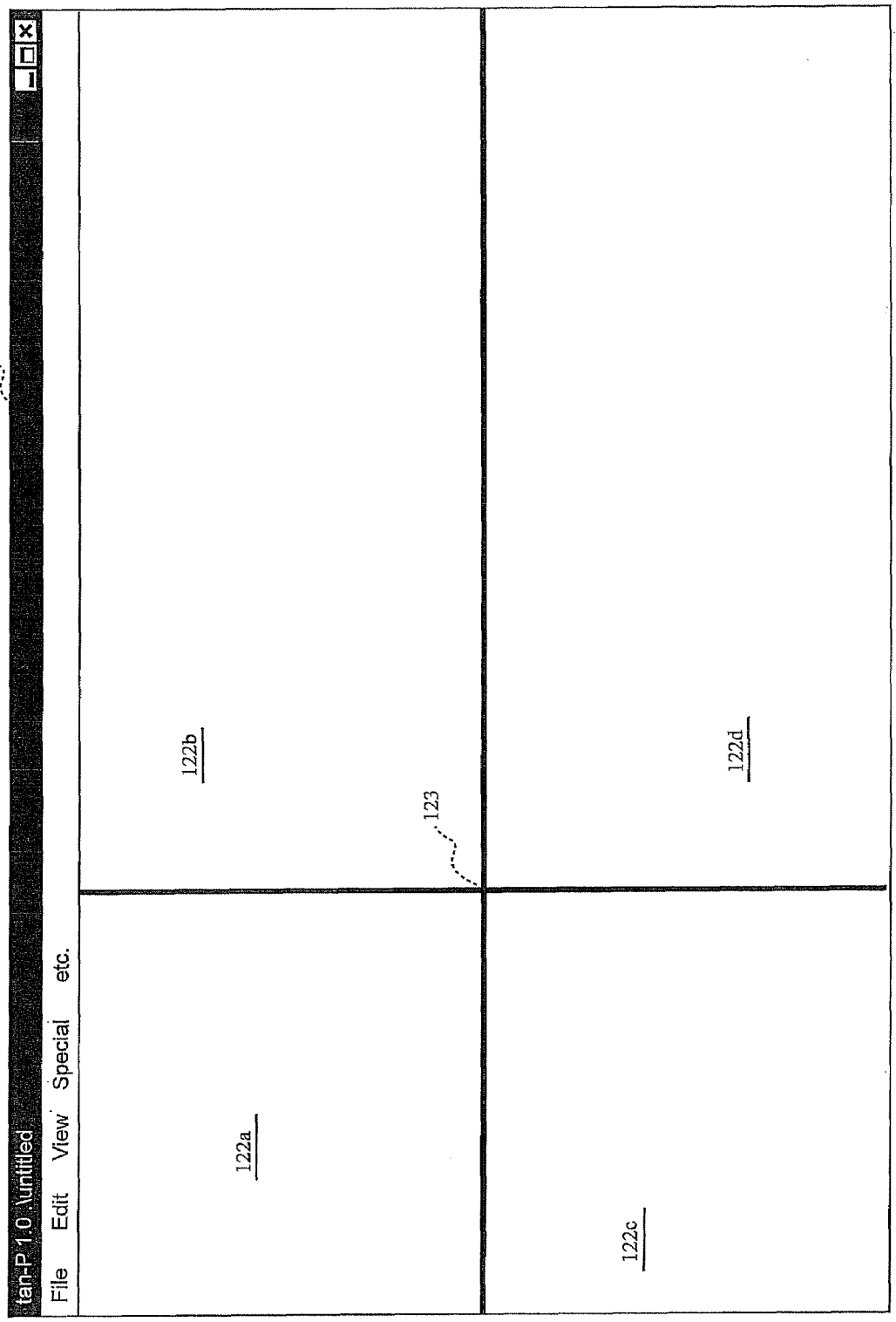
FIG. 2a is an exemplary graphical user interface of a standard four canvas window with each canvas being blank in accordance with the subject disclosure.

Referring now to FIG. 2a, an exemplary graphical user interface of the standard canvas window is shown and referred to generally by the reference numeral 120. The canvas window or work area 120 within the computing system 100 is a series of canvases 122a-d. The intersection 123 can be dragged horizontally and vertically to enable different size areas of the canvases 122a-d. Also, additional canvases 122a-d may be displayed or any single canvas can dominate and take up the whole work area 120. Each canvas 122a-d is a place where any one of the perspectives defining and displaying the software construct may be built modified and managed by one or more members of the "project team." The canvases 122a-d are completely interchangeable, in that any one can display any of the perspectives, or multiple views of the same perspective.

Figure 2B:
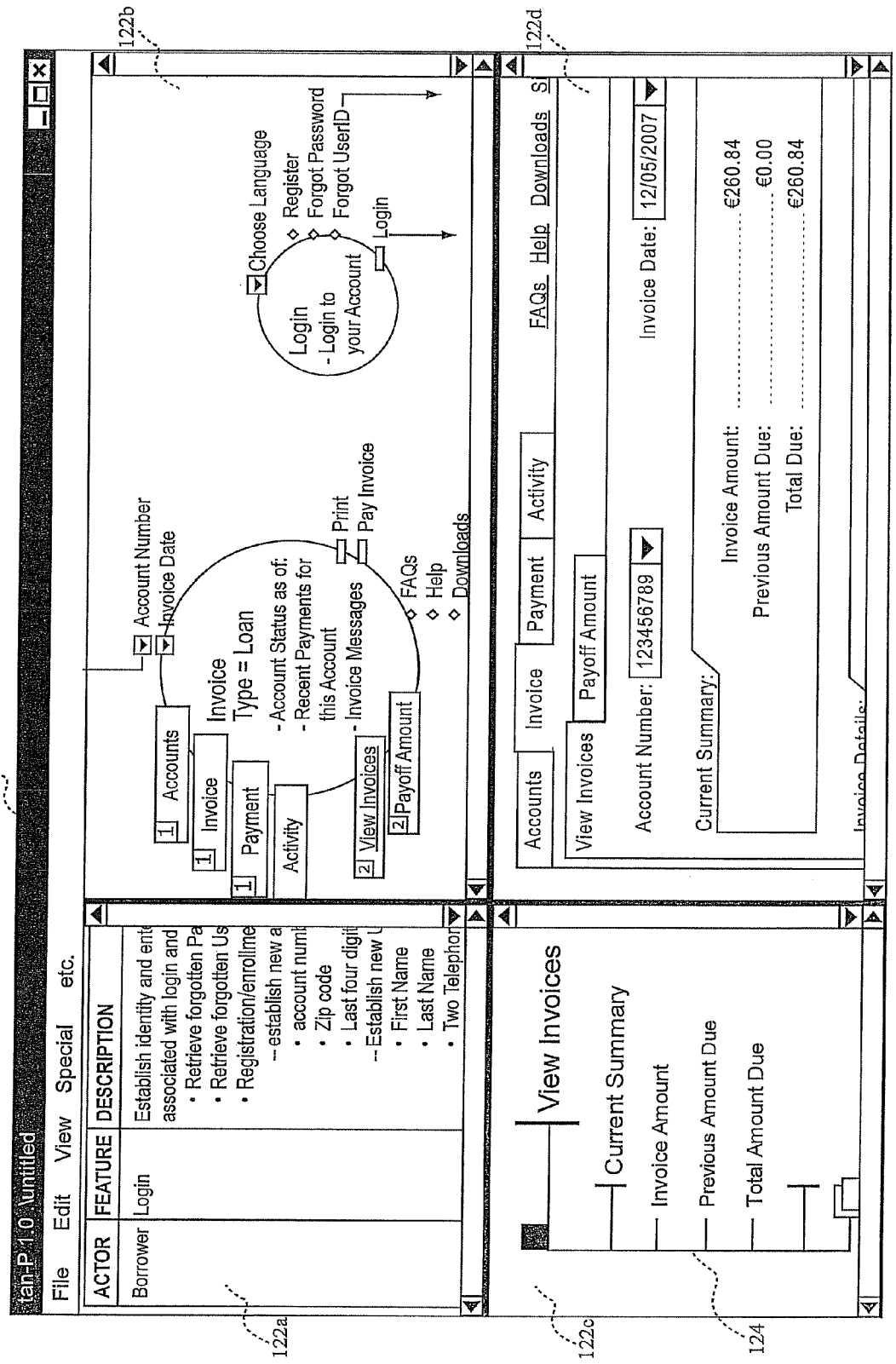
FIG. 2b is an exemplary graphical user interface of a four canvas window with each canvas having a different perspective in accordance with the subject disclosure.

A canvas window 120 is shown in FIG. 2b with the canvases 122a-d showing four different perspectives including the data perspective in 122c. In contrast, traditionally, requirements are contained and managed in a formal text document which may contain graphics, schemas and tables. The document is a statement of the current state of the team's understanding of the software construct. Early in the life of the project, requirements may be in several documents from different divisions within a client's enterprise. Although the simulation model may be built from any perspective, in any order, and later reconciled, one common approach will be described here, beginning with text descriptions of high-level business and high-level system requirements. How the simulation model is constructed and which perspectives are included is only limited by the resources available to the project team at any point in the project lifecycle.

Referring to FIG. 3, text for a sample statement of work has been entered in a text canvas 126 as a single column list. Alternatively, text may be entered in a table 128, 130 as shown in FIG. 4 or 5, respectively. Table 128 of FIG. 4 is an actor description table and table 130 of FIG. 5 is a feature description table.

Generally, tables contain descriptions of aspects of the software construct in a single conventional form, e.g., text. But these text identifiers or descriptions may manifest themselves in various other forms through out the construct. For example, the word Login 138 in FIG. 5 is shown in conventional text form. However Login may also be the name of a screen 154 of FIG. 7; or it may be the name of a data package 141 of FIG. 7. The words Forgot Password 152 of FIG. 6 may be yet another screen, as well as a hyperlink 143 of FIG. 7 in yet another screen. Each of those perspectives looks different inside the software construct and so will look different inside the simulation model. Each perspective type has its own associated set of simple tools with which simple models can be constructed from that perspective. For example, user interface requirements may be captured and displayed as a series of simple storyboards such as 154 of FIG. 7 or 183 of FIG. 9a.

Figure 7:
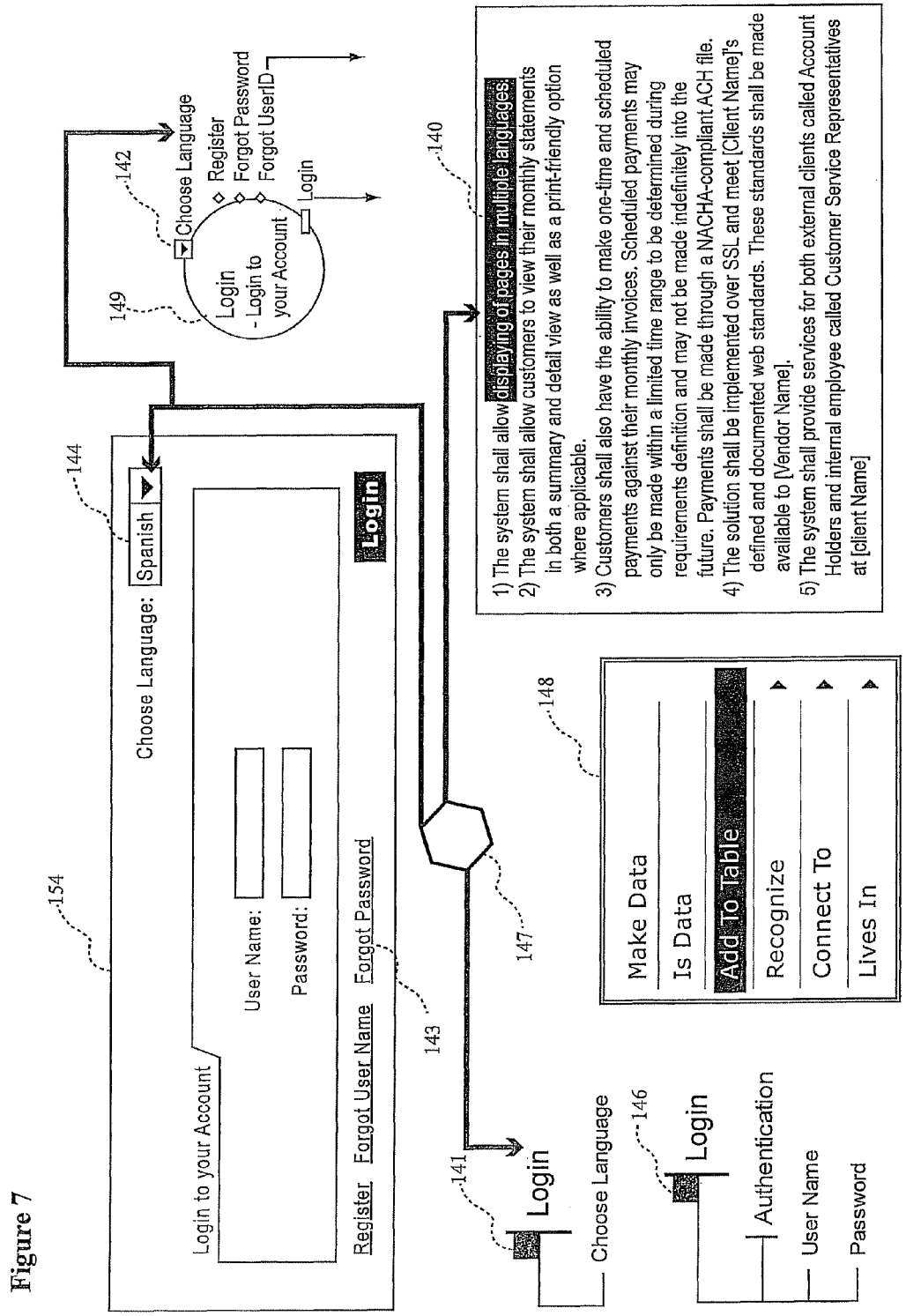
FIG. 7 is an exemplary graphical user interface illustrating several different perspectives of "login" elements in accordance with the subject disclosure.
Figure 9A:
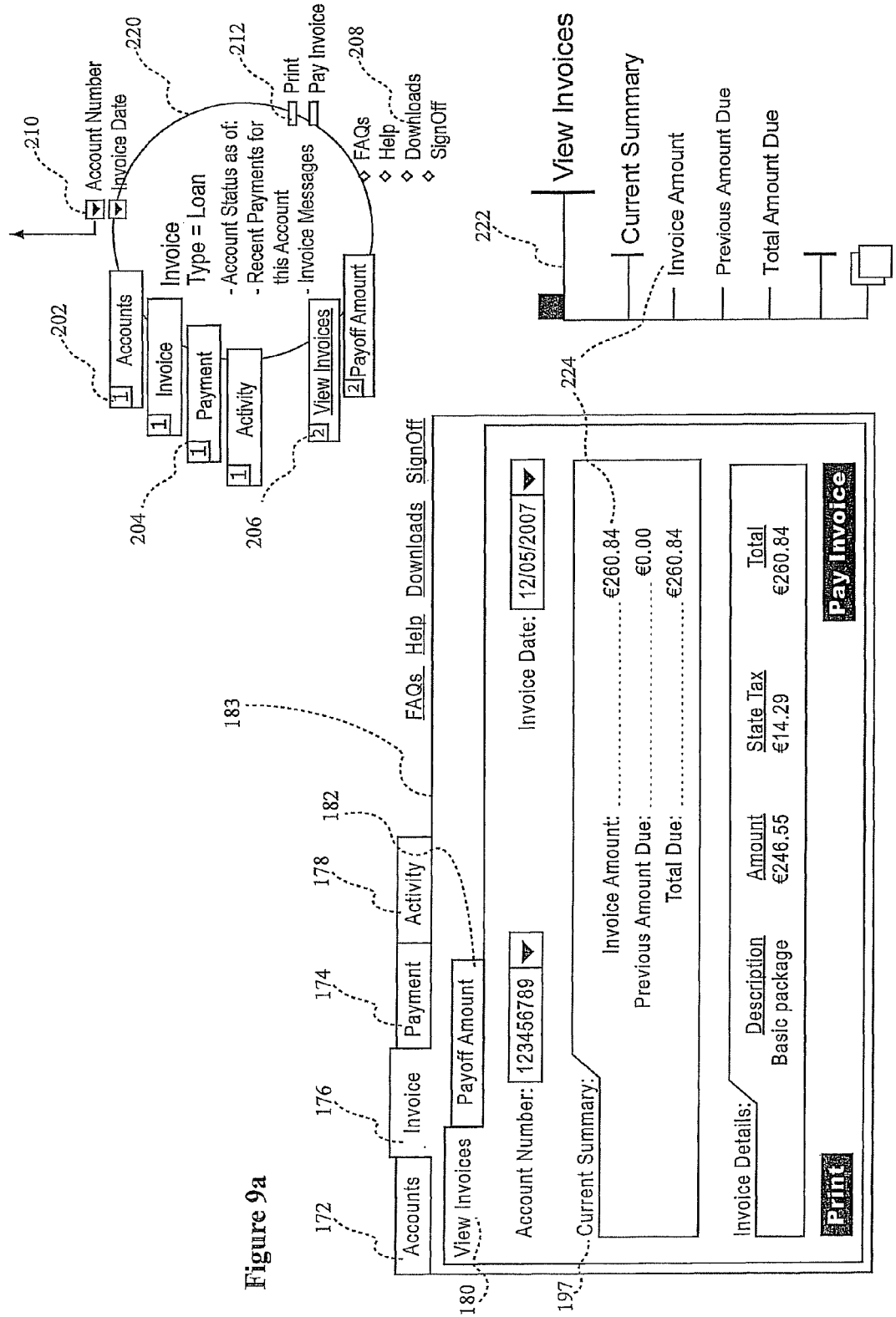
FIG. 9 is an exemplary graphical user interface illustrating several different perspectives of "invoicing" elements in accordance with the subject disclosure.

User interface requirements may alternatively be represented as an interactive schema such as 149 of FIG. 7 and 220 of FIG. 9a, or as text. Each of these perspectives may be constructed independently, and then be reconciled, or be made to drive the creation of one another. Since these perspectives may describe common attributes, as well as, unique-to-the-perspective attributes of the same concept, there is a need for reconciliation which is the process of ensuring any conflicts in the descriptions of the common attributes are resolved.

In FIG. 4, the actor description table 128 is a two-column, n-row table that describes the people directly interacting with the final software through some user interface. Table 128 represents an example with two actor types. In FIG. 5, the Feature Description Table 130 is a three-column, n-row table containing three columns.

Column 132 of FIG. 5 is for Actor, which is virtually someone who is described in the Actor Description Table. Column 134 of FIG. 5 shows Feature, which names a feature to be used by the particular actor to help achieve a goal or several goals described in the Actor Description Table 128 of FIG. 4. In this example, the features were recorded in descending rows according to a possible user experience scenario, i.e., login first, then whatever screen displays after login next, and so on. Features can be recorded in any order. Column 136 of FIG. 5 is for Description, which is a description of the feature named in the feature column 134 of FIG. 5. In the computing system 100, the description can be used to build the elements that will become the simulation model of the software construct.

During a discussion of any aspect of the construct, operators using the computing system 100 may write text or create schematics composed of formal elements using the specialized tools in the various canvases. For example, the need for a system to display in multiple languages may manifest itself in three canvases in three different ways: i) as text 140 of FIG. 6 in a text canvas 140 in FIG. 6; ii) as a drop-down symbol 142 in the interactive scheme perspective in FIG. 7; or iii) as a drop-down menu 144 in a user interface storyboard in FIG. 7. Furthermore, the data package implied in the choice of languages itself may be drawn in the data canvas such as 122c of FIG. 2b, and manifest that perspective in the data package 141 of FIG. 7.

The computing system 100 contains a series of canvases four of which are shown in FIGS. 2a and 2b. Each canvas contains a perspective; a perspective is constructed using specific visual elements designed for the needs of that particular perspective. An element is an interactive graphical representation of some aspect of the software entity, i.e., a piece of the construct of interlocking concepts. The element is able to visually contain some or many or all of the attributes associated with an aspect of the construct, in a form that allows for the expanding or collapsing of the visible details.

However, the canvases are not bound to show only one perspective. Any canvas can only show one perspective at a time, but that perspective could be any one of the entire range available in the computing system 100. So a data canvas may appear within any one of the canvases. That canvas is then displaying the software entity from the data perspective. Now any other perspective may be loaded into that canvas. It will then replace the data perspective and show the newly loaded perspective. The drop-down menu 144 in FIG. 7 happens to be showing the requirement to support multiple languages from one UI perspective. Data package 141 of FIG. 7 is showing that same thing from the data perspective and item 140 of FIG. 7 is showing that same requirement declared in conventional plain text.

There is a relationship between the text canvas 140 of FIG. 7, the drop-down symbol 142 of FIG. 7, the drop-down menu 144 of FIG. 7, and the login data package 141 of FIG. 7 that manifests itself in many ways through out the software construct. That relationship can be viewed thus: the customer needs the vendor to build a feature into the enterprise software solution that allows users to see the enterprise solution in more than one language. This need is referred to as a requirement in the conventional documentation created by both the vendor and the customer. It may look like a statement as shown in item 140 of FIG. 7. That is a declaration of a business need in text form.

The vendor's understanding of that need may be shown as a drop-down menu called "Choose Language" in the mock-up or storyboard of a possible login screen such as 154 of FIG. 7 that may be presented to the customer to show both the vendors understanding of the requirement and also achieve the customer's approval of this method of satisfying the requirement. Once the final enterprise solution is launched, a user can choose a language from that drop-down. This choice creates a request into the software system to display a different language to which the system responds by facilitating the change in display language.

Today, as requirements are currently managed, each aspect of that requirement exists either in separate documents or in the same document, but the relationship between those different perspectives as described above is only implied in the knowledge of the team members and has to be managed by the team members. The relationship is only constructed in the final software system itself. In the computing system 100 the relationship is constructed within the simulation model as various perspectives drive the creation of other perspectives without the need to build the software system itself.

In the computing system 100, every time an element in a given perspective is constructed using an element in a previously defined other perspective, a link is made between those elements and thus between those perspectives. The action is called coupling and is described later as a binding between an element and a portion of the simulation. This link in a physical, explicit, trackable way shows the relationship between these elements and the requirements they represent.

In traditional specification descriptions in text or graphic form within current documentation metaphors, the relationship is implied only in the existence of the record in the documentation. It may also be implied and enforced by a hyperlink or cross-reference between the two records in the document.

In contrast, the computing system 100 creates a relationship that exists through out the simulation model and may be made visible through user interaction. The relationship or jump relationship can be displayed and it can be annotated. For example, item 147 of FIG. 7 shows the relationship between the elements that describe the requirement for multiple languages.

Once the jump relationship is established, a record is kept which allows the user of computing system 100 to jump from one perspective to another or display all at once in several canvases.

The jump relationship is different from a hyperlink in the user experience. A hyper link is a unidirectional navigational tool. To go back to the starting point, another hyperlink is required. The existence of a hyperlink may or may not imply a relationship other than the hyperlink itself. The jump relationship is a single entity that allows multi-directional jumps from perspective to perspective and back again.

The canvases (and elements and perspectives therein) are tightly coupled with or without the ability to jump from one to another. The canvases are in a sense, different views of the same thing. The jump relationship, in conjunction with the canvases, therefore contains the ability to view multiple dimensions of the same concept, within a two-dimensional space.

Users of the application may begin from any perspective. That means a user may begin to write text descriptions in a text canvas, or draw storyboards or schematics in a storyboard canvas. In any case, a canvas element from one perspective is used to construct itself from another perspective. So the computing system 100 allows the user to begin with a text description, or a storyboard, or a technical schematic and use each one to construct the concept in other perspectives.

In this way, when an element is removed from a canvas, the element may remove data, modify data, or have no effect on the rest of the simulation model at all. The process of binding an element to a portion of the simulation model is referred to as coupling. Once an element is coupled to a portion of the simulation model, the interactive components of the element may be used to modify its other manifestations within the rest of the simulation model. Using the earlier example of the Retrieve Forgotten Password requirement shown in the text declaration 152 in FIG. 6 and as the hyperlink 143 in FIG. 7, if the two elements are coupled to the same "Link name" attribute within the simulation model, and any one of those elements in any perspective is used to change the name, the other elements are updated so the respective visual display reflects the change. Alternatively, different names may also be used. In this case the text Retrieve Forgotten Password in 152 of FIG. 6 is shown as a hyperlink called "Forgot Password" in the user interface storyboard 154 of FIG. 7.

This is also an example of how reconciliation works between the perspectives. For example upon creation the link may be called forgotten password. When the name is changed to forgot password, some user interface convention such as a star appearing next to the discontinuous item shows it to be different from its source item or from other items within the jump relationship. Using the jump relationships an operator may travel from perspective to perspective and either accept the discontinuity, or correct it, or annotate it as a known but unresolved/unreconciled discontinuity.

The computing system 100 allows the organization and display of multi-layered, multi dimensional information, within discipline specific canvases that contain discipline specific visual elements. The discipline specific visual elements allow the manipulation of the simulation model by subject matter experts within an environment and using tools designed specifically for their area of expertise.

The attributes of the same concept are not the same in each canvas, but each perspective will show only attributes that are important to the respective part of the simulation model. In this way information may be stored in rich detail, but this detail is dispersed and allowed to be displayed and absorbed within the respective canvases and their contained perspectives.

At the same time, each canvas can provide contextual information about another canvas. For example, as in FIG. 6, an operator can use text in any of its previously described forms to create a simple user interface storyboard. The task is accomplished using nothing but simple drag-and-drop and other well-understood software interactivity conventions. For example, an operator may declare any item named in the Feature column 134 of FIG. 5 as a page or a screen, for example item 139, Invoice, in FIG. 5 may be made into a page such as 183 in FIG. 9a. As a result, a page is created in the user interface perspective. Using trivial software user interface conventions, the operator can then select any piece of text, and for example, right-click to reveal a drop-down such as 150 in FIG. 6, from which the operator can choose the other perspectives to be constructed, such as the user interface perspective. For example, by declaring that the "Forgotten Password" text 152 in FIG. 6 is a link on a page, "Forgotten Password" will appear as a link on a page in other perspectives.

In this way, a link for the requirement "Forgotten Password" is created in the Login Page 154 of FIG. 7 in the User interface perspective. Now, the text can be changed in the user interface to say "Forgot Password", as shown in item 143 of FIG. 7, but the information link or dependency between the two perspectives is declared and can be utilized and displayed as another part of the simulation model. The elements in the different perspectives can also be decoupled and re-coupled if necessary, so that changes can be made independently by different operators and later reconciled as described earlier.

The Invoice Screen 183 in FIG. 9a is composed of elements made from a series of textual declarations in the description column 136 of FIG. 5 as described. However, the invoice screen in the user interface perspective may also be created using simple drag-and-drop tools inside the user interface canvas.

User Interface Artifacts

Figure 8:
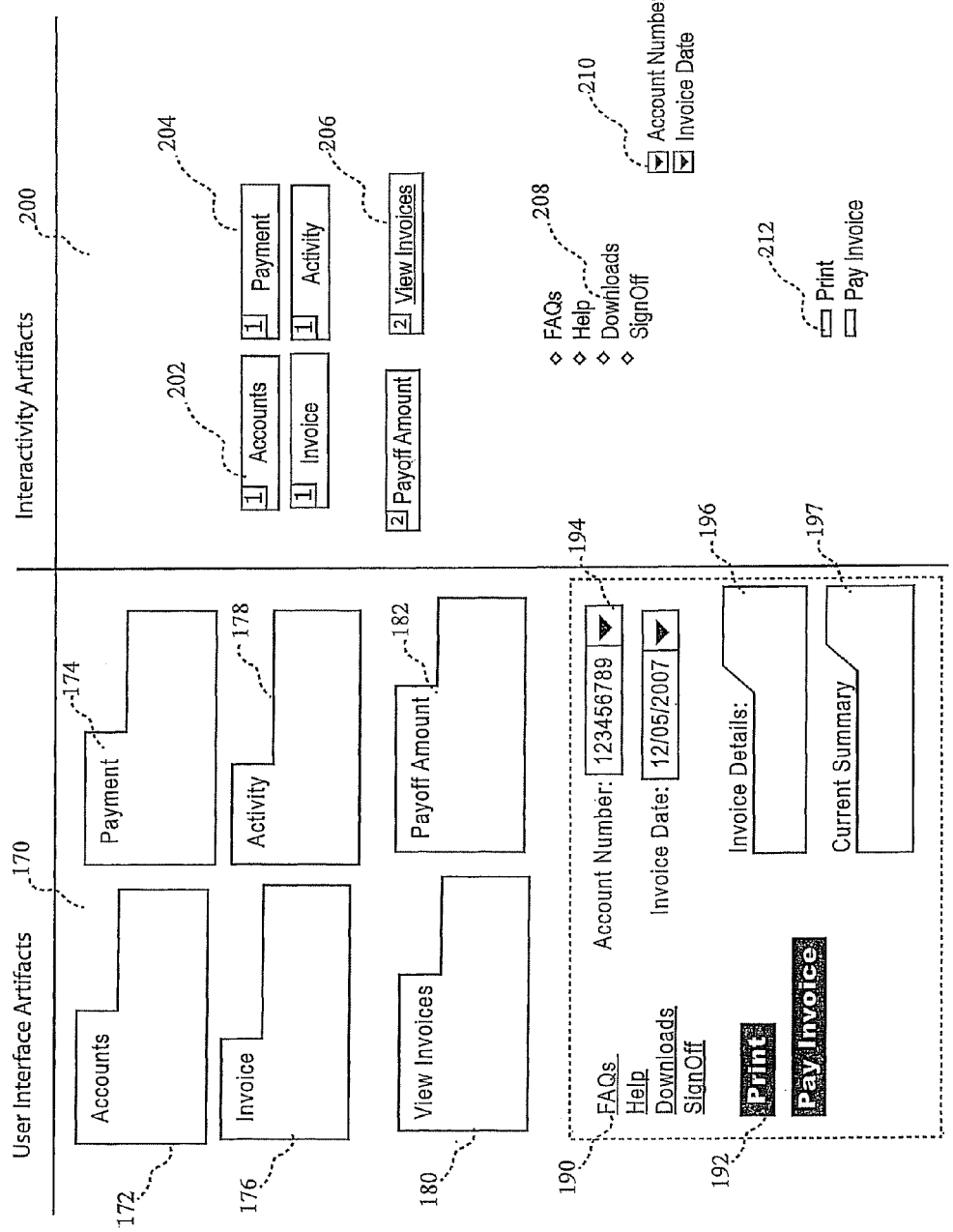
FIG. 8 is an exemplary graphical user interface illustrating artifacts used to compose a graphical user interface perspective of FIG. 7.

Referring now to FIG. 8, the components of the Invoice screen in disassembled form are shown. The entire range of UI artifacts that make up an enterprise software screen is a finite and well-known set. A screen canvas such as 122d in FIG. 2b allows the assembly of simple storyboards using a set of artifacts such as the ones in column 170 in FIG. 8. Items 172, 176, 174, 178, 180, and 182 are tabs. Each tab represents a screen in an application or a page in a website. Continuing on the same theme, in FIG. 8, item 190 is a hyperlink to FAQ and represents a declared requirement that accommodations be made for display of frequently asked questions (creating the hyperlink also creates the implicit destination page for the hyperlink which will contain Frequently asked questions; this is not shown). Item 192 in FIG. 8 is a button for invoking the print functionality and represents a declared requirement that the invoice page be printable. Item 194 in FIG. 8 is a drop-down menu and represents a declared requirement for the final system to display other account numbers in case there are multiple accounts. Items 196 and 197 in FIG. 8 are placeholders for the presentation of static or dynamic content. Item 197 also appears in FIG. 9a in the interactive user interface storyboard 183.

For any experienced enterprise software engineer, implicit in item 197 is the data package 222 and its attribute 224 Invoice amount. In this way the data perspective can emerge and be created both from text declarations or user interface storyboards. Further implicit in the data packages is the source of the data and a place where it is stored and the database integration work that will allow the data to be displayed within the "Current Summary" placeholder 197. That perspective is not shown, but is referred to here in to show how simple declarations can be turned into the simulation model that contains the pieces of the construct of interlocking concepts.

Figure 9B:
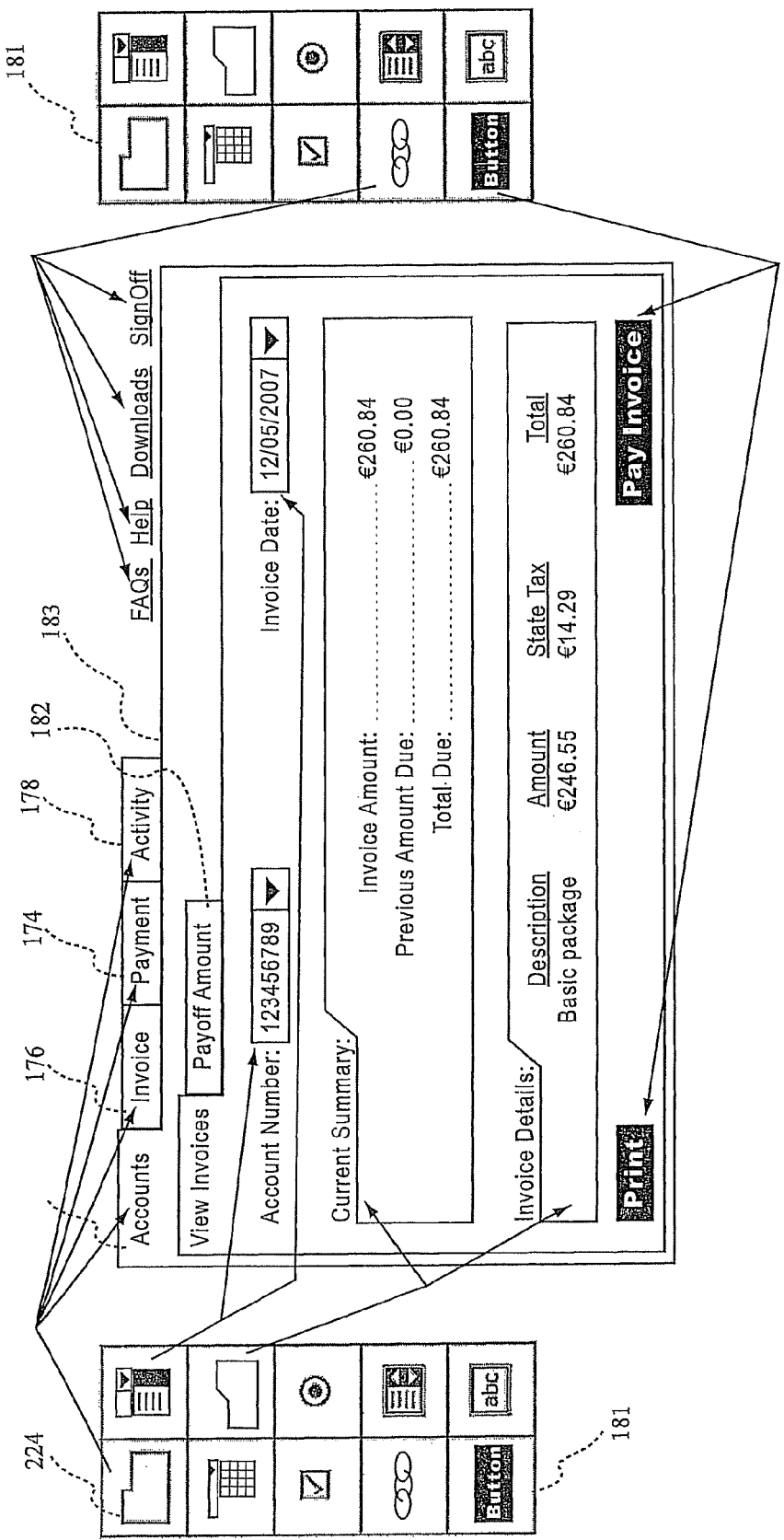

With a simple set of user interface conventions such as the tool palette item 181 in FIG. 9b, and by using drag and drop, all the elements in FIG. 8 can then be assembled to create a complex interactive interface such as the one in 9b. As has been shown before, these elements can also be created independently from simple text descriptions as in column 136 in FIG. 5 and assembled using the same simple methods. The other way is also possible, so that the names of the items in FIG. 9b may be used to create text descriptions or other elements such as data packages and so on. In this way a prototype of the screens and interactive interface of the software entity can be assembled and presented without any additional skills such as knowledge of HTML, or JAVASCRIPT or skill with specialized user interface tools.

This interactive prototype can then become an index for a whole host of coupled and decoupled elements such as data packages, system components, task descriptions among many others. For example, the concept Invoice amount item 224 in FIG. 9a is shown as dynamic content inside the View Invoice tab 180 of FIG. 9a and also as an attribute of the data package View Invoices 222 also in FIG. 9a. All the other perspectives in the other canvases can work in the same way.

For example, FIG. 2b shows the interactive schematic perspective 122b. The elements in column 200 of FIG. 8 show the elements that allow the construction of this perspective of the invoice page which is item 220 in FIG. 9a.

The only other place where such relationships are made is inside the software construct itself within the code. The perspectives and relationships in the simulation model are easy to construct, but can contain all the complexity of information required to understand and specify the software in a simple descriptive form. Just as item 141, and 146 of FIG. 7 show a schematic representation of a data package, other aspects of the software construct including the project that will lead to creation of the data package, may also be represented by simple elements and schematics that will contain the necessary depth and richness of information but be simple to construct as shown. We will discuss the technical schematic in more detail below The Technical Schematic The technical perspective is shown through the technical schematic in FIGS. 10 to 13 and is used to describe all the technical details of the project from different technical perspectives. The technical schematic is used to describe the software, the computing infrastructure, the partnerships, and the services that comprise the technical aspects of the construct of interlocking concepts. The technical schematic is not shown in FIG. 2b but it can occupy a canvas just like all the other perspective, for example in FIG. 13 the technical schematic occupies canvas 122b while 122a and 122c are empty and in FIG. 10 the technical canvas occupies the entire computing system window. The canvas tools in the technical schematic are designed around the needs of specialists such as application architects, systems architects, system and network administrators, and IT management.

Once generated, the technical schematic shown in FIGS. 10 through 13 may be viewed and updated by a wider audience. By providing a common and consistent visual framework based on the common features inherent in all computing environments, and by bringing together elements from a number of technical disciplines, the technical schematic allows the technical members of the project team to discuss disparate technologies and share their expertise. Experts may record details that are specific to actual implementation technologies within a shared context.

Passing Between High and Low Levels

As noted above, a textual description can be turned into screen, or a feature on a screen, or a user interface artifact. In the technical schematic, the other descriptions find their technical manifestation. Here, business requirements, declared as text statements such as shown in the tables 126, 128, 130 of FIGS. 3, 4 and 5, respectively, can be traced to their implementation state, i.e., references to actual lines of code as shown in items 290, 292, and 294 in FIG. 13.

Figure 13:
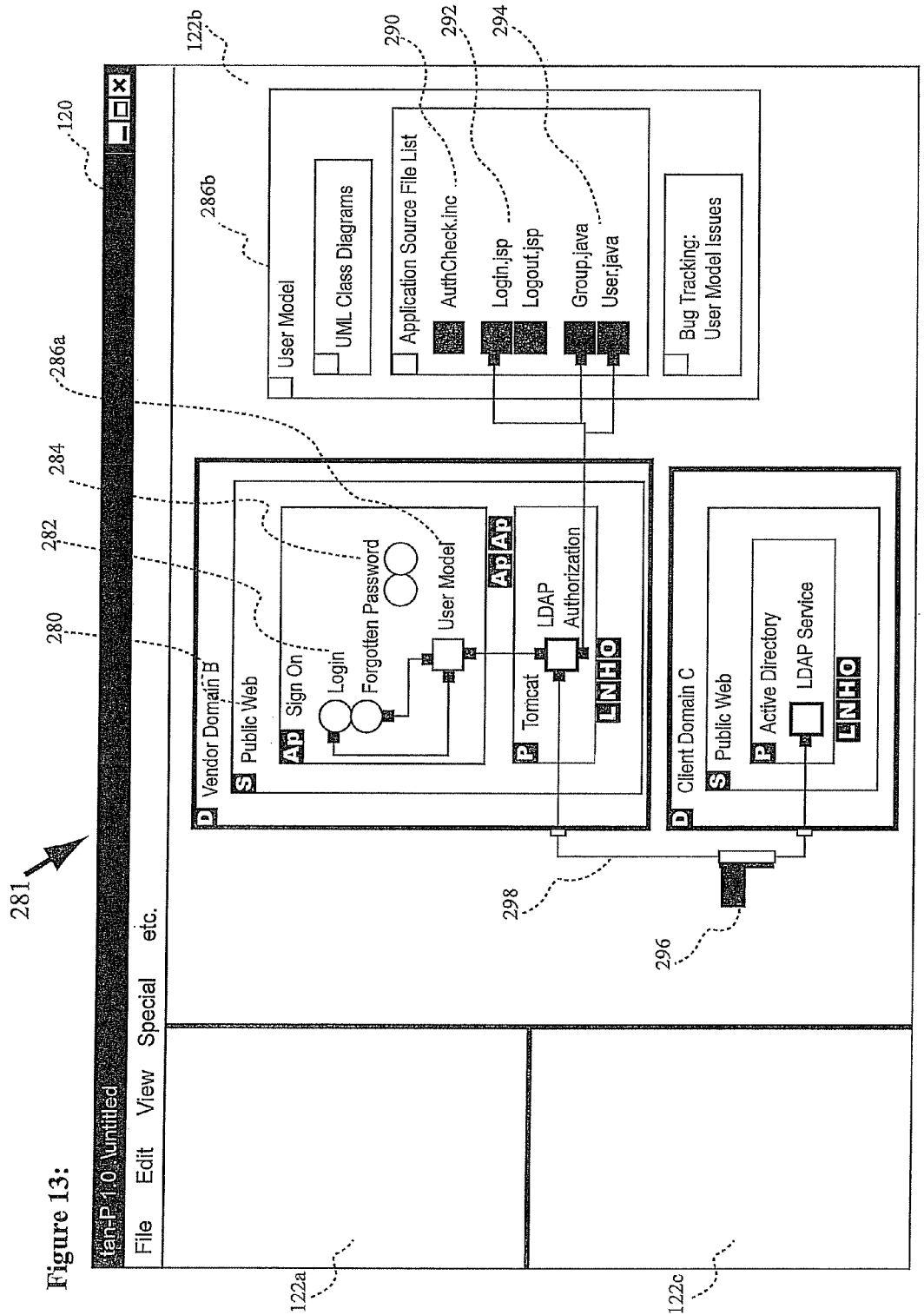
FIG. 13 is still another example of a technical schematic in accordance with the subject disclosure.

In FIG. 13, items 290, 292, and 294 represent lines of code used to implement the Retrieve Forgotten Password feature. Further, any user can at any point go from high-level concepts to low level details using simple and well-known software interactive conventions such as clicking, dragging, and zooming.

Domain and Systems Elements of the Technical Schematic

Figure 10:
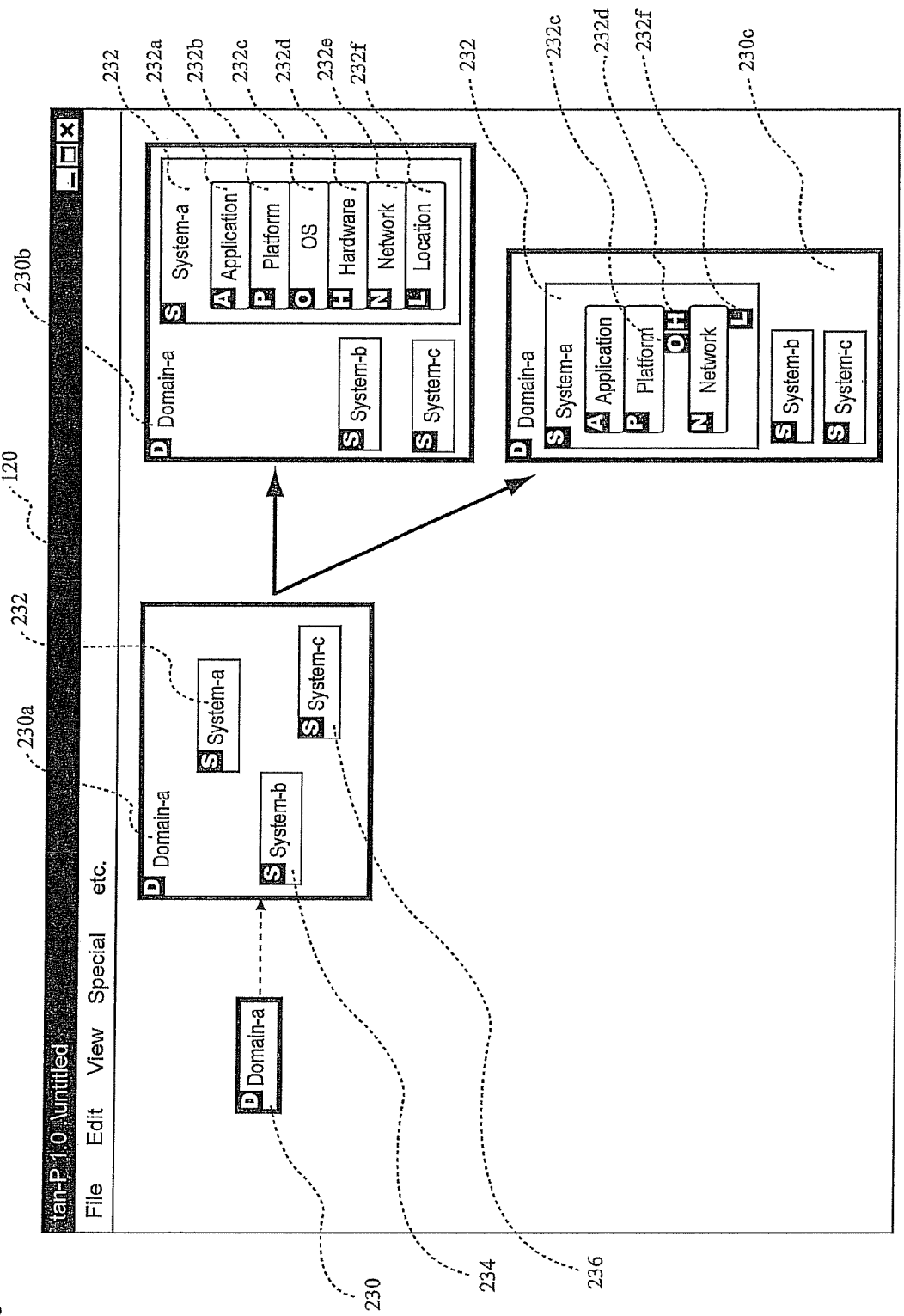
FIG. 10 is an example of a technical schematic in accordance with the subject disclosure.

Referring now to FIG. 10, an example of a technical schematic is shown. Two basic high level elements are used in the technical schematic, domains such as item 230 in FIG. 10, and systems such as 232, 234, and 236 in FIG. 10. Like all other visual elements within the simulation model, domain and system elements and their contents can be expanded and contracted to expose or hide levels of detail. A domain element such as 230 in FIG. 10 represents some organization, business unit, or even person. As such, a domain element represents a collection of knowledge and general or proprietary expertise, boundaries of responsibility, as well as, boundaries of ownership. Most enterprise software projects involve many organizational entities: clients, vendors, or financial institutions, each of which may be represented as a domain element. When expanded, a domain element shows the technical system elements that exist therewithin.

In FIG. 10, an example of drilling down to uncover additional information is shown. Domain element $230^1$ may be expanded to show systems a, b, and c as in 232, 234, 236, respectively. System-a 232 in FIG. 10 may be further expanded to show component layer 232a through layer 232f.

Interim states also exist. For example, the Hardware (H) layer 232d and Operating System (O) layer 232c in FIG. 10 are collapsed in one view of system 232, while the layer 232a and layer 232b above them are not. Domain and system elements may be added to the canvas with a mouse-click, key-press, drag-and-drop, menu selection, or similar, simple, conventional effort. System elements may be placed within a domain element in order to describe ownership of, or responsibility for, the system element.

Layers

A technical system element is a representation of a physical piece of computer hardware, as well as, the network hardware that supports the system element, and the software that runs on the computer hardware. When expanded, technical system elements are represented in a stacked layer model that is appropriate to the technical system being represented. For example, in the fully expanded view system element 232 in FIG. 10 represents a web application server that contains the layers Application 232a, Platform 232b, Operating System 232c, Hardware 232d, Network 232e, and Location 232f.

Referring back to FIG. 10, in a conventional system, the top three layers Application 232a, Platform 232b and Operating System 232c are often referred to as the "environment." The bottom three layers Hardware 232d, Network 232e, and Location 232f are often referred to as the "infrastructure". The computing system 100 does not use these terms because some ambiguity exists in the field regarding their meaning. Instead, the computing system 100 uses this layer model, and allows for different sets of layers as appropriate to the technologies being used and the preferred semantics of the IT experts involved. Regardless of the exact set(s) of layers, each layer may be expanded or contracted as described before to provide increasing levels of detail. For example in FIG. 11, the domain element 246 is represented in expanded form to reveal four systems Common Storage Area 247, Legacy Mainframe 249, Public Email 251, and Public Web 253. Staying in FIG. 11, the domain element 240 is expanded to reveal two additional domains 252 and 254; in this way, domain elements may be placed within other domain elements in order to describe hierarchical structures, such as subsidiaries, divisions, or even org-charts.

Stacks and Clusters

In addition, system and domain elements may also be represented as a "stack" where many elements with similar characteristics appear as a single element. For example, a system architect working on a schematic to describe how a given set of systems will interact with five banking partners may wish to collapse those five bank domains into a single domain element called "Banks" as shown in domain element 248 in FIG. 11. By drilling down, domain element 240 in FIG. 11 can be expanded to show expanded domain element 240*a* in FIG. 11. Similarly, system clusters can be visually represented in a simple fashion when the details of the clustering infrastructure are best minimized away from view.

The technical details of individual systems will differ based on the type of system being represented. For example, the technical specification details appropriate to a fleet of wireless-networked laptops running Windows Vista will be quite different from the technical specification details for a clustered server farm at a NOC. Within the technical schematic of the computing system 100, however, all of the individual systems may be represented.

Using expandable domain and system elements as a starting point, technical specialists can accumulate all the information that is conventionally spread out over disparate sources, ranging from text documents, to UML class diagrams, to network topology schematics, all in one location, within one representation, namely, the simulation model.

Referring to FIG. 10, a canvas shows a simple domain element 230 that contains three systems 233, 234, 236. Within the canvas of FIG. 10, a user may expand and contract the domain element 230 to version 230*a*, 230*b*, 230*c*, move the three systems 233, 234, 236 around within the domain element 230 as desired, and expand and contract not only the systems 233, 234, 236 but also layers within the systems 233, 234, 236 as shown in the other drilled down domain elements 230*b*, 230*c*. Using a system canvas, a technical specialist may create hierarchies of domains, or place systems within domains with a trivial effort, such as drag-and-drop.

Technical Schematic, Expanded

A system schematic perspective is a compilation of domain elements and system elements that form another perspective in the conceptual construct. The system schematic perspective is useful for system architects to compose the supporting hardware that is required to host or run the ultimate software product.

The system schematic perspective is also useful for technical specialists to work with business specialists to ensure that all business requirements are represented within the conceptual construct. As outlined above with respect to FIG. 5, requirements may be represented in text form and may be directly referenced by the various elements in an interactive system schematic perspective or other perspective that fulfills those requirements. Indeed as shown above for user interface representations, the system elements in the interactive system schematic perspective may also be created from text descriptions.

For example, technical details such as response time, backup schedules, and service availability or blackout periods are often described as service levels, and are determined by contractual obligation. The computing system 100 allows such declarations to be converted directly into either elements or attributes of elements within the technical schematic. The schematics or diagrams created within the system schematic perspective allow such details to be clearly specified as technical expectations within the system schematic perspective itself as a level of detail. As a result, contractual obligations in text can virtually build technical specifications in schematic form. Similarly, the schematics generated within the system schematic perspective may be used as reference points for a client purchasing departments and/or hardware vendor fulfillment divisions.

The many communications that take place between computers are also represented in the system canvas. Networks and internets are represented as connection elements such as elements 242, 244 and 245. In the schematic, computing systems that provide network infrastructure, such as network interface devices, firewalls, broadcasters, and routers, are represented as junction elements such as element 241 in FIG. 11. Like all other elements, connections and junctions may be expanded and contracted to show or hide all their details and relationships. For example connection element 245 in FIG. 11 is expanded to show two connections 245*a* and 245*b*.

Networks

Figure 11:
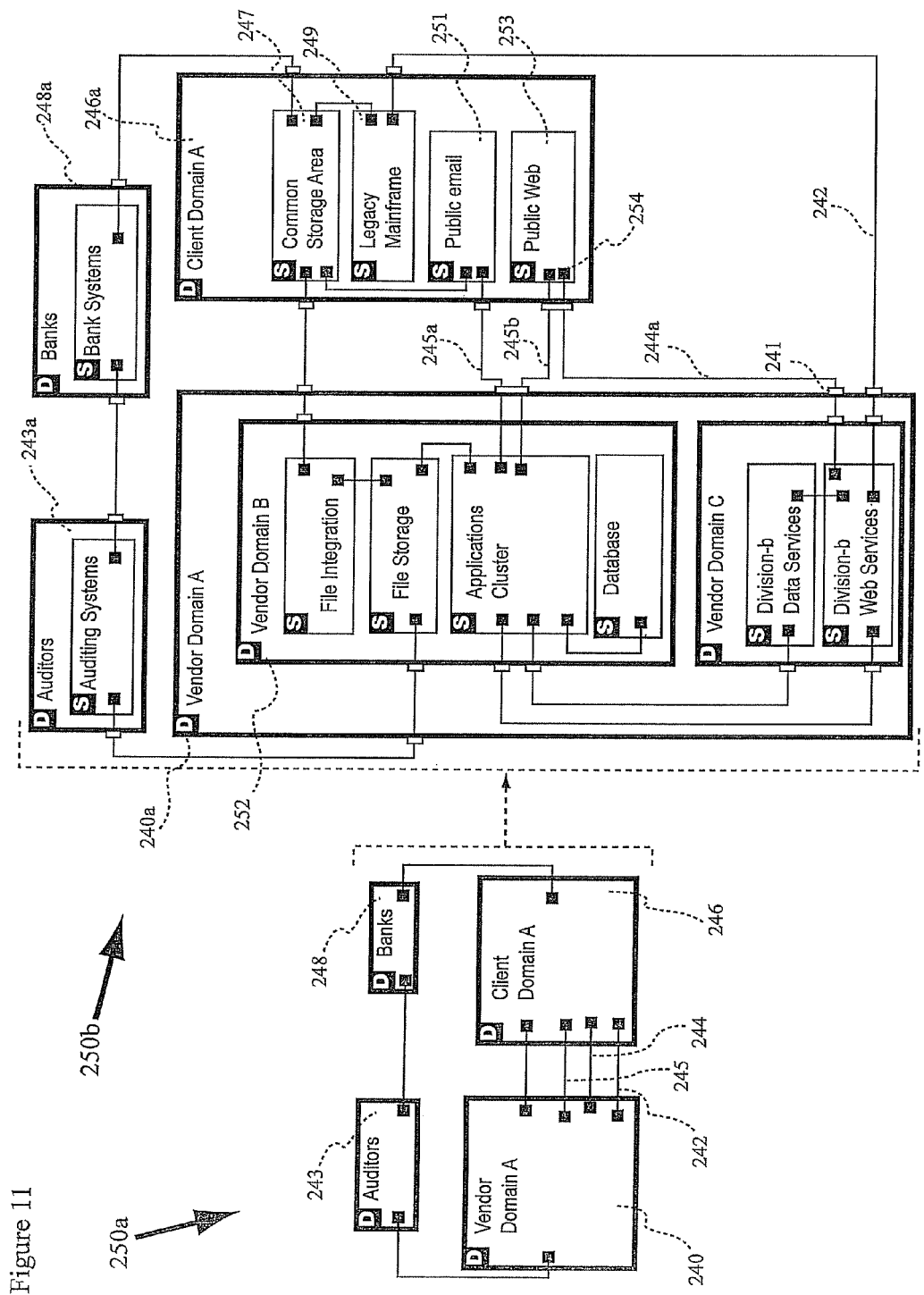
FIG. 11 is another example of a technical schematic in relatively expanded form in accordance with the subject disclosure.

Referring now to FIG. 11, two representations of technical schematic perspectives are shown and referred to generally by the reference numerals 250*a*, 250*b*. Technical schematic perspective 250*a* has an auditor domain element 243, a bank domain element 248, a vendor domain element 240 and a client domain element 246. The domain elements 240, 243, 246, 248 are linked to illustrate communication therebetween. Technical schematic perspective 250*b* is an expanded version of technical schematic perspective 250*a* such that the intra-domain elements and inter-domain communications are illustrated.

The networks connecting the domain elements 240, 243, 246, 248 are represented by connection elements 242, 244, and 245. In the technical schematic perspective 250*b*, computing systems that provide network infrastructure, such as network interface devices, firewalls, broadcasters, and routers, are represented as elements such as 241, 254.

Figure 12:
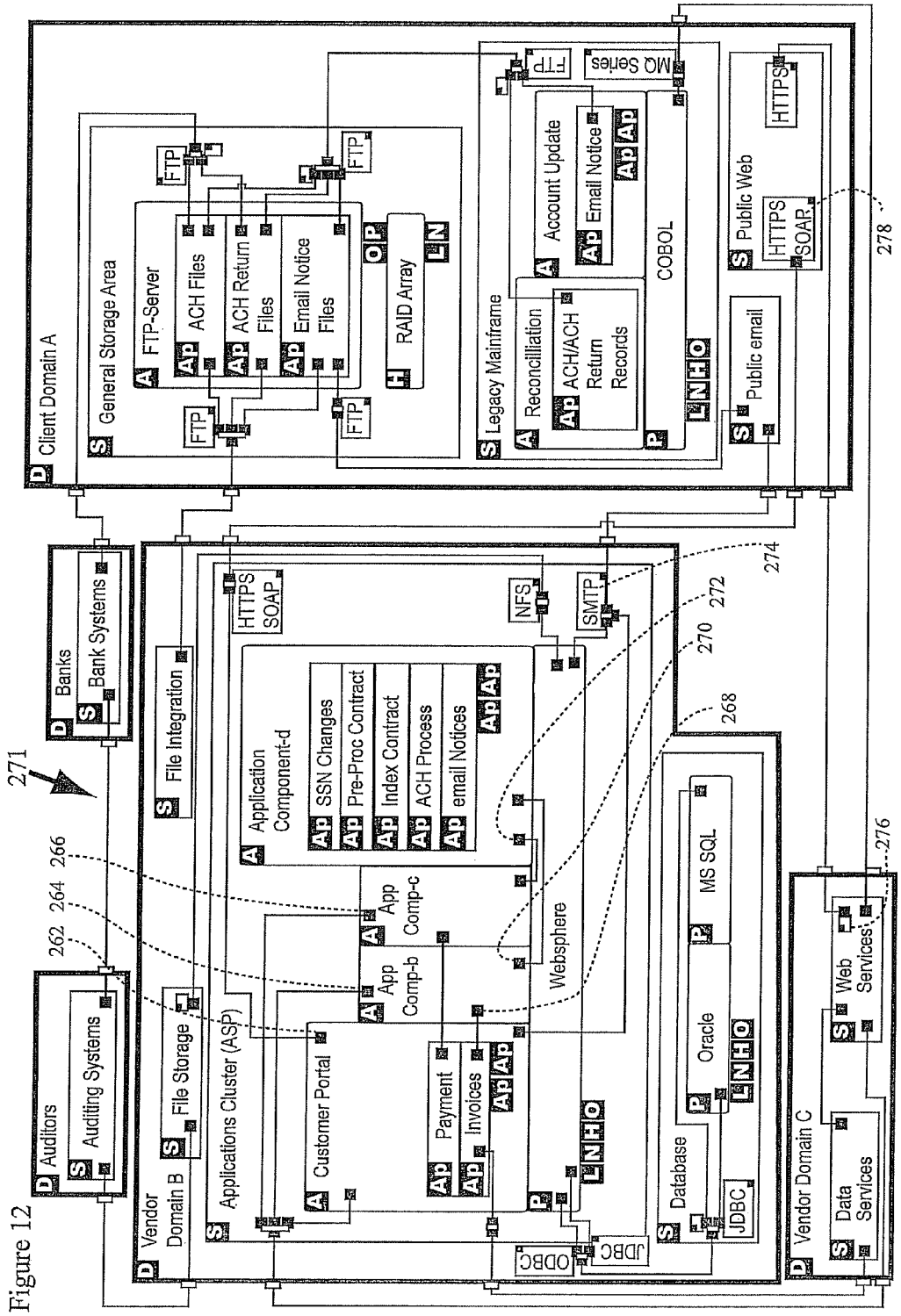
FIG. 12 is another example of a technical schematic in still further expanded form in accordance with the subject disclosure.

Referring now to FIG. 12, another system schematic that is a further expanded version of technical schematic 250*b* in FIG. 11 is shown referred to generally by the reference numeral 271. Connections may be drawn between elements with a simple interaction such as drag-and-drop or a pointing gesture. The connections may infer details automatically, for example by creating junction elements for firewalls when crossing domains, as in element 241 in FIG. 11, or the connections may infer detail by assigning commonly used network protocols based on details of the operating system layers of the connected systems, for example, detail https/soap 278 in FIG. 12, for web servers, nfs/smb for file servers and so on.

Junctions may be created at any point along the border of another element. Junctions may be linked to one or more system elements to indicate the physical system(s) that the junction element represents. It is common for a domain element to visually represent the same physical firewall several times in the same diagram, each time along a different connection element.

Details such as network protocol, physical hardware, bandwidth, authentication credentials, and the like may be specified within connections and junctions. Many of the features of connections and junctions are dependent on the context in which the connections and junctions are created. For example, the technical specification details for a 100-mb Ethernet LAN are quite different from the technical specification details for a fiber-WAN or a campus wireless network. However, each of these can begin as simple connection and junction elements in system schematic perspective. The features of the connections also can be driven from a notation in a solid block of text 126 in FIG. 3 in the same way as other elements previously described.

A variety of technical specialists can effectively use connection and junction elements. Architects can determine and display items such as the network topology of the project, communication protocols, bandwidth requirements, failure conditions, and similar infrastructural requirements. All of the connections are recorded within the system schematic perspective itself and available as a jump relationship that can readily take the user to all related perspectives, or display several or all at once. Within the system schematic perspective, individual developers can reference Web service specifications, custom transaction protocols, service monitors, and other similar system characteristics. Security personnel can identify firewall penetration rules, source and destination IP addresses, access logging, authentication procedures, and other similar system attributes.

Rules and Group Usage

As can be seen from the subject disclosure, information in the computing system 100 is held in all the perspectives collaboratively created and maintained by a diverse team of specialists. The resulting simulation model can be thought of as being contained in the same "document." Although, the simulation model is more like a simulation and not a document in the conventional sense of a text-document, the simulation model does serve the purposes of displaying like a simulation, recording like a document or a simulation, and displaying in both forms.

Unlike many conventional software diagramming tools, the syntactical and pragmatical rules of the technical schematic, and indeed all other canvases, are not strictly enforced. For example, users may describe system states that are technically infeasible, draw connections that may not make sense, or add elements without providing any details for the element at all. Such "illegal" representations are visually shown to be uncertain and/or undecided portions of the schematic with a simple convention such as dotted borders instead of solid borders, red shading or some similar convention. The system canvas allows the flexibility of white-boarding while simultaneously also allowing documentation of all details. Decisions are captured and traceable including decisions that may seem incorrect at inception, but that may nevertheless need to be included and may make sense later on in the project.

Still referring to FIG. 12, for all its complexity, the Technical schematic 271 is constructed using only the four basic elements of the Technical schematic canvas shown in FIG. 11. The Technical schematic 271 shows a hypothetical schematic for a Web-enabled consumer billing system, and includes several examples of details previously referenced. Network protocols are displayed in several of the junctions 274, 276, 278. Some of the junctions 274, 278 are shown in expanded modes and some junctions 276 are shown in contracted mode. Connections 262, 264, 266 to software modules within the application layer of a system are visible. Intra-system connections 268, 270, 272 between software modules within a layer are also shown.

Technical Schematic, Further Expanded

Referring now to FIG. 13, another technical schematic is shown and referred to generally by the reference numeral 281. Of course, the technical schematic 281 would be viewed in a system canvas. [00] Elements within the system canvas may contain jump relationships such as 147 in FIG. 7 to elements in other canvases. The screen element 154 of FIG. 7 for Login is represented in the technical schematic 281 in FIG. 13 as details 282 in FIG. 13 of the application layer within system element 280 in FIG. 13. The collapsed view of the Software module 'User Model' 286*a* appears as a detail of the application layer of system element 280. This same module is shown in expanded form as a software element 286*b*.

The individual Login data packet 146 of FIG. 7 is represented in collapsed/minimized form as item 296 in FIG. 13, as details of the connection element 298 in FIG. 13. This visually provides the exact context in which the Login data packet 141 will be used. By expanding levels of detail and using jump relationships, a user may view every detail of every element in every other canvas without leaving the technical schematic canvas.

The technical schematic 281 is a description and also a complete index of the entire construct, presented from the technical perspective. Every element in every canvas has a corresponding element detail within the technical schematic 281. As a result, the user has a single technology-centric view of the entire project. Unlike conventional diagramming tools, every relevant detail of the construct being represented can be shown directly within a single schematic, or a set of schematics. While conventional tools rely on "dialog boxes" or "pop-up windows" to enter secondary information that is not displayed visually within a diagram, the technical schematic 281 allows users to set filters that expose or hide details according to individual preference so that richly detailed information cognitively is palatable. The desired details can be selectively expanded for viewing while other details may be collapsed. The operator can zoom into aspects of information, while surrounded by context in zoomed-out form to provide effective filtering of information. Filtering may be engaged or disengaged with a simple effort such as a mouse-click, menu selection, keystroke, or other well-known software convention.

The technical schematic 281 allows several technical experts to collaboratively work on a single simulation model from a variety of perspectives, all within a single canvas. A database engineer may zoom into a low level detail on a single system to view all defined data packages being sent in and out of the database system for which he/she is responsible. The database engineer can verify the data types, field lengths, and other rules associated with the data being sent to and requested from the system.

A software architect may use the technical schematic 281 to visualize states implied in questions, such as "what is the impact of making all of our passwords upper-case only?", or "what if we migrate the databases to Oracle?", or "what will it take to move to a different web hosting vendor?" A network engineer may use the technical schematic 281 to identify visualize and demonstrate all construct functions affected by a particular router or firewall, so that the hitherto unvisualized states exposed by the planned system upgrades may become visualized in the simulation model. By being able to visualize the states, technical resources are able to provide more definitive and demonstrable answers. Furthermore, since the visual language of the simulation model is syntactically simple and merely duplicates real world names as much as possible, the visual states can more readily be shared by business leads and non-technical management.

Reports

Figure 15:
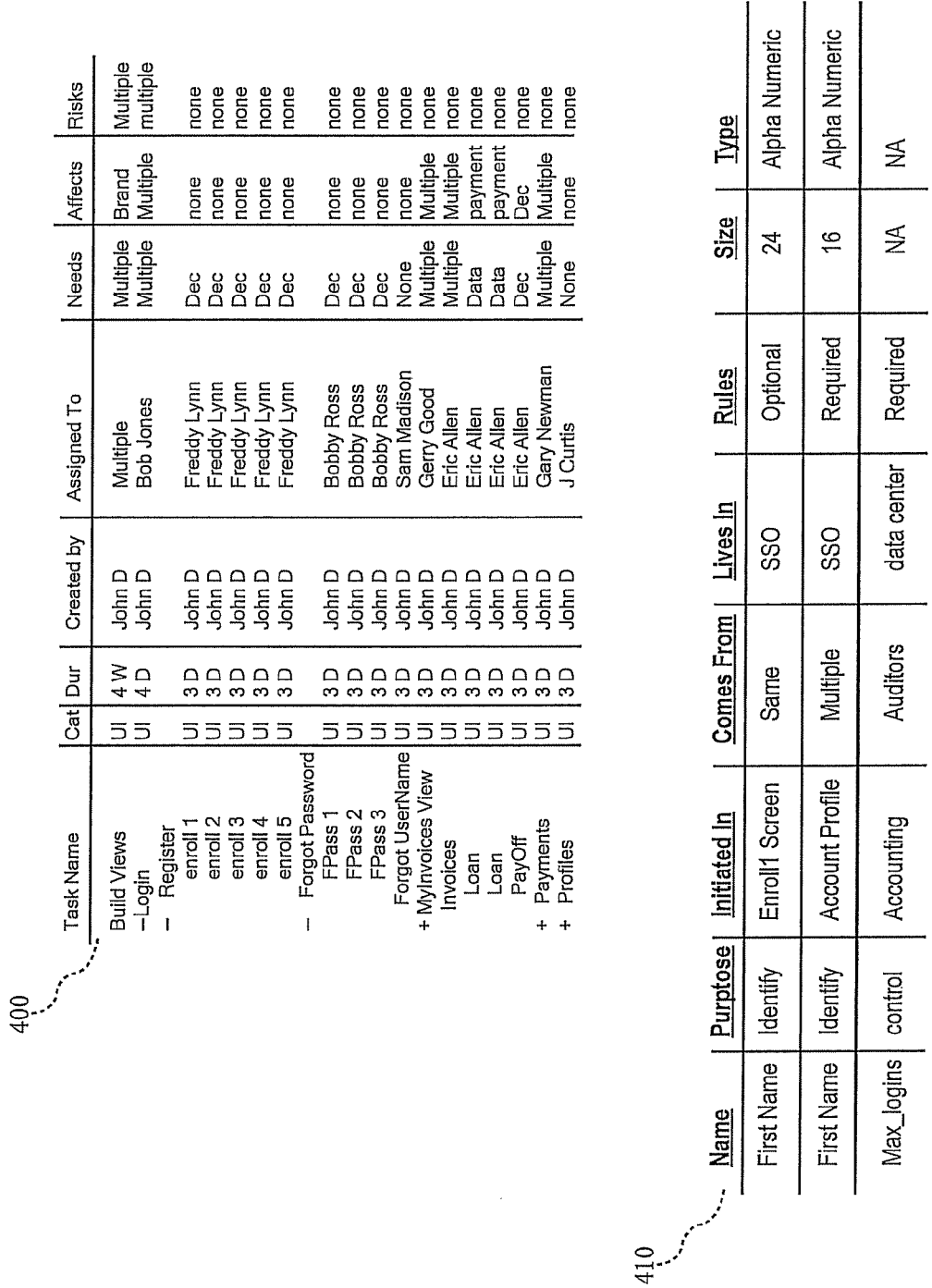
FIG. 15 is two reports generated in accordance with the subject disclosure.

Referring now to FIG. 15, two reports are shown and referred to generally by the reference numerals 400, 410.

Reports may be generated against information in all canvases, some of which may be displayed in table form. While the visual descriptions-provided by the graphic elements provide information in one perspective, tables and charts provide another perspective in a similar way as the elements. For example, data packages may be viewed as the graphical elements 141 of FIG. 7. But it is also useful to view the graphical elements 141 in tabulated form such as in report 401. The contents of tables may also be used to create jump relationships.

Project View

Figure 14:
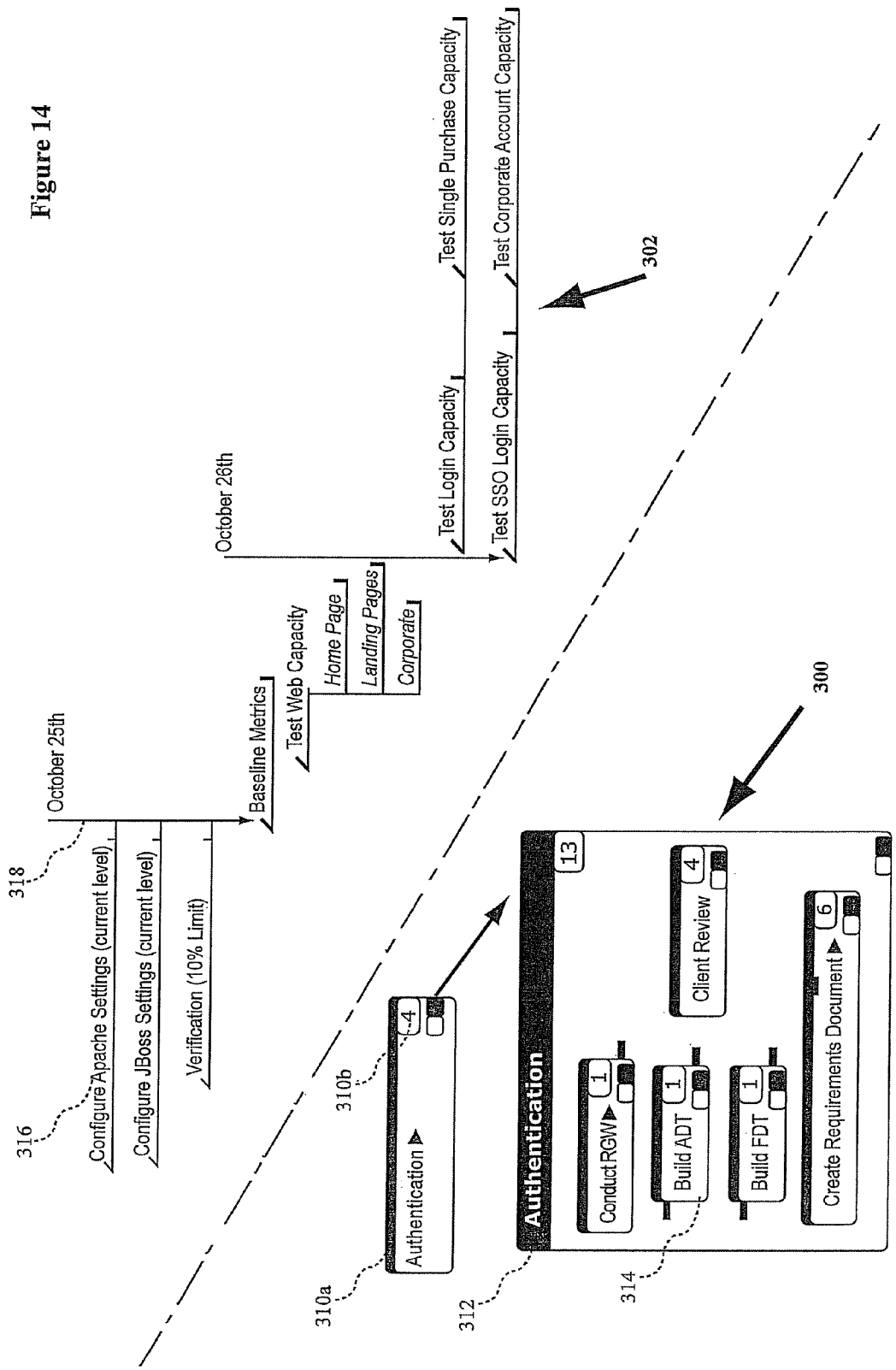
FIG. 14 is a project management perspective having a timeline view and a task view in accordance with the subject disclosure.

Referring now to FIG. 14, project management perspectives are shown and referred to generally by the reference numerals 300, 302. The project management perspective 300 has some the elements related to an exemplary task. Perspective 302 is a timeline view and perspective 300 is a task view.

A project is a one-time job with a definite beginning and ending points, definite scope of work, budget, and a temporary team disbanded once the project is over. A project has a problem defined, assigned, and scheduled for a solution. A task is the smallest unit of a project.

Everything inside the software construct may be viewed as a task. Indeed, every element described so far that is used to construct an aspect of the simulation model, may be viewed as a task. Elements can also, using the same simple interactivity conventions as described above, be used to create a task or group of tasks and become part of a jump relationship.

In the project management task view perspective 300, Authentication item 310a is groups of tasks, which are shown in expanded form in item 312. Graphics 314 are one of a series of tasks and task groups is in Authentication item 312. Tasks may be attached to one another to show sequence or dependency. Tasks may also be grouped together to form larger task groups.

In project management timeline view perspective 302, graphic 316 shows a task and the temporal attributes of a project are displayed for manipulation. Again, elements here are driven by and tightly coupled to their view in the other project views as well as other perspectives in the computing system 100, and changes affect all coupled views simultaneously. [00] As such, once the system is designed and specified and modeled, every component of the simulation model may be used to create tasks. These tasks may be assembled interactively inside the project view to create the project.

Within the computing system 100, the project is the simulation and the simulation is the project. The project is viewed as an integral part of the construct of interlocking parts, driving the simulation and being driven by the simulation like all other elements. All other dependency revealing features such as Jump Relationships also apply to the project perspective. In this way, the relationship between the project and the design and specifications is real within the simulation model. Again, as in the expanded Technical schematic in FIG. 13 and other perspectives, the impact of changes can be visualized throughout the project and the rest of the model. Project team members, can show the implications and dependencies of their tasks or imperatives within the other perspectives in other canvases. In this way, team members can virtually display and report on the manifestations of a given change from all perspectives including their own.

Using coupling between the system schematic 281 and the project tasks, a project manager may zoom out to a high-level system detail, then using well-understood software conventions such as filtration based on attributes, see the system schematic 281 in various project-oriented views. For example, a convention such as filtration based on task completion can allow a project lead to see the project as a roll-up of project completion details on a per-domain level, ignoring selective aspects of the systems, and focusing on other aspects, to see which partners are on schedule, ahead of schedule, or behind schedule and also be able to see things like delays or resource issues specifically in the context of the system.

Interactive Schematic View

Figure 16:
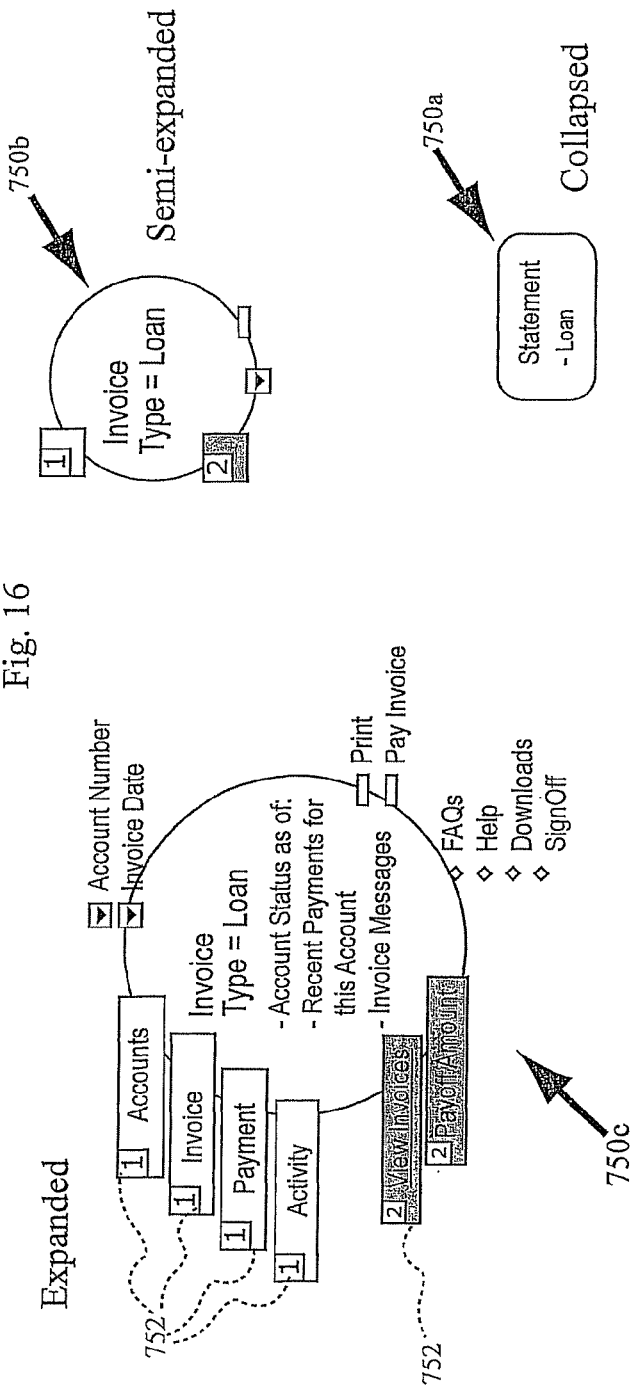
FIG. 16 is another interactive schematic view of a project in accordance with the subject disclosure.

Referring now to FIG. 16, another interactive schematic perspective is shown in three forms referred to as reference numerals 750a, 750b, 750c. In the simplest view, the interactive schematic 750a is fully collapsed. Alternatively, the interactive schematic can illustrate varying levels of detail as shown in semi-expanded perspective 750b and expanded perspective 750c. Generally, the interactive schematic perspectives 750a, 750b, 750c can be used to fully represent a graph or diagram of any dimensionality on a simple two dimensional or three dimensional computer display. Any concept that can be reduced to an n-dimensional (including fractional dimensions) graph can be presented to a person familiar with that concept via interactive schematic perspectives 750a, 750b, 750c.

The interactive schematic perspectives 750a, 750b, 750c break a shape, such as a circle, out into various slices 752. In one example, each slice 752 represents an external face of the n-dimensional cube. The slices 752 do not have to be literal slices such as a pie chart, the slices 752 can be inferred from the presentation. The person using the interactive schematic perspectives 750a, 750b, 750c can then expand one or more slices 752, while temporarily collapsing or hiding the other slices 752. When open, each slice 752 displays relevant information, and vertices connecting to other perspectives to show relationships as applicable. Thus, all attributes and connections, no matter how complex, are always available to the user. The attributes and connections are simply 'turned away' until viewing is desired.

Figure 17B:
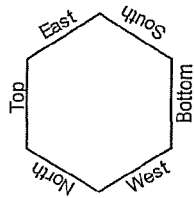
FIG. 17b is a 2-dimensional representation of a cube shown in accordance with the subject disclosure.
Figure 17A:
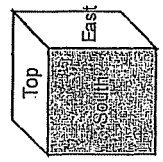
FIG. 17a is a traditional 2-dimensional representation of a cube is shown.

Referring now to FIGS. 17a and 17b, a traditional 2-dimensional representation of a cube and a new 2-dimensional representation of a cube are shown, respectively, to illustrate one of the concepts accomplished by the interactive schematic perspectives 750a, 750b, 750c. Note that FIG. 17b only deals with the faces of the cube, not the edges.

Representations of Uncertainty

The disclosure above presents a software project as an information ecosystem which may be viewed and discussed from multiple related perspectives. The information ecosystem views a software entity as a construct of interlocking concepts (e.g., functional components, data sets, relationships among data, and invocations of function). The information ecosystem is represented as a simulation model, and the multiple related perspectives are represented through the use of multiple canvases and tables. The canvases and tables work together to accommodate communication between individual team members with different roles, core competencies and skill levels.

Within these canvases and tables, interactive graphical tools (such as texts, icons, graphics, connectors, and hierarchical groupings of such tools) are used to represent each of the components, constraints, parameters, and relationships within the simulation model. The simulation model allows the value (and even the existence) of any and all of these quantitative components, constraints, parameters, and relationships to be declared as "uncertain."

"Uncertainty" itself as an aspect of software projects is well known within the industry, but hardly ever discussed in the context of software development life cycles. The execution of an enterprise software project from an information management and communication perspective may be described as the accumulation of certainty and the reduction of uncertainty. The subject technology provides a set of graphical tools for recording, displaying, measuring, and tracking uncertainty. In its normal state, a software project contains an unavoidable amount of uncertainty. It can actually be argued that even a successful implementation being used by satisfied users contains a certain amount of uncertainty.

Uncertainty has both direct and derivative impacts. Uncertainty about the completion date of one task may have a cascading effect on dozens and even hundreds of subsequent tasks. Therefore, uncertainty is not simply an attribute or variable, but rather as a dimension itself within the visual representation. Every individual interactive graphical tool, every subcomponent text, icon, graphic, connector, and grouping associated with a graphical tool, and every cell within a table display, may be declared as "uncertain". Each of these individual points of uncertainty may generate related uncertainties. Another characteristic of software project uncertainty is evolution and change with every choice. Uncertainty does not simply trend from more toward less. A given choice about a particular component which may bring certainty to that aspect of the project, can in turn open a whole host of other uncertainties which in turn have to be recorded, tracked, and managed. The subject technology provides mechanisms for managing all of these characteristics of software project uncertainty through the use of visual displays of uncertainty and through calculations performed on the quantitative data represented by those visual displays.

In order to manage this uncertainty, within the invention we identify three basic types of uncertainty, multiple mechanisms for resolving uncertainty, and multiple visual representations of uncertainties. The three types of uncertainty are "completely unknown", "range", and "undecided." The type "completely unknown" represents that a value is expected, but that no member of the team has yet provided a value. The type "range" represents that low and high numerical values have been provided, but the actual final value has not yet been determined. The type "undecided" represents that members of the team have suggested multiple possible values (which may include "range" values), but there is not yet agreement between the team members on the actual value. The simulation model is capable of treating these three types of uncertainty as mathematically compatible, so that calculations may be performed and reports generated despite missing, ranged, or undecided data values.

Users of the invention may identify "resolution paths" for particular uncertainties. In a simple implementation of a resolution path, a user may select a given uncertainty and set a "needs attention" flag that causes that uncertainty to display in a distinctive fashion such as displaying over a red background and changing text to bold. In a more complex implementation, a user may select a given uncertainty, assign that uncertainty to one or more individual team members, create a new task within a task canvas, assign a priority to that newly created task, and assign a due date for resolution of the uncertainty.

Visualization of Uncertainty

As previously stated, uncertainty declarations may display within table cells, interactive graphical tools, and the texts, icons, graphics, connections, and hierarchical groupings that make up the interactive graphical tools. Points of uncertainty have a variety of visual representations, dependent on the context in which the uncertainty is being presented. Thus, an uncertainty of type "completely unknown" may appear as italicized text in one manifestation, as a question mark in another, and as a diagonal line in yet another. Details of how uncertainty is visually represented are provided in supporting diagrams as follows.

Figure 18A:
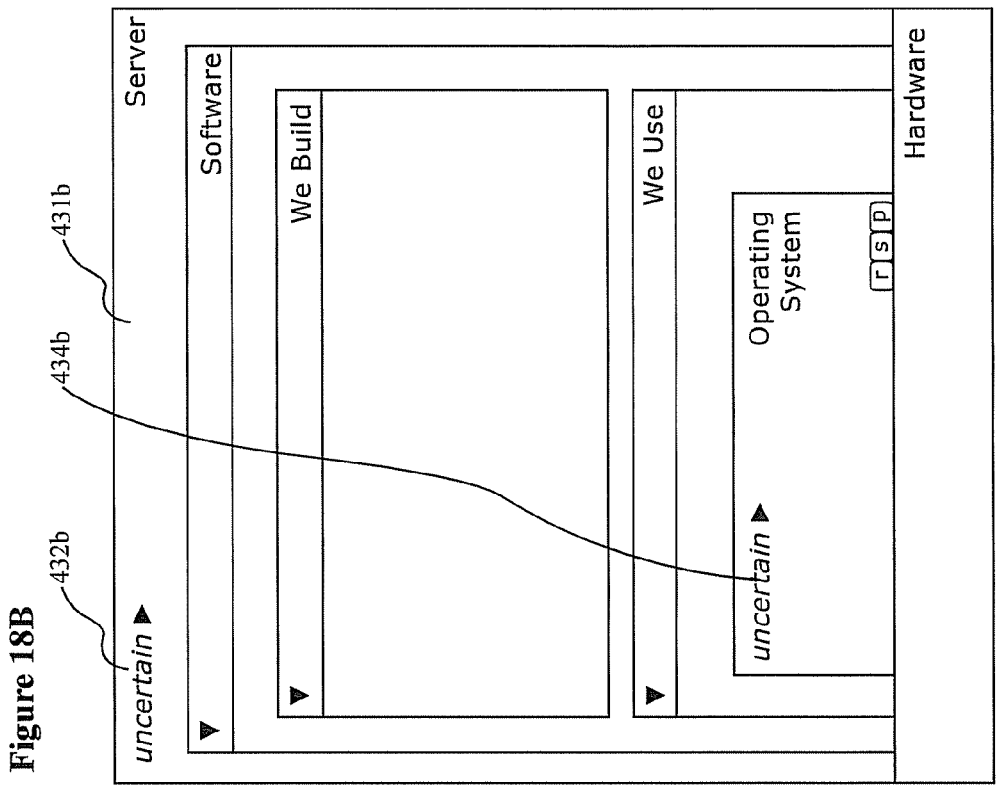
FIG. 18a is a technical schematic canvas of a computing system in accordance with the subject technology.
Figure 18B:
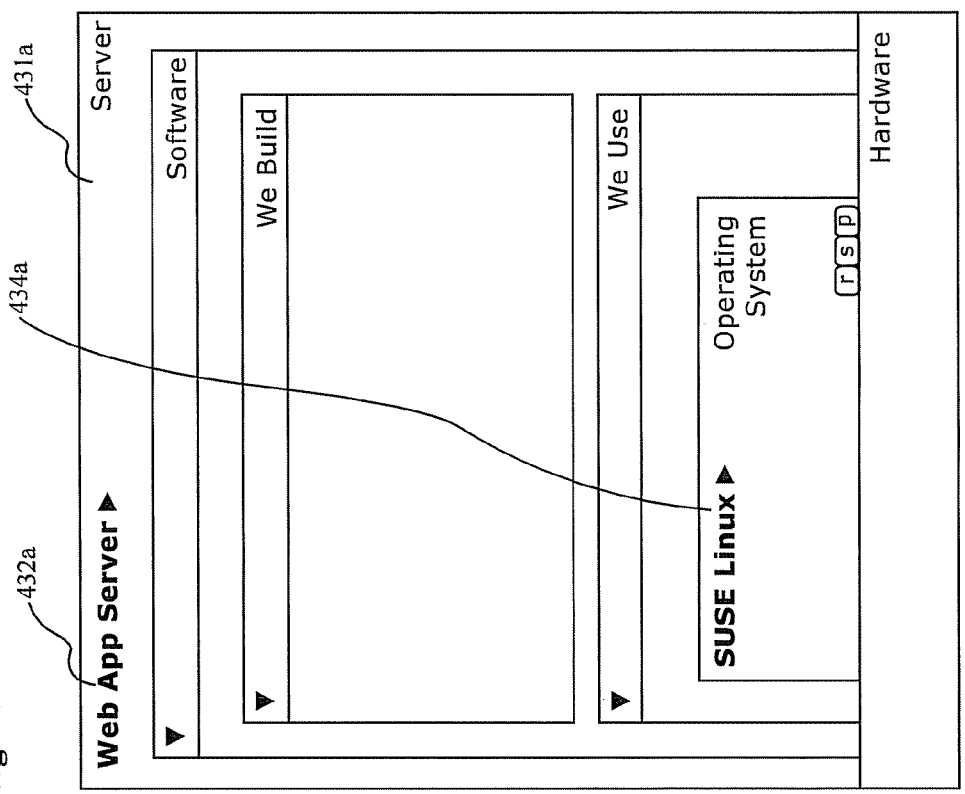
FIG. 18b is another technical schematic canvas of the same computing system as FIG. 18a with the computing system name shown with an uncertainty type "completely unknown" in accordance with the subject technology.

The "completely unknown" uncertainty is a simple type. In FIG. 18A, a tan-P element 431a representing a computing system is illustrated. Field 432a contains the system name "Web App Server." In FIG. 18B, another tan-P element 431b representing the same computing system is shown; however, the computing system name shown in 432b is now declared as uncertainty type "completely unknown." Similarly, in 431a, the operating system is declared to be "SUSE Linux" in field 434a, while in 431b, the operating system is declared to be also of uncertainty type "completely unknown."

Figure 19A:
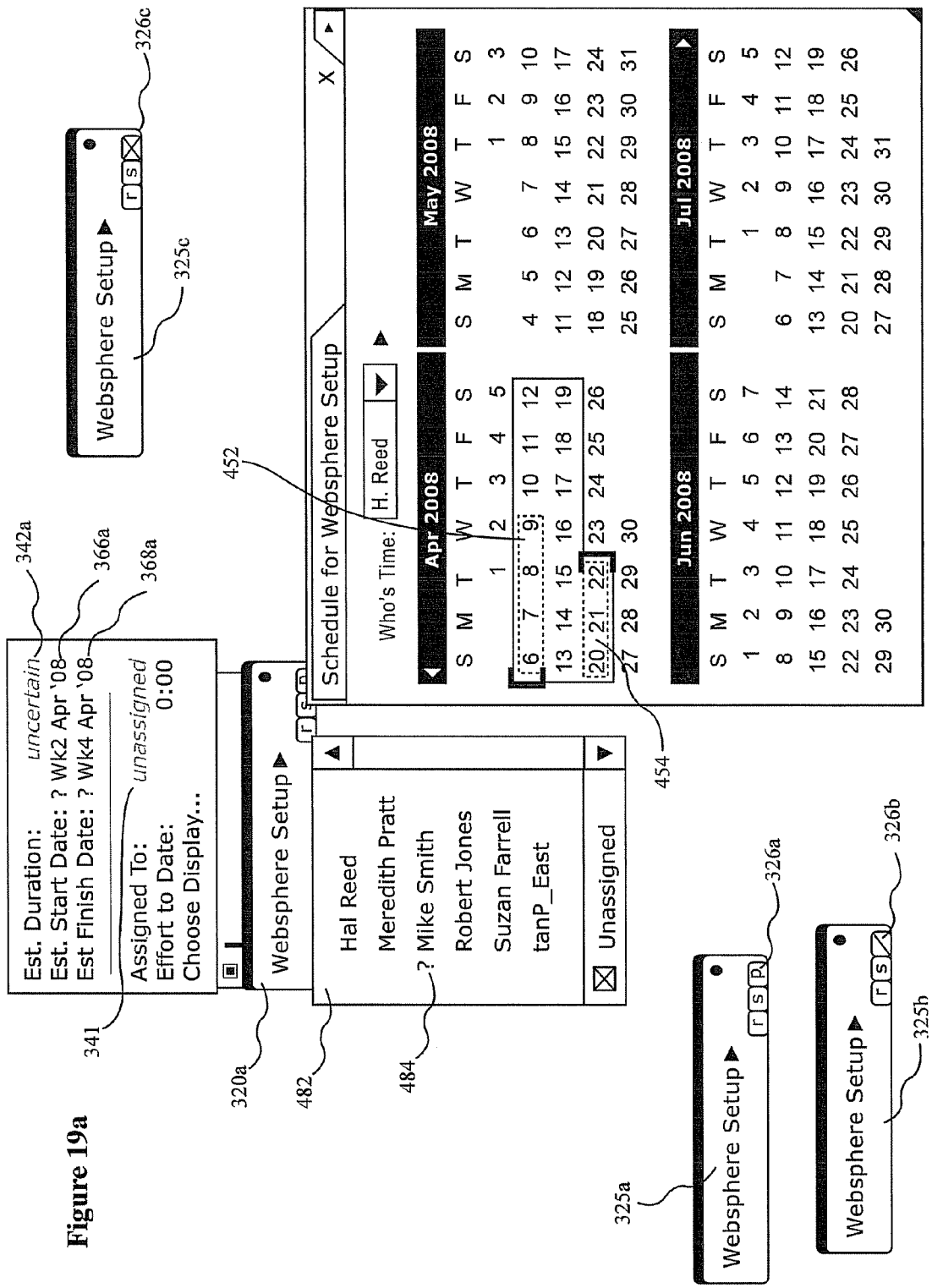
FIG. 19a is a task canvas representing a task in accordance with the subject technology.

In FIG. 19a, tan-P element 320a represents a task. Field 342a shows that the estimated duration of that task is declared as uncertainty type "completely unknown." Also within tan-P element 320a, field 341 shows that the task resource assignment is of uncertainty type "completely unknown."

Still referring to FIG. 19a, the same task is shown in a collapsed state in representations 325a, 325b and 325c in which all of the constituent parts are hidden. The icon 326a is shown as having a value, where the same icon is shown with a line through in icon 326b, designating that the value for that icon is of uncertainty type "completely unknown."

Figure 20:
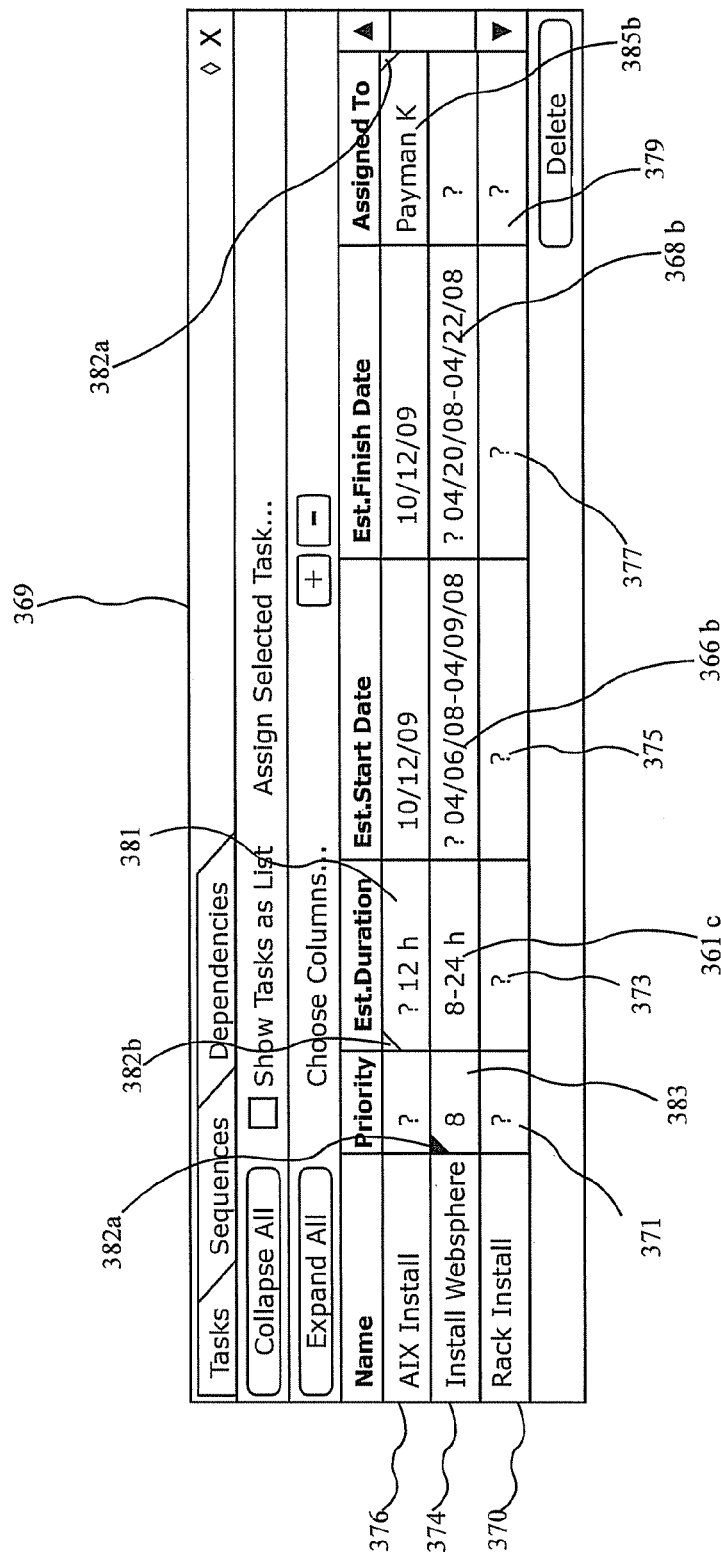
FIG. 20 is a task table in accordance with the subject technology.

FIG. 20 shows a task table 369. Row 370 displays some attributes of task "Rack Install." The attribute 'priority' in cell 371, as well as the attributes 'estimated duration' in cell 373, 'estimated start date' in cell 375, 'estimated finish date' in cell 377, and 'assigned resource' in cell 379 all show that their values are declared as uncertainty type "completely unknown."

Figure 19B:
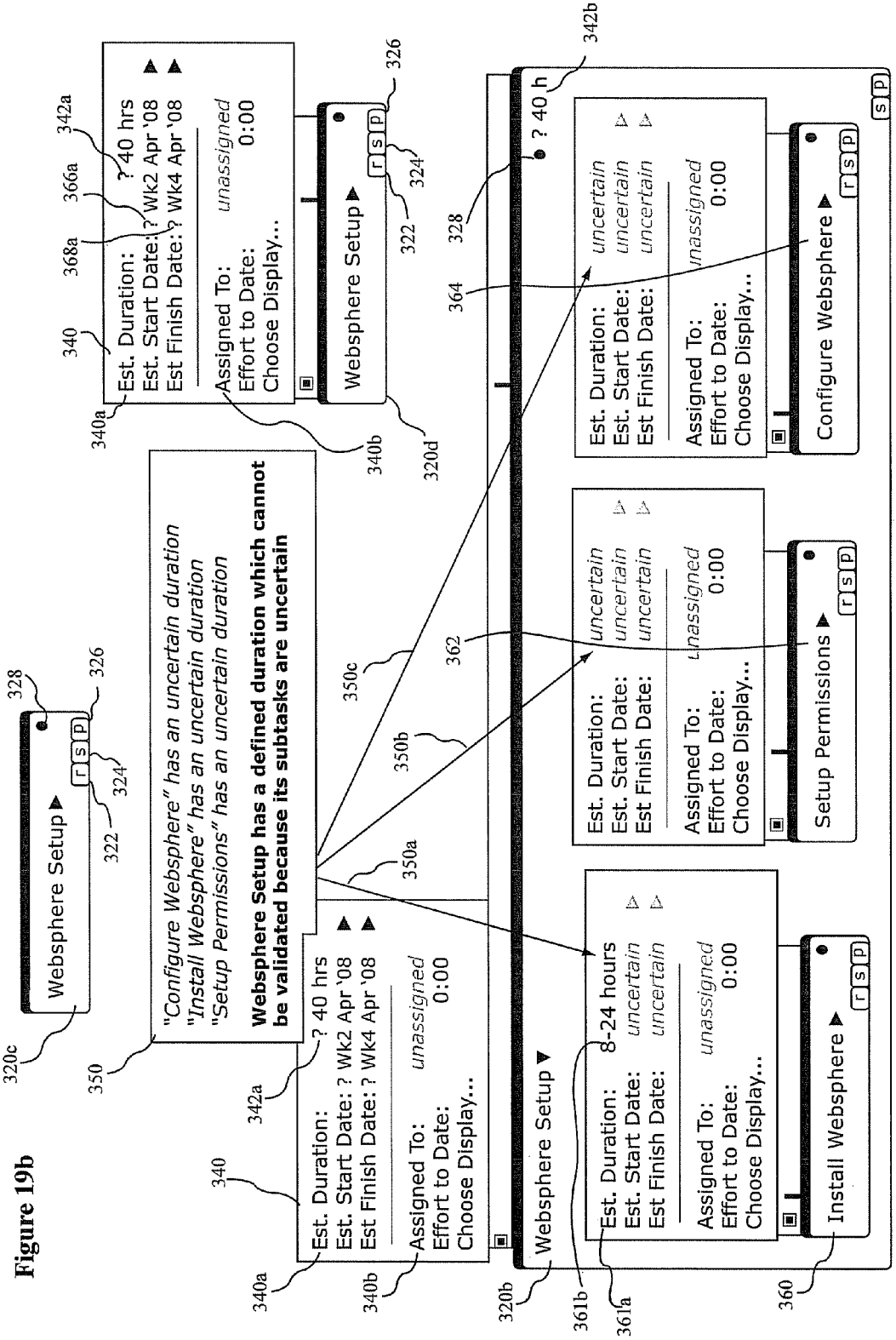
FIG. 19b also is a task canvas representing a task in accordance with the subject technology.

The "range" uncertainty type applies to all attributes that may be described as a number, such as task duration and calendar dates. In FIG. 19b, tan-P element 320b is a task set, which contains item 360, a subtask "Install Websphere." Field 361b displays an estimated duration of 8-24 hours. This attribute shows one visual representation of uncertainty type "range." "Range" uncertainty is shown with different visual representations in FIG. 20. In FIG. 20, row 374 displays some of the attributes of task "Install Websphere." The same attribute 'estimated duration' is shown in cell 361c, again displaying uncertainty of type "range."

Similarly, "range" uncertainty as applied to an attribute such as date may be displayed differently in different visual contexts. However, both the uncertainty and the date are a single data element independent of the different visual representations. Range uncertainty as applied to date attributes may be seen in FIG. 20 within a task table in 366b and 368b.

In FIG. 19a, uncertainty of type "range" as applied to date attributes is shown in fields 366a, 368a, and again in fields 452, 454. The specific representation of "range" uncertainty with respect to date is dependent on the context in which it is displayed: "MM/DD/YY-MM/DD/YY" format within a table cell (see fields 366b, 368b in FIG. 20), "Wk2 Apr '08"/"Wk4 Apr '08" within a text component (see fields 366a, 368a in FIG. 19a), and a dashed-line rectangle surrounding values within a traditional calendar format (see fields 452, 454 in FIG. 19a).

In one embodiment, if any uncertainty is modified within any format, the invention is capable of interpreting the change and updating the displays of all connected client elements, using the display format appropriate to the specific client context.

The "undecided" uncertainty type applies to all possible data elements and relationships, and as such is more complex than "completely unknown" and "range". Not all elements of a software project may be represented as a simple numeric value. Extended text descriptions, and even relationships between entities, may be uncertain.

Uncertainty about commonplace decisions such as which version of an operating system is to be used can cause ripple effects that commonly put projects at risk or lead to project failure. Issues such as those caused by version incompatibility between components may be well known, but may not be effectively notated or communicated or tracked throughout the life of a project.

Furthermore, individual team members may have different opinions about what a given value or description or connection should be. In addition, the team members often have different opinions on what the right approach to determining the correct solution should be. In other words, the team may be uncertain about how to best eliminate a given uncertainty. Thus, the system allows the declaration of disagreements, and allows for a system of notations to describe the nature of the disagreement. Every user-entered value within the system, including the creation of connections between elements, may support multiple conflicting values, tracking each of the different values so that the different values may be displayed and discussed.

Figure 21:
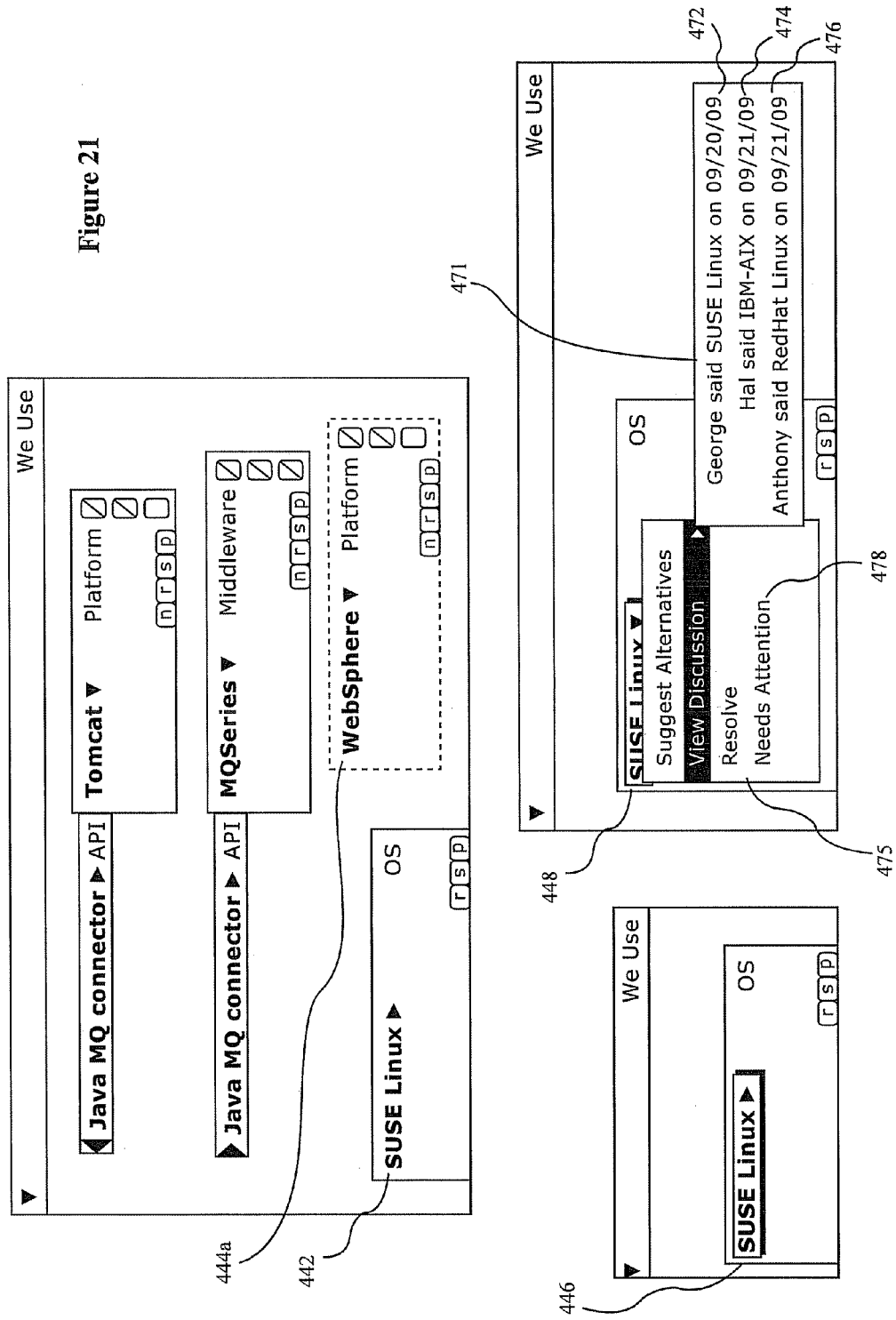
FIG. 21 is a technical schematic canvas in accordance with the subject technology.

Referring to FIG. 21, tan-P elements of a technical schematic canvas are shown. A simple example of an "undecided" value can be seen in fields 442, 446, and 448 of FIG. 21. In field 442, the value SUSE Linux has been entered as the type of operating system in a particular system. In field 446, the value SUSE Linux is surrounded with a shadowed box; this shadowed box designates that SUSE Linux is only one of several potential values that have been entered by team members, and that the final value has not yet been decided. In field 448, that point of indecision is further elaborated; fields 472, 474, and 476 show that three members of the team have each offered a different suggestion, and when those suggestions were made is also shown.

"Undecided" values may be ubiquitous within canvases, within tan-P elements, and within tables in the system. Just as "range" uncertainties have multiple visual display mechanisms (e.g. date "range" displays in preceding paragraphs), "undecided" values also have several different visual appearances. In FIG. 21, field 446 shows one appearance, and tan-P element 444a shows another appearance. Tan-P element 444a represents a software module whose entire existence is a point of indecision. Tan-P element 444a allows one team member to declare the need for WebSphere, and at least one other team member to state that WebSphere does not belong there at all.

Figure 22:
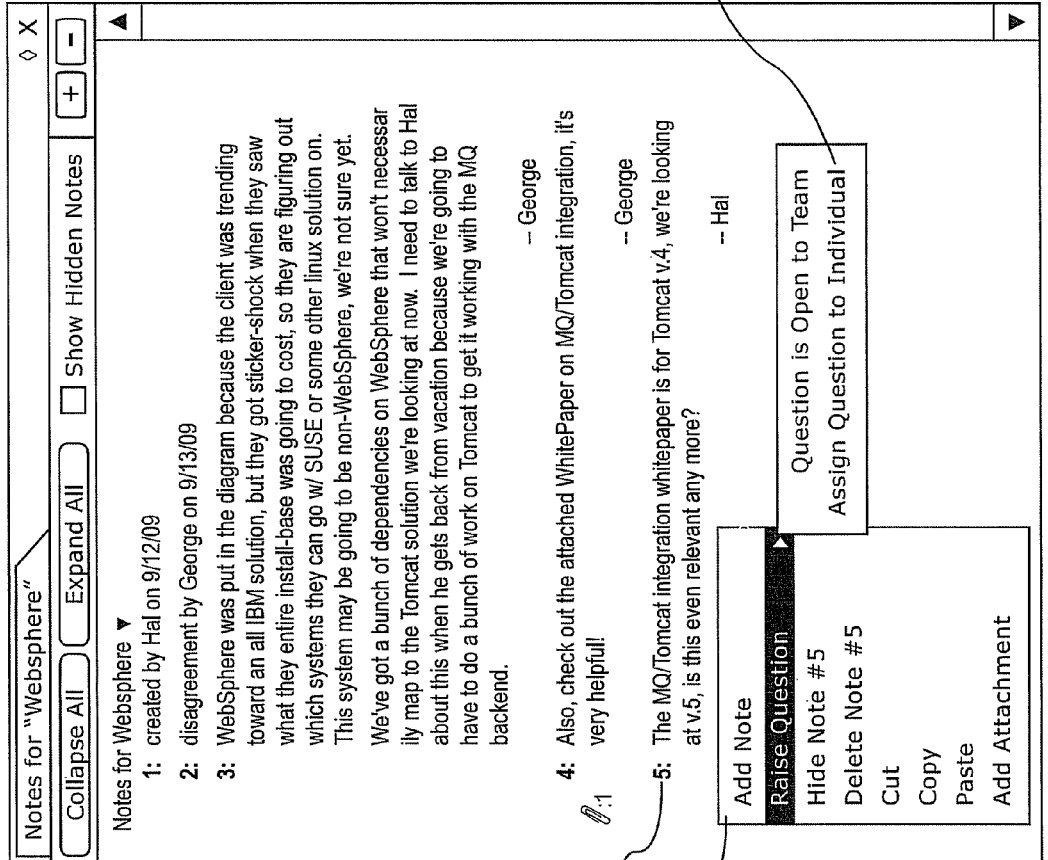
FIG. 22 shows a notes window associated with the canvas of FIG. 21 in accordance with the subject technology.

In addition to the simple pop-up listing 471 in FIG. 21, detailed notes and explanations can be associated with an "undecided" value. FIG. 22 shows one such notes window.

In FIG. 19a, field 326c is a minimized icon that shows the corresponding contents are "undecided." The same icon in a different state in field 326a shows itself to be known, and as stated earlier above that same icon in field 326b shows itself to be "completely unknown." Item 482 is a dropdown displayed from task WebSphere Setup (see tan-P element 320a), showing resources available for task assignment. Item 484 shows that while the task is assigned to Mike Smith, this assignment is "undecided." Mike Smith may be unavailable, he may be unqualified, another resource may be better suited, in any and all of these available cases this assignment is "undecided."

Figure 23:
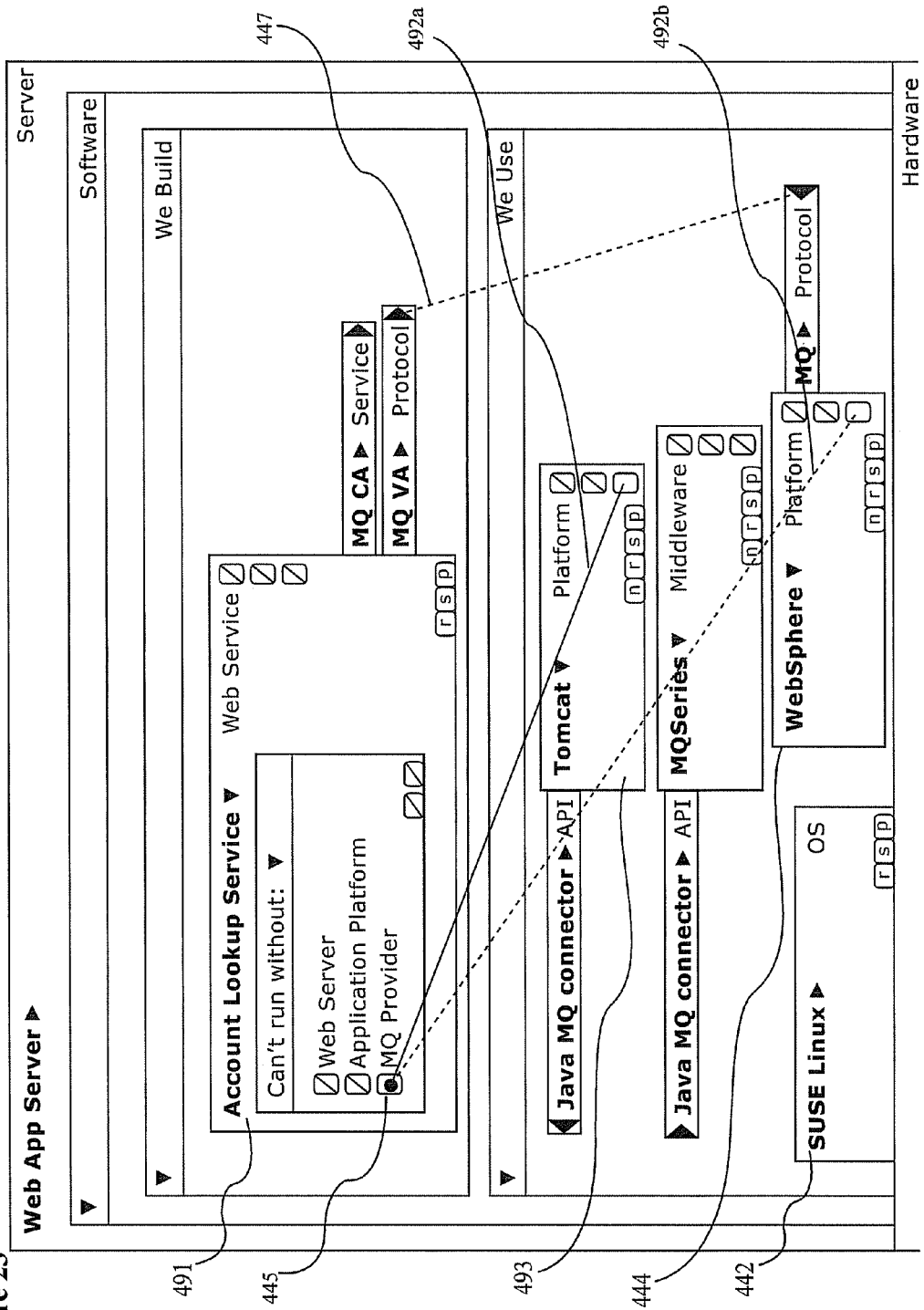
FIG. 23 is a technical schematic canvas with two examples of "undecided" values for connections in accordance with the subject technology.

In FIG. 23, a tan-P element of a technical schematic canvas is shown. The tan-P element has two examples of "undecided" values for connections. Connections represent relationships between entities within the simulation model. Connection 447 is shown as a dotted line to designate an uncertainty of type "undecided." In this case, a communications dependency may or may not exist between the tan-P element representing Account Lookup Service 491 and the tan-P element representing the platform WebSphere 444, hence the uncertainty.

In item 445, a dependency connector within a tan-P element, another type of "undecided" uncertainty for connections is illustrated. In this case, a team member has identified the tan-P element 493 representing the platform Tomcat as the MQ Provider for Account Lookup Service 491, while another team member has identified the tan-P element 444 representing the platform WebSphere as the MQ Provider. In both of these cases, there may be accompanying detail in the form of additional notes (e.g., as shown in FIG. 22) explaining the reasons for the uncertainties. In this way, the team can reference and discuss the uncertainty that arises from their disagreement.

"Undecided" values may also be displayed within tables, as shown in FIG. 20. Row 376 displays some attributes of task "AIX Install." Cell 381 shows the value 12 hours for Estimated Duration. But triangle 382b shows that this value is "undecided" because there are other values entered by other team members. This is the equivalent of the black box 446 in FIG. 21, which in the context of a table takes on a different form to display the same uncertainty type "undecided." Similarly, field 385b shows that task "AIX Install" may be assigned to Payman K, but here, triangle 382a points out that there are other suggestions.

In row 374, the priority of task "Install WebSphere" is set to 8 in field 383. Here a filled triangle 382a shows that not only is there uncertainty of type "undecided," pointing to other possibilities being suggested, but also that this point of uncertainty has been assigned a "needs attention" resolution path, thus the visual difference between 382a and 382b, which is the equivalent of field 478 in FIG. 21, but in the context of a table.

This granular and detailed visual display of uncertainty provides a framework for other capabilities of the system. The following paragraphs detail how, within this visual display, uncertainty can be tracked, measured, and managed.

As previously described, individual points of uncertainty may be assigned a "resolution path." A simple resolution path consists of identifying a particular uncertainty and visually identifying to the rest of the team that the uncertainty needs attention. In FIG. 21, choosing the field SUSE Linux item 448, displays a pop up field 475, which contains the option "Needs Attention" field 478. In this way, the uncertainty is indicated as requiring attention and raised with the rest of the team.

A more specific resolution path is available which allows the resolution of an uncertainty in any canvas to become a task on a task canvas and be assigned to a specific team member. FIG. 22 demonstrates one mechanism for creating such tasks. Note field 387 displays pop-up menu 386, which allows you to choose "Raise Question" and "Assign to Individual" in field 388. By selecting menu item 388, a new task is automatically created and associated with the parent element of the note 387, which is item 444a of FIG. 21. Once the task is created, drop down 482 (see FIG. 19a) is then used to assign the newly created task to a team member. When the resulting task is completed, you may resolve field 475, the uncertainty, and add elements to the list of notes (see FIG. 22) involved in resolving the uncertainty.

Displaying Derived Uncertainty Paths

Uncertainty about multiple small, specific details may be notated, derived, summarized, and presented within the system. FIG. 19b illustrates a tan-P element that shows how uncertainties at the detail level can result in uncertainty summary reports that are presented at a higher level (a more abstract view, as appropriate for a supervisor). Item 320d shows the taskset "Websphere Setup" in a semi-collapsed state. In display panel 340, the question marks show that there are uncertainties in the Duration field 342a, Start Date field 366a, and End Date field 368a. The question mark also means that these uncertainties do not originate at those particular data elements.

Still referring to FIG. 19b, field 320b shows the taskset "Websphere Setup" in an expanded form. Subtask fields 360, 362, and 364 are now visible. By clicking on the question mark field 342a, a report field 350 appears, which shows via pointers 350a, 350b, and 350c, that the uncertainty displayed at field 342a is in fact the derived result of uncertainties existing within subtasks 360, 362, and 364. This mechanism for deriving or "rolling up" uncertainty from a more granular level to a more abstract level may be used recursively to show the net effects of hundreds of points of uncertainty in just a few summary reports.

Quantifying Uncertainty—the Quotient

The capability of the invention to summarize and display uncertainty without loss of detail enables a further capability of the invention: the capability to quantify uncertainty at a project level in a quantitative measurement referred to as the "uncertainty quotient." One may ask a project lead how late a project is, how much over or under budget the project is, how close or far a task is from completion, etc., and expect a quantitative answer. However, prior to the invention, while a person might ask, "How certain are you about any of the attributes of a project?," that person would not expect a quantitative answer along any known scale. In other words, experts do not currently have a way to say, my project has an "uncertainty quotient" of 74.3%. The current state of the art does not provide quantitative data of this nature for uncertainty. Uncertainty may be described as the uncertainty of individual components. Within the invention, the uncertainty of any individual attribute is available. Preferably, the invention focuses merely on whether or not an individual attribute is declared as uncertain. For example, one may declare in a duration field that a task is to take 8-24 hours. The system does not measure how certain/uncertain that value is. It simply allows users to declare that value to be uncertain in a variety of ways as described above.

The "uncertainty quotient" for a project is the ratio of the number of values declared uncertain to the number of total values existent within the simulation model. The system can thus enumerate the parameters and attributes existent within the simulation model, then express the number that are uncertain as a fraction or percentage of the total count. In this way, the system shows not how uncertain a project is, but rather how much uncertainty the project contains. Thus, the uncertainty quotient is both mathematically and theoretically distinct from previous attempts to quantify uncertainty.

A construct such as that within the system needs to be in place in order to accommodate a granular description, composed of many discrete fields which may be certain or uncertain. With that infrastructure in place, the "uncertainty quotient" becomes a simple but informative ratio.

The "uncertainty quotient" does not have a specific intrinsic meaning. Rather, the "uncertainty quotient" provides a repeatable, reliable tool which may be used as a unit of measurement by those who study and report on software project failure and success rates. The "uncertainty quotient" can be used to construct an index that can then, in turn, indicate a probability of failure or success based on previous experience and history. For example, a software project estimated at 5,000 man-hours may be discovered to have an 80% likelihood of failure if coding begins while the "uncertainty quotient" is higher than 75%, while a project of similar scale may be discovered to have only a 30% likelihood of failure if coding begins after the "uncertainty quotient" has been reduced to below 25% through further analysis.

Dependency

The subject system includes a mechanism for displaying dependencies between conceptual entities, based on the paradigm of coupling and decoupling elements within the simulation model to graphical tools within canvases. Within a given canvas or table, an element within the simulation model may have one or more primary visual representations coupled to that element, and may also have one or more secondary visual representations coupled to that element. Where a dependency exists between two elements A and B, such that A is dependent upon B, that dependency may be presented as a primary visual representation of A (a graphical tool coupled to A) physically containing a secondary visual representation of B (a graphical tool coupled to B). The inverse may also be used: a primary visual representation of B may physically contain a secondary visual representation of A in order to display the dependency.

Figure 24:
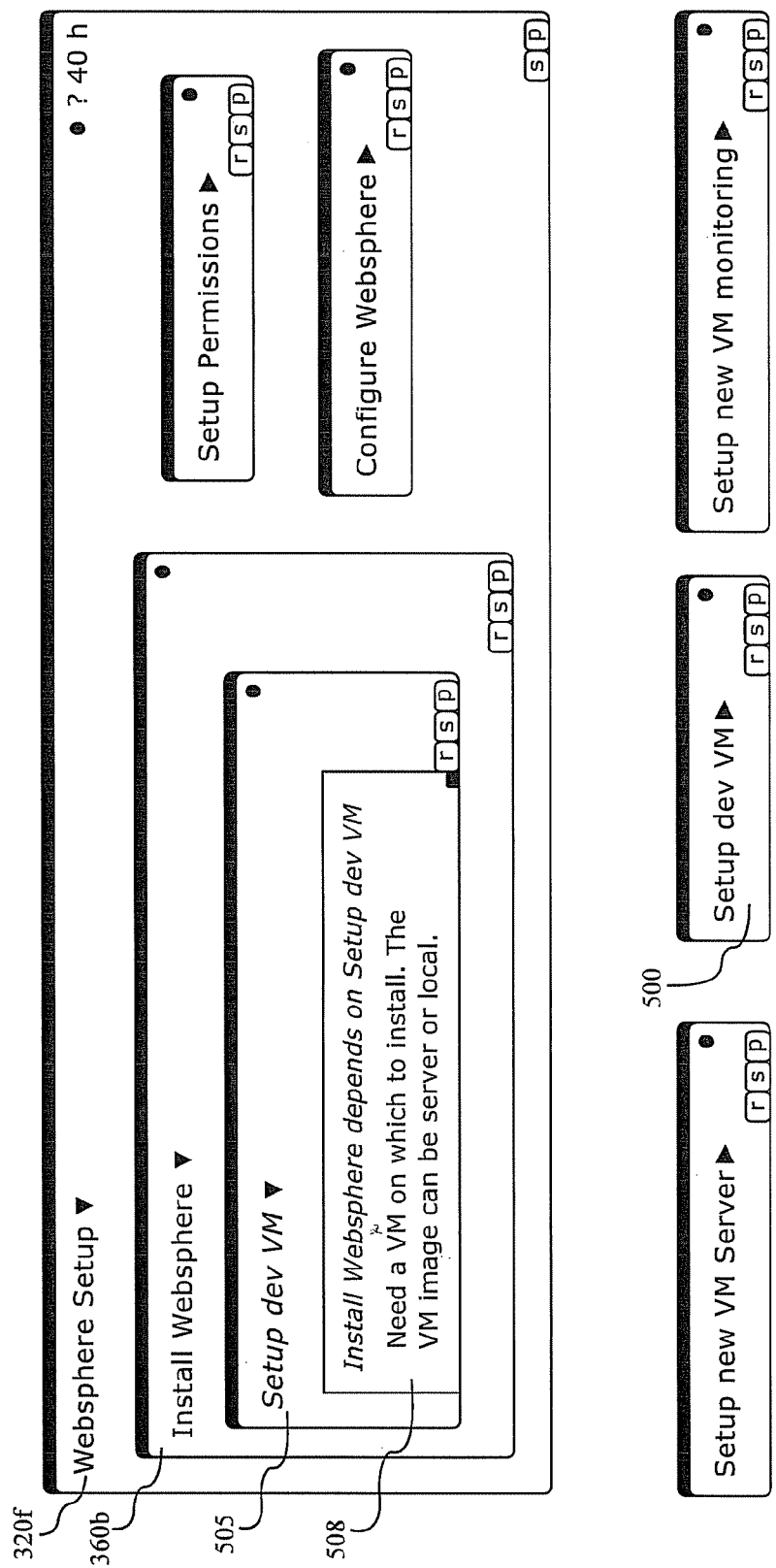
FIG. 24 is a task canvas representing the task Websphere Setup in accordance with the subject technology.

In FIG. 24, tan-P element 320f shows another representation of the taskset Websphere Setup. In the taskset 320f, the subtask "Install Websphere" tan-P element 360b contains item 505, a dependency display element. The dependency display 505 designates that element 360b is dependent upon element 500 "Set up dev VM." This read as "Task 'Install Websphere' is dependent upon task 'Setup dev VM.'" Tan-P element 500 is a task that belongs to a completely different sequence within the same task canvas. The dependency display element 505 appears as a secondary visual representation of element 500. Changes made to the primary visual display 500, such as changing the name, automatically appear in the secondary visual display element 505. Item 508 is a panel displaying the nature of the dependency.

In FIG. 25, a task table shows dependency relationships in a table perspective. "Set up dev VM" is shown twice within the table, once in row 510 as a task, its primary representation within the table, then again in row 514, a secondary representation contained within row 512, the primary tabular representation of task "Install Websphere" and its various subcomponent contents.

Figure 26:
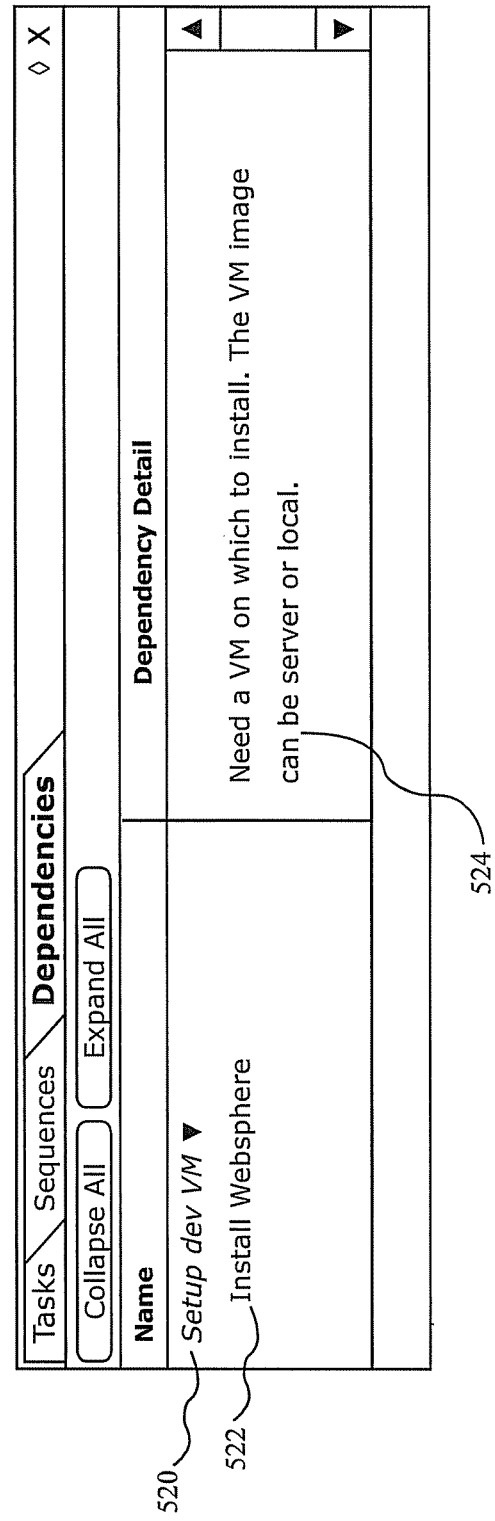
FIG. 26 is a task dependencies table showing the same dependency as FIG. 25 from the inverse perspective in accordance with the subject technology.

In FIG. 26, a task dependencies table shows this same dependency from the inverse perspective. Table row 520 represents task "Set up dev VM" in this presentation. Table row 522 shows that task "Install Websphere" is dependent on task "Set up dev VM." Table cell 524 displays the nature of the dependency; the text content of 524 is identical to the text content of panel 508 in FIG. 24, since these items describe the same dependency.

Disconnected Control

The subject technology can accommodate the creation of annotated drawings in order to describe or represent extremely complex phenomena that undergo continuous change such as software projects. One problem of such drawings is the need to account for continuous change which becomes harder and harder as the description grows fuller and more detailed.

When editing text, users can place the cursor in the middle of documents and begin to type. The processor accommodates this action by inserting text from the point at which the cursor is placed and pushing existing text down to accommodate the new text. The subject technology contains a comparable insertion capability for editing drawings. Text is physically and structurally tolerant of change through the mechanism described above. However, drawings are not so tolerant or so easily changed. This is the structural/physical reason why the more detailed the drawing, the more difficult such changes become.

Figure 27B:
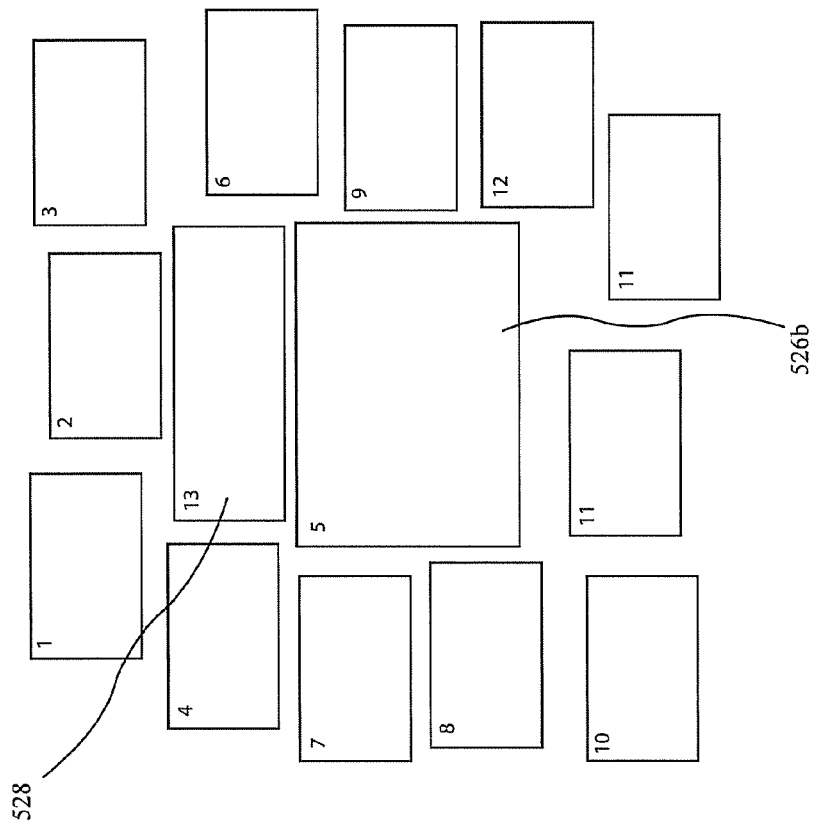
FIG. 27b is a somewhat schematic view of a modified drawing of FIG. 27a in accordance with the subject technology.
Figure 27A:
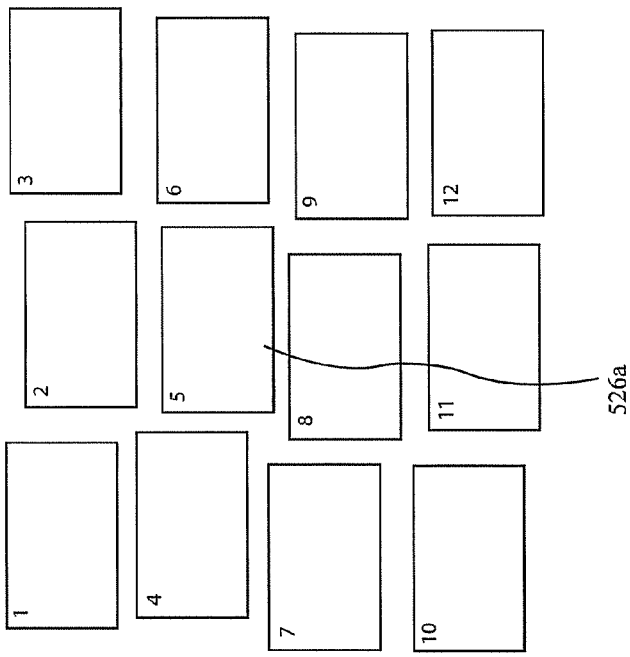
FIG. 27a is a somewhat schematic view of a drawing in accordance with the subject technology.

Referring to FIG. 27*a*, a somewhat schematic view of a drawing is shown. The drawing of FIG. 27*a* contains 12 tightly spaced objects. Now consider having to accommodate the relatively simple change shown in FIG. 27*b* in which item 526*a* is enlarged to its state in 526*b* and item 528 is added. At least 75% of the items in the drawing had to be moved. Now consider having to do the same sort of change to a diagram such as shown schematically in FIG. 28.

Figure 28:
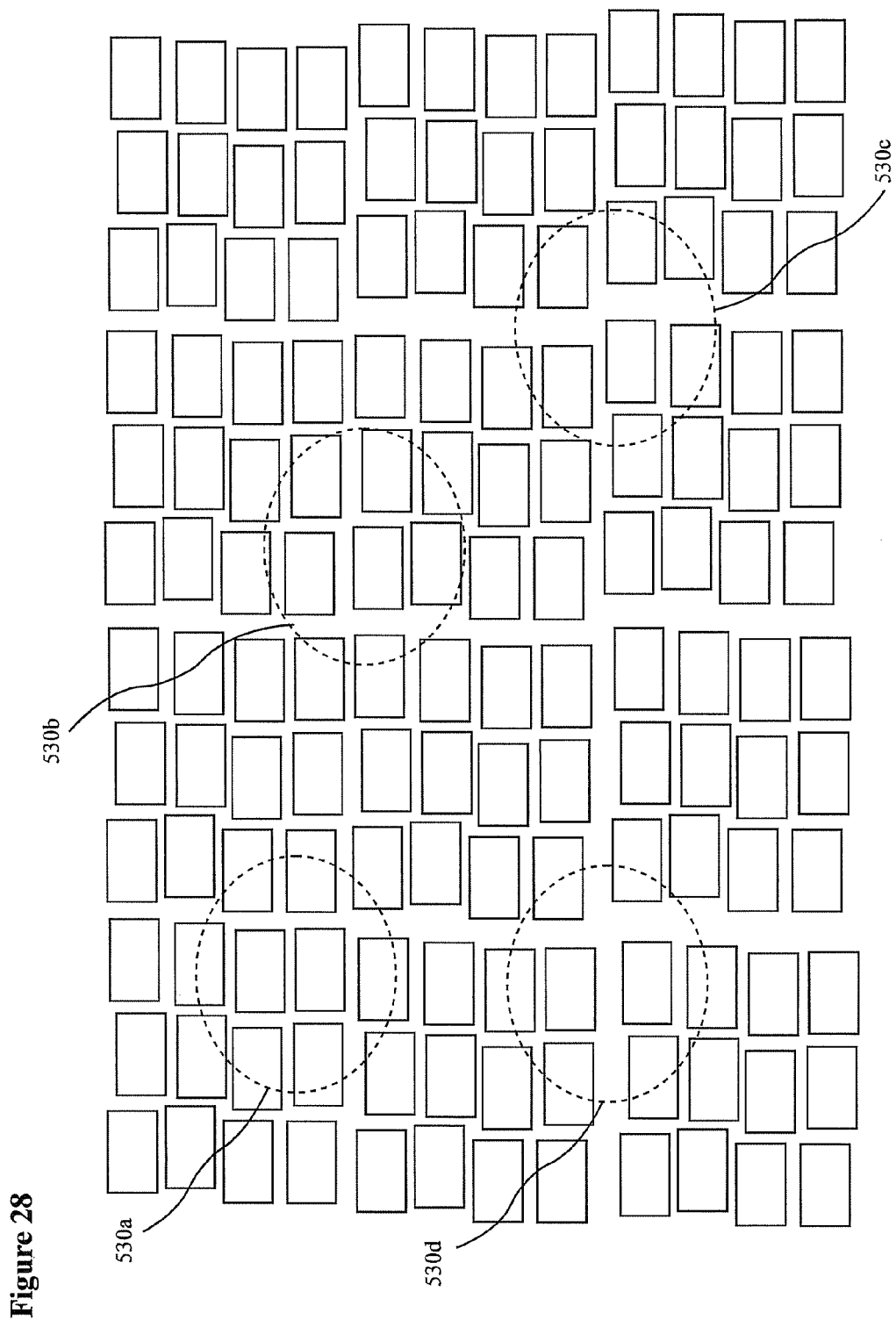
FIG. 28 is a somewhat schematic view of a more complex drawing in accordance with the subject technology.

In FIG. 28, four areas 530*a-d* are to be updated/modified. The task of keeping a drawing updated quickly becomes less about drawing and more about making room to accommodate insertion. Consider a predominantly text-based description of a system that is a few dozen pages long. It can be changed or extended from any point along the entire length thereof. If a block of text is deleted, the document is not left with a gap at the deletion point. Any amount of text can be added by anyone at any point any time at the speed of typing. If one is to successfully draw representations of external concepts such as maps of a software project from multiple perspectives, then that is precisely the rate of change that has to be anticipated and accommodated. This becomes even more so in a collaborative environment when multiple users may be changing and adding to the construct at the same time. The user cannot be asked to spend more time and effort accommodating change than actually making change.

When considering diagrams containing virtually dozens of elements such as those shown in FIG. 23 then the task of accommodating change becomes not a luxury, but a necessary feature without which the task of updating a canvas to keep up with changing conditions becomes virtually untenable. In one embodiment, the drawing canvas has elements that can move automatically to accommodate changes to themselves and to their adjacent neighbors in both position and size whether by addition to make room, or subtraction to remove empty space. This feature is herein referred to as disconnected control.

Preferably, disconnected control is more that the practice of manipulating a graphical object by manipulating another graphical object that is outside the obvious physical container (e.g., bounding rectangle) of the first object. Grouping, joining, multiple selection, and other similar techniques can be included to manipulate multiple objects as a single unit so that the single unit still appears visually disconnected but are nevertheless logically connected.

In addition, the subject technology can also allow the addition of physical properties such as virtual gravitation and virtual magnetism to objects in a 3D model and these, when combined with inverse kinematic properties, allow the movement of an object to cause cascading movement among other objects in their vicinity either according to simulation of natural forces or according to scripted reactions.

In one embodiment, the subject technology utilizes a mechanism for moving groups of the interactive graphical elements within canvases, without the need for selection, multiple selection grouping, programming physical properties, inverse kinematics, or any of the other previously used mechanisms. The principles of disconnected control are based on geometry—elements that fall within the appropriate geometrical boundaries of other elements will be affected by the move or resize action. Using map-based directions, the boundaries of a rectangular interactive graphical tool/element are defined as having north, south, east, and west edges.

For example, if an eastern edge is moved to the east or the west, then all graphical elements that lie to the east of the original position of the east wall are made to move in concert with the resizing action. Similarly, if the element being resized is contained within another element, when the eastern edge of the contained element is moved to the east or the west, then the eastern edge of the containing interactive graphical/element tool will move east or west by the same amount. These same rules may apply for each of the cardinal directions.

Figures 29A, 29B, 29C:
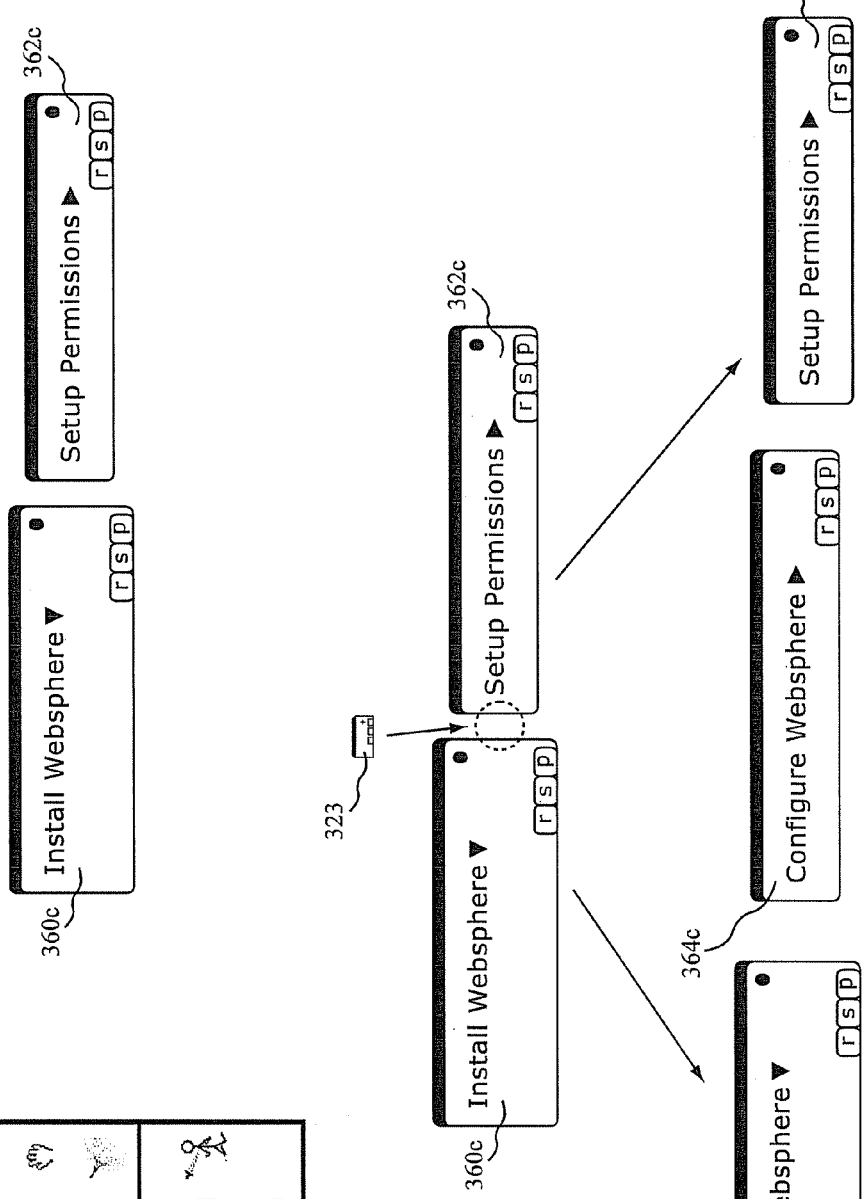
FIGS. 29a-c show a sequence of displays representative of an accommodating movement in accordance with the disconnected control of the subject technology.

For example in reference to FIGS. 29*a-c*, the simplest implementation of disconnected control is accommodating movement. FIGS. 29*a-c* show a sequence of displays representative of an accommodating movement. If you drop an element between two or more elements, the original elements move aside to make space for the dropped-in new element. The movement occurs by using a content addition tool and clicking its cursor at the drop point, or creating a new element and drag and dropping it at the drop point. The existing elements in turn may move elements adjacent to themselves if necessary to make room.

In FIG. 29*a*, choosing a Project Element Tool 321 invokes the Project Cursor 323 of FIG. 29*b*. Placing the cursor between two elements 360*c*, 362*c* of FIG. 29*b* allows the insertion of task Configure Websphere 364*c* which pushes elements 360*c*, 362*c* aside to make room. Alternatively, Project Cursor 323 could have created task 364*c* in an empty area of the canvas to create the task 364*c* which could then be dragged and dropped in the same spot between the two elements 360*c*, 362*c*. Either workflow would have resulted in the same accommodating movement by the elements 360*c*, 362*c*. This implementation of disconnected control is preferably always active.

Figure 30A:
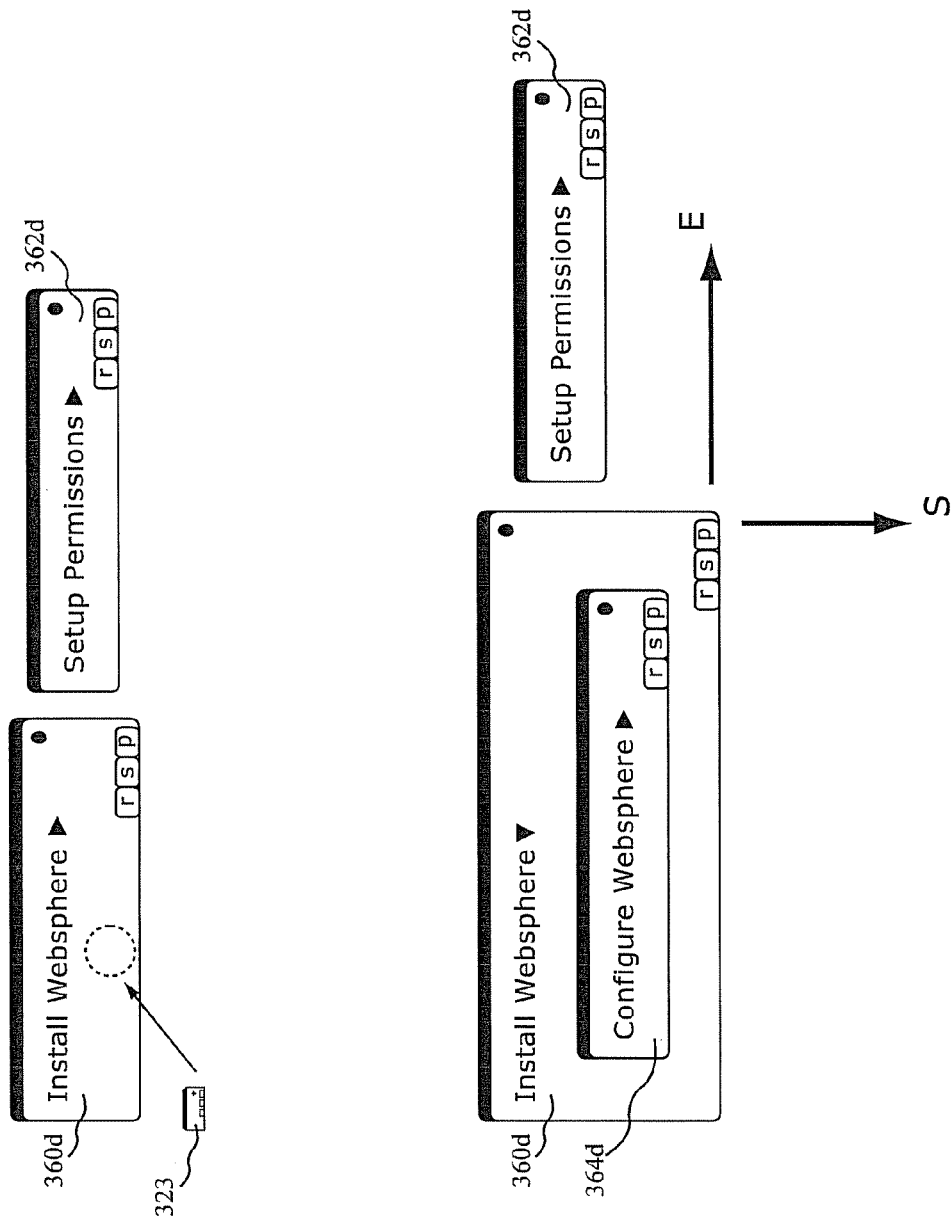
FIGS. 30a-b show another implementation of accommodating movement involving inserting an element into another element in accordance with the subject technology.
Figure 30B:
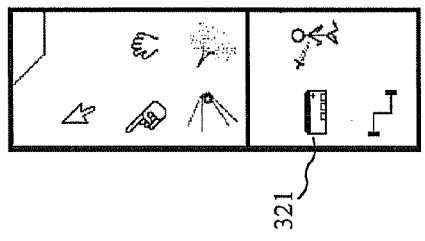

Referring to FIGS. 30*a-b*, another implementation of accommodating movement involves inserting an element into another element is shown. The destination/container element grows to accommodate the additional new contents. If this growth results in a collision of the sides of the container with adjacent elements, then the adjacent elements move aside to make room for the growth.

In FIG. 30*a*, choosing the Project Element Tool 321 invokes the Project Cursor 323. Clicking the cursor inside element 360*d*, creates the element 364*d* shown in FIG. 30*b*. The element Configure Websphere 364*d* causes element 360*d* to grow in both direction East (E) and South (S) to accommodate the insertion of element 364*d*. As the eastern boundary moves eastward, element 360D collides with the western extremity of element Setup Permissions 362d. Element Setup Permissions 362d moves in direction E to accommodate the resizing of element 360d. This can also be accomplished by creating element 364d elsewhere on the canvas and dragging and dropping it onto element 360d, and again either workflow would have resulted in the same accommodating movement. This implementation of disconnected control is preferably always active.

Another implementation of disconnected control involves manipulating objects to affect change in other objects in the vicinity. Preferably, this implementation of disconnected control has to be engaged and disengaged. As previously mentioned, whenever spatially changing—either by moving or by resizing—any element, a user may choose to have other elements within the canvas move and resize in coordination with the spatial change in a different way than Accommodation Movement. As previously mentioned, this is affected without the need to select, group, or join those other elements, or change/add to their physical properties, or program anything in anyway.

Using the keyboard or artifacts within the user interface, disconnected control can be applied in a variety of ways and its sphere of control can be modified to affect elements in different ways to resize, or move or both in coordination to the initial point of movement.

Figure 31A:
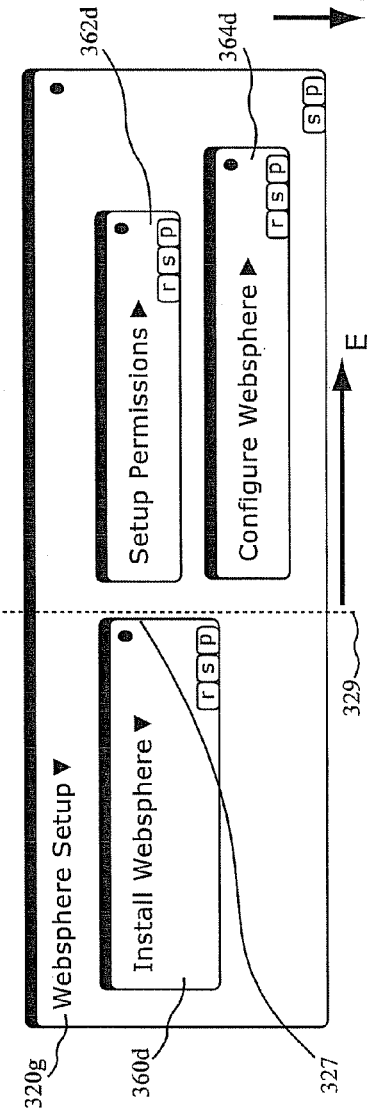
FIGS. 31a-c show usage of disconnected control to resize elements in accordance with the subject technology.
Figure 31B:
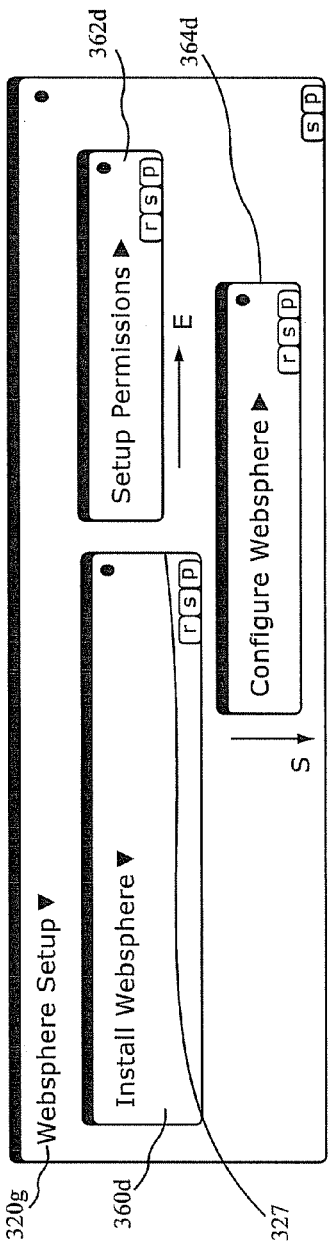
Figure 31C:
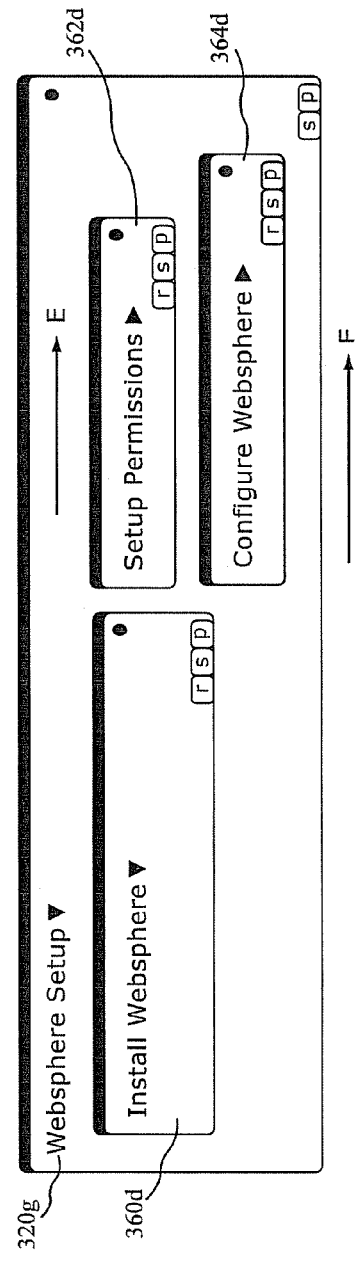

In FIGS. 31a-c, usage of disconnected control to resize elements is shown. In FIG. 31a, a user may move item 327, the right edge of subtask install Websphere 360d several dozen pixels to the right in direction E. Accommodating movement causes element 362d to move in the same direction E and element 364d to move south in direction S, to make room for the change in element 360d, resulting in the state shown in FIG. 31b.

Alternatively, by engaging a different mode of disconnected control, elements may be rearranged in different ways. Consider the imaginary line 329 which represents a vector running up and down along the right edge of element 360d in FIG. 31a. FIG. 31c shows the resulting changes to the canvas when this different mode of disconnected control is engaged. Here, the same movement of edge 327 in direction E can be made to push element 362d, 364d, as well as, every element above and below them that were to the right of line 329 at the beginning of the movement, along the same direction. The diagram may be restored to its original state in FIG. 31a simply by moving sidewall 327, the eastern wall of element Install Websphere 360d back to its original position while having the same mode of disconnected control engaged.

Figure 32A:
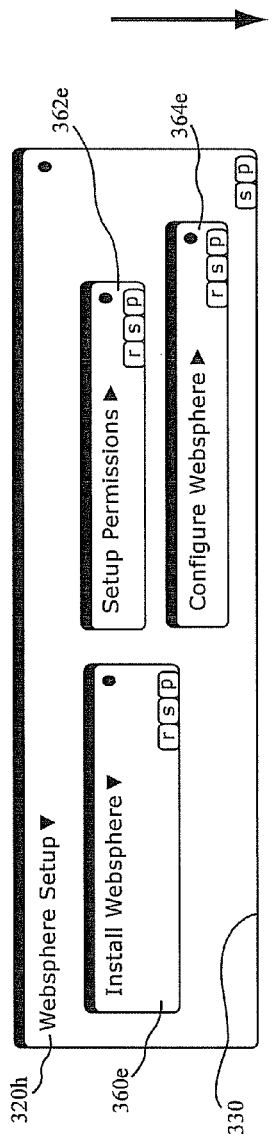
FIGS. 32a-c show further usage of disconnected control to resize a task set in accordance with the subject technology.
Figure 32B:
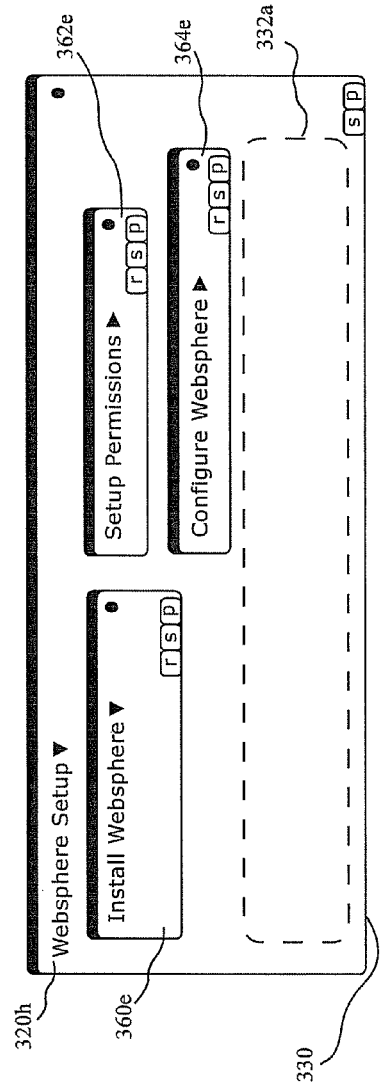
Figure 32C:
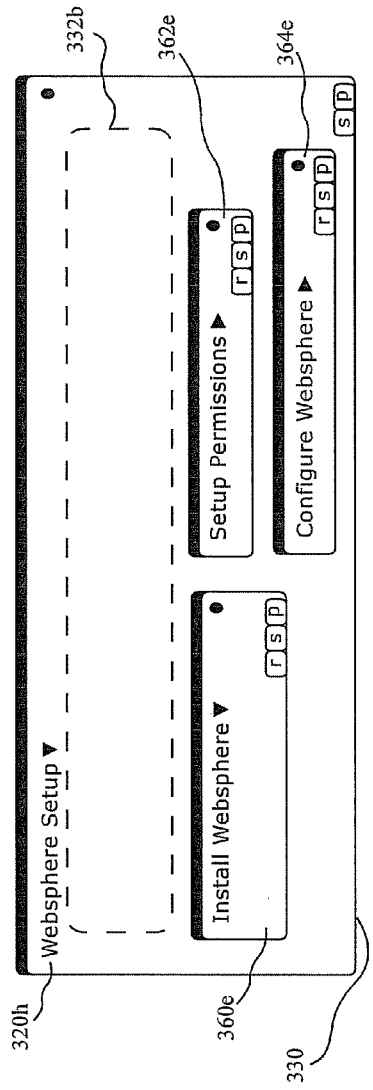

In FIGS. 32a-c, usage of disconnected control to resize a task set is shown. In FIG. 32a, the state of a taskset Websphere Setup element or task set 320h is shown. If a user moves the bottom boundary 330 of the task set 320h and pulls the boundary 330 in the direction of South (S), under normal conditions the boundary 330 moves and the contents 360e, 362e, 364e remain where they are to make space below them in area 332a as shown in FIG. 32b. However, engaging disconnected control and making the same move causes all the elements to move as if attached to the bottom boundary thereby malting space 332b above the elements 360e, 362e, 364e as in FIG. 32c.

Disconnected control may be subdivided into individual components and each of these components may be enabled or disabled separately. For example, during a resize operation, only north/south operations may be applied, or only east/west. Changes may be applied only to contents of the interactive graphical tool being manipulated, or only to tools that are external to the tool.

Disconnected control may also be utilized to manipulate the collapse/expand capabilities of the interactive graphical tools/elements. Under normal circumstances, when one element collides with a second element, the second element moves out of the way. However, when the collapse/expand capability of disconnected control is engaged, collisions will cause the element to exercise its collapse/expand capability.

Figure 33B:
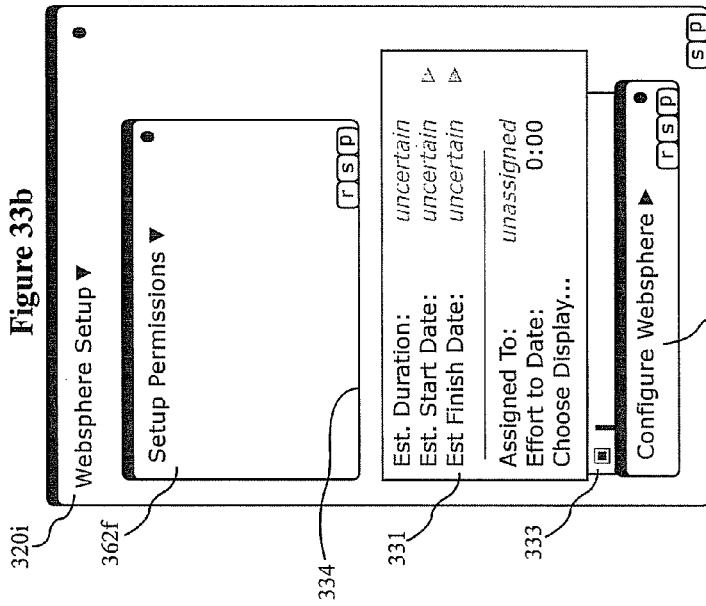
FIGS. 33a-c show still further usage of disconnected control to resize a task set in accordance with the subject technology.
Figure 33A:
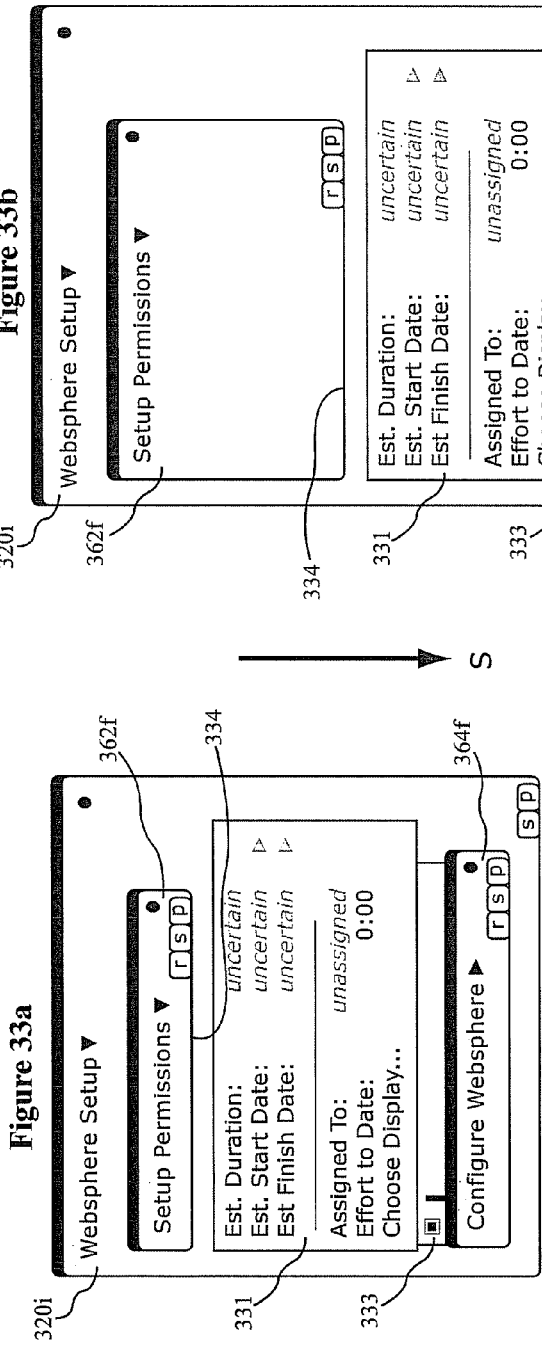
Figure 33C:
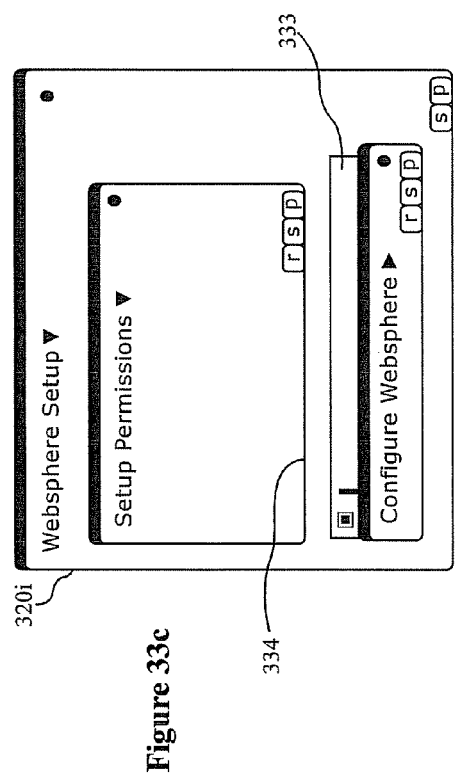

In FIGS. 33a-c, further usage of disconnected control to resize a task set is shown. FIG. 33a shows another representation of the taskset Websphere Setup 320i. The subtask Setup Permissions 362f is in a collapsed state while subtask Configure Websphere 364f is expanded to show its Status Bar 333 and Information Flag 331. If a user moves the southern boundary edge 334 of subtask 362f in the direction S as indicated, then Accommodating Movement causes all components of subtask 364f to move in the same direction, which in turn causes task set 320i to expand in the same direction resulting in the state as shown in FIG. 33b. Alternatively, the user can engage a different mode of disconnected control so that when the edge 334 collides with the top of the Information Flag 331, the Flag 331 collapses to a minimized state as shown in FIG. 33c. The user can reinstate the condition shown in FIG. 33a simply by moving in the opposite direction while keeping disconnected control engaged.

In a similar fashion, disconnected control may also be utilized to manipulate the minimize/restore capabilities of the interactive graphical tools. When the minimize/restore capability of disconnected control is engaged, collisions will cause the second interactive graphical tool to exercise its minimize/restore capability.

In FIGS. 34a-c, still further usage of disconnected control to resize a task set is shown. FIG. 34a shows, in isolation, the "We Use" container item 420 of a system interactive graphical element. A user can move the eastern boundary edge 422 of container 420 in the West direction (W) as indicated. With disconnected control engaged in collapse/expand mode, when the edge 422 collides with item 433 representing the eastern most edge of element 444, then the entire Websphere module 444 and all its appendages collapse as shown in module 444b of FIG. 34b. From the state of FIG. 34b, if disconnected control remains engaged in collapse/expand mode, and boundary 422 of the Tomcat module 493 is moved in direction S as indicated, as the Tomcat module 493 collides with the top of element 441, again all of the MQ Series middleware element 441 collapses to a state as shown in FIG. 34c. Again, moving in the opposite direction with disconnected control engaged in collapse/expand mode causes collapsed items to be restored to their original state.

Disconnected control thus allows diagrams of great complexity to be rapidly manipulated, to create alignments, empty space where needed, and eliminating unnecessary empty space where desired simply by pulling and/or pushing against a given extremity or border of a single interactive graphical tool or element.

INCORPORATION BY REFERENCE

All patents, published patent applications, articles and other references disclosed herein are hereby expressly incorporated in their entireties by reference.

Those of ordinary skill will recognize that the computing system and various processes discussed herein are merely exemplary of the functionality performed by the disclosed technology and thus such processes and/or their equivalents may be implemented in commercial embodiments in various combinations and quantities without materially affecting the operation of the disclosed technology. The figures herein illustrate the structure and logic of the present technology, possibly as embodied in computer program software for execution on a computer and/or a network. Those skilled in the art will appreciate that the figures illustrate the structures of the informational ecosystem elements. As such, the present technology can be practiced by a machine component that renders the elements by instructing a processing apparatus to perform a sequence of function steps corresponding, similar and equivalent to those shown in the figures.

It will be appreciated by those of ordinary skill in the pertinent art that the functions of several elements may, in alternative embodiments, be carried out by fewer elements, or a single element. Similarly, in some embodiments, any functional element may perform fewer, or different, operations than those described with respect to the illustrated embodiment. Also, functional elements shown as distinct for purposes of illustration may be incorporated within other functional elements in a particular implementation. While the invention has been described with respect to preferred embodiments, those skilled in the art will readily appreciate that various changes and/or modifications can be made to the invention without departing from the spirit or scope of the invention as defined by the appended claims.

What is claimed is:

1. A server in communication with clients via a distributed computing network comprising:
   (a) a memory storing an instruction set and data related to the simulation model; and
   (b) a processor for running the instruction set, the processor being in communication with the memory and the distributed computing network, wherein the processor is operative to facilitate creating a simulation model for a complex enterprise software solution by performing the following steps:
      (i) present a text canvas that includes a table to represent a solution to a request for software code that addresses a problem such that a plurality of non-technical audience and editors are able to modify text of the table;
      (ii) present a text canvas (ADT) that includes a table to represent individual end-users of a solution to a request for software code that addresses a problem such that the plurality of non-technical audience and editors are able to modify text of the table;
      (iii) present a text canvas (FDT) that includes a table to represent individual functional features of a solution to a request for software code that addresses a problem such that the plurality of non-technical audience and editors are able to modify text of the table;
   wherein: the canvases include uncertainty fields associated with elements of the solutions and the canvases are related such that a modification to one uncertainty field is promulgated to the other canvases so that the non-technical audience and editors effectively communicate together; and the simulation model contains a plurality of alternate versions of simulation models for the complex enterprise software simultaneously and separately so that the plurality of non-technical audience and editors are able to review and modify each alternate simulation version;
      (iv) present a task canvas that includes recursive container-based, pre-and-post-conditional expandable interactive graphical tools to represent tasks involved in creating the solutions such that editors such as project managers, team leaders, and other professionals are able to describe the elements required to construct portions of the solution including dependencies between elements, resource requirements, resource availability, and resource assignment, and thereby define the solutions;
      (v) present a time-line canvas that includes linear, sub-branching interactive graphical tools to represent the temporal relationships between tasks involved in creating the solution such that editors such as project managers, team leaders, and other professionals are able to create and modify the elements to coordinate efforts required to construct portions of the solution and thereby define the solutions, wherein the dependencies between elements are visually represented and changes to dependencies between elements are automatically promulgated; and
      (vi) present tabulated task canvas that includes a set of tables to represent all attributes and aspects of tasks involved in creating the solution such that editors such as project managers, team leaders, and other professionals are able to fully represent and manage the efforts required to construct portions of the solution and thereby define the solutions;
   wherein the canvases are related to form a conceptual construct of the complex enterprise software solution such that modification to one canvas is automatically promulgated to at least one other canvas within the larger conceptual construct so that all editors effectively communicate together while using the canvases.

2. A server as recited in claim 1, wherein the processor is further operative to derive an uncertainty quotient based on the uncertainty fields.

3. A server as recited in claim 2, wherein the derivation of the uncertainty quotient is recursive.

4. A server as recited in claim 2, wherein the uncertainty quotient is a ratio of a number of uncertainty fields declared uncertain to a number of total values within the solution.

5. A server as recited in claim 2, wherein the uncertainty fields are presented in a plurality of different formats, wherein the uncertainty fields contain a value selected from the group consisting of certain and uncertain and the uncertainty quotient is a ratio of uncertain values for each respective element.

6. A server as recited in claim 1, wherein the processor is further operative to support a plurality of solutions and construct an index based on the corresponding uncertainty quotients for use in indicating a probability of success of any single solution in a non-automated, human-centric manner.

7. A server as recited in claim 1, wherein the canvases are related to form a conceptual construct such that a modification to one canvas is promulgated to at least one other canvas within the conceptual construct.

8. A server as recited in claim 1, wherein the processor is further operative to:
   (i) present a storyboard canvas that includes spatially-oriented, radially-structured interactive graphical tools to represent the navigation and/or work-flow of the solution so that editors are able to create, modify and directionally connect the graphical tools and thereby define the solution;
   (ii) present a wireframe canvas that includes interactive graphical tools to represent the individual user interface components, including buttons, data fields, windows, screens, and other user interface controls, of the solution such that editors such as information architects, application designers, and user interface experts are able to assemble unique user interfaces by combining the graphical tools and thereby define the solution;
   (iii) present a presentation canvas that includes interactive graphical tools to represent skinning decisions including fonts, colors, borders, images, and graphical presentation option, of the solution such that editors such as graphic designers, producers and interface experts are able to define a look-and-feel and thereby define the solution;

wherein the canvases are related to form the conceptual construct of a user interface such that modification to one canvas is promulgated to at least one other canvas, which may include the canvases described in preceding claims, within the larger conceptual construct so that all editors, including editors described in preceding claims, may effectively communicate together while using their individual canvases.

9. A server as recited in claim 1, wherein the processor is further operative to:
(i) present a data packaging canvas that includes branching structures to represent the structures and hierarchies of data within the solution such that editors such as information architects, application architects, database engineers, networking specialists, or other technical experts are able to create, navigate, and modify the branching structures and thereby define the solution;
(ii) present a data tables canvas that includes a table-builder to represent the database schemata of the solution such that editors such as information architects, application architects, database architects, database engineers, or other technical experts are able to create and modify the tabular representation of the database schemata and thereby define the solution; and
(iii) present a data relations canvas that includes spatially-oriented, radially-structured interactive graphical tools to represent the database schemata of the solution such that editors such as information architects, application architects, database architects, database engineers, or other technical experts are able to create and modify the relational structures of the database schemata and thereby define the solution;

wherein the canvases are related to form the conceptual construct of database schemata such that modification to one canvas is promulgated to at least one other canvas, which may include the canvases described in preceding claims, within the larger conceptual construct so that all editors, including editors described in preceding claims, may effectively communicate together while using their individual canvases.

10. A server as recited in claim 1, wherein the processor is further operative to:
(i) present a technical schematic canvas that includes interactive graphical tools to represent the organizations and computing systems comprising the solution such that editors such as application architects, database engineers, network engineers, system architects, UML experts, or other technical experts are able to describe the computing environment and infrastructure, including hardware and software, and thereby define the solution;
(ii) present a visualization of organizations that includes recursive container-based expandable interactive graphical tools represent the organizations and individuals comprising the solution such that editors such as application architects, project managers, UML experts, or other domain experts are able to create and modify the organizational structure and thereby define the solution;
(iii) present a visualization of computing systems that includes layered interactive graphical tools to represent the physical computing systems comprising the solution such that editors such as application architects, network architects, network engineers, system architects, system engineers, UML experts, or other technical experts are able to create and modify the graphical representations of computing systems and thereby define the solution;
(iv) present a visualization of networks that includes connection-based interactive graphical tools to represent the networks comprising the solution such that editors such as application architects, network architects, network engineers, system architects, system engineers, or other technical experts are able to create and modify the graphical representations of networks and thereby define the solution;
(v) present a visualization of software components that includes recursive container-based expandable interactive graphical tools to represent the software components of the solution such that editors such as application architects, database architects, database engineers, software engineers, UML experts, or other technical experts are able to create and modify the graphical representations of software components and thereby define the solution; and
(vi) present a visualization of software component interaction that includes connection-based interactive graphical tools to represent the software procedural and API calls comprising the solution such that editors such as application architects, database architects, database engineers, software engineers, or other technical experts are able to create and modify the graphical representations of software components and thereby define the solution;

wherein the canvases are related to form the conceptual construct of computing hardware and software such that modification to one canvas is promulgated to at least one other canvas, which may include the canvases described in preceding claims, within the larger conceptual construct so that all editors, including editors described in preceding claims, may effectively communicate together while using their individual canvases.

11. A non-transitory computer readable medium for use in a computer network, the non-transitory computer readable medium being able to prompt a server in the computer network to perform the steps of:
a) creating a conceptual construct having elements representative of a complex enterprise software;
b) presenting a canvas designed for a first audience that enters data related to the complex enterprise software into the canvas;
c) creating additional canvases based upon the complex enterprise software data, the additional canvases being designed for a second audience; and
d) coupling a plurality of secondary visual representations to at least one element,
wherein the canvases display dependencies between first and second elements based on coupling the first and second elements such that the first and second audience can determine the couplings and selectively review the dependencies, wherein a visual geometric container for each element represents the element's dependencies within the visual geometric container, and the canvases include uncertainty fields associated with elements, the canvases are related such that a modification by an editor to one dependency using a form of drag-and-drop which automatically populates a database table of element dependencies, is promulgated to the other canvases so that the audiences effectively communicate together about the dependencies, wherein promulgation includes the step of coupling and decoupling modifications to the conceptual construct without the editor making further selections or associations.

12. A non-transitory computer readable medium as recited in claim 11, wherein the computer readable medium is further operative to prompt the server to perform the step of coupling a plurality of primary visual representations to at least one of the elements, and the canvases are related such that a modification to one uncertainty field is promulgated to the other canvas so that the audiences effectively communicate together.

13. A non-transitory computer readable medium as recited in claim 11, wherein the canvases are selected from the group consisting of:
  (i) a text canvas that includes a table to represent a solution to a request for software code that addresses a problem such that an editor is able to modify text of the table;
  (ii) present an interactive schematic canvas that includes expandable icons arranged on a circle to represent the solution such that a system architect is able to navigate and modify the expandable icons;
  (iii) present a data canvas that includes a branching structure to represent the solution such that a data analyst is able to navigate and modify the branching structure; and
  (iv) present a user interface canvas that uses graphics to represent the solution such that a user interface designer is able to modify the graphics.

14. A server in communication with clients via a distributed computing network comprising:
  (a) a memory storing an instruction set and data related to the simulation model; and
  (b) a processor for running the instruction set, the processor being in communication with the memory and the distributed computing network, wherein the processor is operative to facilitate creating a simulation model for a complex enterprise software solution in an unbounded workspace by performing the following steps:
    (i) present a text canvas that includes a table to represent a solution to a request for software code that addresses a problem such that a plurality of editors are able to modify text of the table using the clients;
    (ii) present a text canvas (ADT) that includes a table to represent individual end-users of a solution to a request for software code that addresses a problem such that the plurality of editors are able to modify text of the table;
    (iii) present a text canvas (FDT) that includes a table to represent individual functional features of a solution to a request for software code that addresses a problem such that the plurality of editors are able to modify text of the table;
  wherein modification of the canvases utilizes disconnected control such that as a user modifies the geometric boundaries of the elements of the simulation model in the canvas, elements are selectively related such that a modification to a first element is promulgated to other elements such that as new elements are added, the unbounded workspace expands, as elements are moved, stretched, or edited surrounding elements are moved to not cover each other without selection or association of said surrounding elements by the editor, and
  the canvas includes uncertainty fields associated with elements, the uncertainty fields including a value of either certain and uncertain; and
    (iv) present an uncertainty quotient that is a ratio of uncertain values for each respective element.

15. A server as recited in claim 14, wherein the elements move automatically to accommodate changes thereto and to adjacent elements in both position and size whether by addition to make room, or subtraction to remove empty space with selecting, grouping, or joining the other elements, the properties of the other elements, or the simulation model in anyway.

16. A server as recited in claim 15, wherein when moving a boundary of the first element the other elements move as if attached to the boundary to thereby make space above the other elements.

17. A server as recited in claim 15, wherein when moving the boundary, if a collision with a boundary of a second expanded element occurs, the second expanded element collapses to a minimized state.

18. A server as recited in claim 14, wherein disconnected control does not include scrolling and occurs when graphical elements on a canvas might collide with one another.

19. A server in communication with clients via a distributed computing network comprising:
  (a) a memory storing an instruction set and data related to a simulation model; and
  (b) a processor for running the instruction set, the processor being in communication with the memory and the distributed computing network, wherein the processor is operative to facilitate creating a simulation model for a complex enterprise software solution in an unbounded workspace by performing the following steps:
    (i) create a conceptual construct having elements representative of a complex enterprise software;
    (ii) present a first canvas designed for a first audience that enters data related to the complex enterprise software into the first canvas by manipulating graphical elements;
    (iii) create additional canvases based upon the data related to the complex enterprise software, the additional canvases being designed for additional audiences which also enter data related to the complex enterprise software into the additional canvases by manipulating graphical elements therein;
  wherein modification of the first and additional canvases utilizes disconnected control such that as an editor modifies geometric boundaries of the graphical elements in the respective canvas, whether those graphical elements are contained or not, the graphical elements are selectively related such that a modification to a first graphical element is promulgated to other graphical elements such that as new graphical elements are added, the unbounded workspace expands, as graphical elements move, grow, or are resized, surrounding graphical elements are moved to not cover each other; wherein expansion of the unbounded workspace occurs automatically without requiring the editor to select or associate the graphical elements surrounding the modified geometric boundaries, and
  the canvas includes uncertainty fields associated with the graphical elements, the uncertainty fields including a value of either certain and uncertain; and
    (iv) present an uncertainty quotient that is a ratio of uncertain values for each respective graphical element.

* * * * *